US009223016B2

(12) United States Patent
Kamimura et al.

(10) Patent No.: US 9,223,016 B2
(45) Date of Patent: Dec. 29, 2015

(54) PULSE RADAR APPARATUS AND CONTROL METHOD FOR THE SAME

(71) Applicants: Furukawa Electric Co., Ltd., Tokyo (JP); Furukawa Automotive Systems Inc., Shiga (JP)

(72) Inventors: Kazutaka Kamimura, Tokyo (JP); Yasushi Aoyagi, Tokyo (JP); Yoshihito Ishida, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 93 days.

(21) Appl. No.: 14/034,060

(22) Filed: Sep. 23, 2013

(65) Prior Publication Data
US 2014/0022114 A1 Jan. 23, 2014

Related U.S. Application Data

(63) Continuation of application No. PCT/JP2012/056221, filed on Mar. 12, 2012.

(30) Foreign Application Priority Data

Mar. 23, 2011 (JP) .................. 2011-064871
Mar. 28, 2011 (JP) .................. 2011-070482
Mar. 31, 2011 (JP) .................. 2011-080575

(51) Int. Cl.
*G01S 13/18* (2006.01)
*G01S 7/285* (2006.01)
(Continued)

(52) U.S. Cl.
CPC ............... *G01S 13/18* (2013.01); *G01S 7/285* (2013.01); *G01S 7/292* (2013.01); *G01S 7/4021*
(Continued)

(58) Field of Classification Search
CPC ..... G01S 13/18; G01S 13/4454; G01S 13/931; G01S 2007/2886; G01S 7/285; G01S 7/292; G01S 7/4021
USPC ........................................................ 342/134
See application file for complete search history.

(56) References Cited

U.S. PATENT DOCUMENTS 7,215,278 B2   5/2007   Bandhauer
8,547,273 B2   10/2013   Aoyagi et al.
(Continued)

FOREIGN PATENT DOCUMENTS

EP   2 546 675 A1   1/2013
JP   07-151852 A    6/1995
(Continued)

OTHER PUBLICATIONS

International Search Report mailed May 22, 2012 for PCT/JP2012/056221 filed on Mar. 12, 2012 with English Translation.
(Continued)

*Primary Examiner* — Timothy A Brainard
(74) *Attorney, Agent, or Firm* — Oblon, McClelland, Maier & Neustadt, L.L.P.

(57) ABSTRACT

A pulse radar apparatus and a control method therefor are provided that can detect information about a target with a high degree of accuracy by allowing detection of target information at all times and updating a replica signal of a noise signal in order. When the number of sets of distance data n1 is determined to be more than the number of sets of all distance data Nr in step S5, it is determined that target information detection processing is finished, and replica signal generation processing is subsequently performed. The radar function is activated in steps S13, S15, S16, and the noise signal for each distance data is obtained in step S17. Thereafter, in steps S19, S21, S23, the first, second, and third background signals, respectively, are generated, and thereafter, in step S23, a replica signal is generated.

32 Claims, 20 Drawing Sheets

(51) Int. Cl.
*G01S 7/292* (2006.01)
*G01S 7/40* (2006.01)
*G01S 13/93* (2006.01)
*G01S 13/44* (2006.01)
*G01S 7/288* (2006.01)

(52) U.S. Cl.
CPC ....... *(2013.01); G01S 13/931* (2013.01); *G01S 13/4454* (2013.01); *G01S 2007/2886* (2013.01)

(56) References Cited

U.S. PATENT DOCUMENTS

| | | | |
|---|---|---|---|
| 2004/0046689 A1* | 3/2004 | Rees et al. | 342/159 |
| 2005/0104765 A1 | 5/2005 | Bandhauer | |
| 2012/0326912 A1 | 12/2012 | Aoyagi et al. | |

FOREIGN PATENT DOCUMENTS

| | | |
|---|---|---|
| JP | 11-118915 A | 4/1999 |
| JP | 2010-051681 A | 3/2010 |
| JP | 2010-249737 A | 11/2010 |

OTHER PUBLICATIONS

Office Action issued Oct. 29, 2013 in Japanese Patent Application No. 2011-064871 (with English language translation).
Office Action issued Nov. 12, 2013 in Japanese Patent Application No. 2011-070482 (with English language translation).
Extended European Search Report issued Aug. 11, 2014 in Patent Application No. 12760433.8.
Office Action issued Jan. 6, 2015 in Chinese Patent Application No. 201280013344.5 (with English language translation).

* cited by examiner

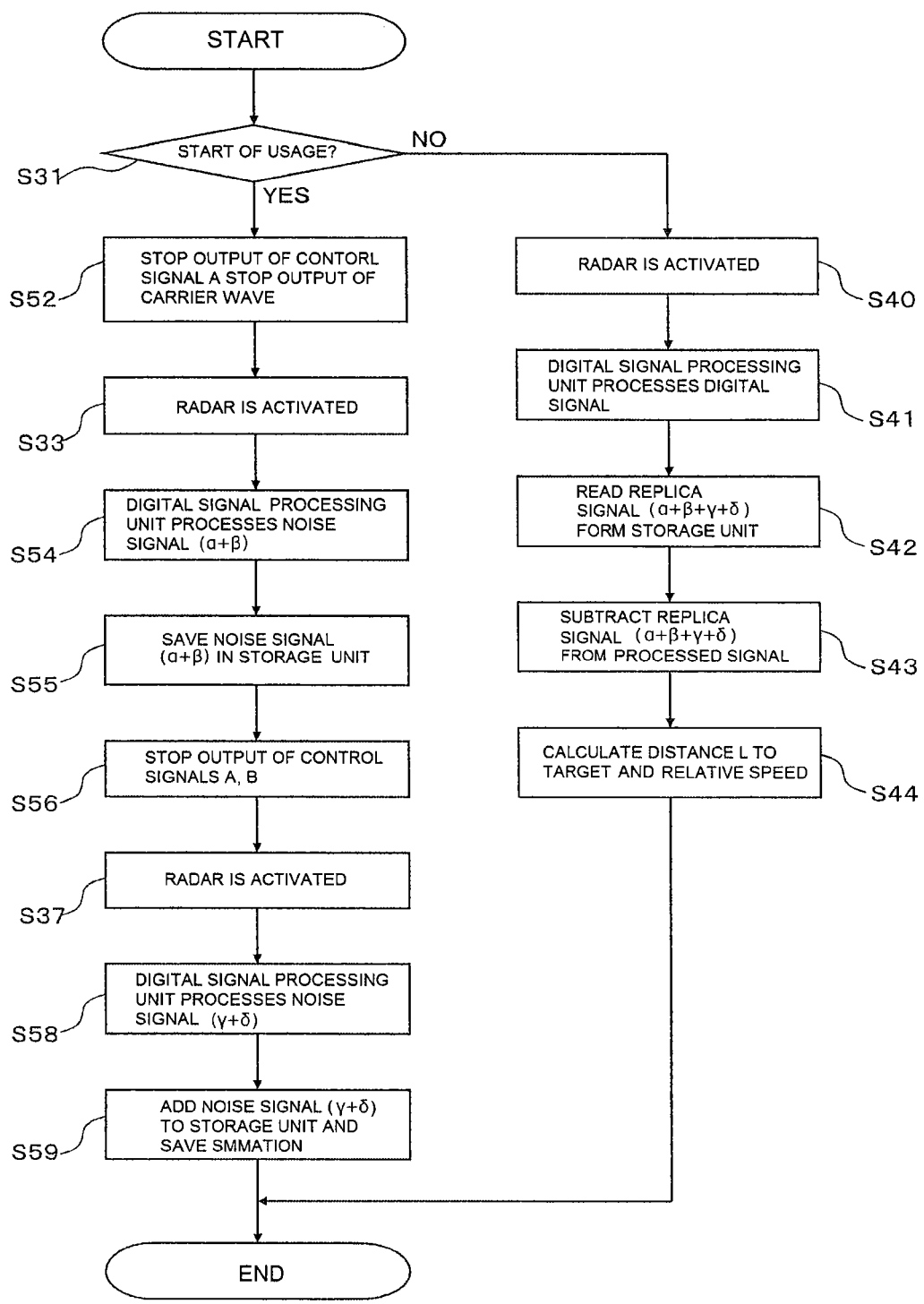

PULSE RADAR APPARATUS AND CONTROL METHOD FOR THE SAME

TECHNICAL FIELD

The present invention relates to a radar apparatus, and more particularly to a vehicle-mounted pulse radar apparatus and a control method therefor for measuring a distance to a target by emitting a pulse signal from the apparatus and measuring a round trip time until the signal is reflected by the target and received by the apparatus again.

BACKGROUND ART

A generally-available pulse radar apparatus includes a radio frequency transmission unit that generates a pulse-shape transmission signal by gating a carrier frequency for a very short period of time by modulating a carrier wave of a radio frequency, a transmission antenna that radiates the transmission signal generated by the radio frequency transmission unit as a radio wave into the space, a reception antenna that receives a reflected wave which the radio wave emitted from the transmission antenna reflected and returned back from a target, a radio frequency reception unit that receives a reception signal from the reception antenna and down-converts the reception signal into a baseband signal, and a baseband unit that receives the baseband signal from the radio frequency reception unit and calculates the distance and the like to the target.

The radio frequency transmission unit includes an oscillation apparatus that generates a carrier wave of a predetermined frequency and a switch and the like for gating the carrier wave generated by the oscillation apparatus into a pulse-shape. The radio frequency reception unit includes a correlation apparatus that obtains correlation between the transmission signal and the reception signal and an IQ mixer that down-converts the output signal of the correlation apparatus into a baseband signal. The baseband unit includes an A/D conversion unit that converts the baseband signal given by the radio frequency reception unit from analog signal into digital signal, a digital signal processing unit that processes the digital signal provided by the A/D conversion unit to calculate the relative speed of the target and the distance to the target, and a control unit that controls the pulse radar apparatus. The control unit controls the ON/OFF state of the correlation apparatus of the radio frequency reception unit and the switch of the radio frequency transmission unit.

As explained above, the pulse radar apparatus includes the radio frequency transmission unit and the radio frequency reception unit that process the radio frequency signal (hereinafter, both of which will be collectively referred to as RF unit) and the baseband unit that processes a low frequency signal. Among them, the RF unit needs to use an expensive circuit board capable of supporting a radio frequency, and therefore, conventionally, in order to reduce the cost, only the RF unit is usually provided on the circuit board capable of supporting the radio frequency, and the baseband unit is usually provided on a less expensive circuit board. A small and inexpensive multi-pin connector has been conventionally used as means for connecting the RF unit with the baseband unit provided on separate circuit boards.

As described above, when the baseband unit and the RF unit formed on separate circuit boards are connected to each other by a cheap and integrated multi-pin connector, there is a problem in that the control signal leaks into the reception signal as an interference noise signal. As described above, when an undesired wave such as the control signal generated secondarily in the multi-pin connector leaks into the reception signal to make the interference noise signal, and a sufficient level of reception strength cannot be obtained, there is a problem in that the desired reception signal is buried in the interference noise signal. Therefore, the amount of signal of the interference noise signal is conventionally reduced by increasing isolation between the multiple pins as much as possible, so as to allow detection of a reception signal having a low reception strength.

Such an interference noise signal exists in various kinds of radar apparatuses although the cause of occurrence is different, and there is a technique for removing the interference noise signal. Patent Literature 1 discloses an interference noise signal reduction processing for a steady-state noise component overlaid on a reception signal (component of which changes of frequency and level are low in terms of time) in an FM-CW radar. The steady-state noise component is memorized, and it is subtracted from the spectrum distribution of the reception signal, whereby a target is detected.

Patent Literature 2 discloses a technique for detecting a target with a high degree of accuracy by obtaining, as a replica signal, an interference noise signal, a self mixing noise, and the like of the pulse radar apparatus, and removing them from observation data.

CITATION LIST

Patent Literatures

Patent Literature 1: JP No. H7-151852 A
Patent Literature 2: Japanese Patent Application No. 2010-051681

SUMMARY OF INVENTION

Technical Problem

However, a vehicle-mounted radar is often implemented on a small circuit board, and therefore, there is a problem in that is extremely difficult to sufficiently ensure isolation between pins of the multi-pin connector. In order to prevent interference between signals, the signal lines may be connected with completely independent coaxial lines, but when a plurality of coaxial lines are used to connect the RF unit and the baseband unit, the cost increases, and the mechanical arrangement becomes complicated, and therefore, there is a problem in that the production becomes difficult.

In a case of a pulse radar apparatus, when a correlation apparatus is used at a reception side in particular, a signal which is output from an oscillation apparatus passes through an IQ mixer of a radio frequency reception unit, and is reflected by the correlation apparatus, and then it is down-converted by the IQ mixer again, and this may cause a problem in that self mixing noise is generated. In particular, a signal from a target located far from the pulse radar apparatus has a small amplitude, and therefore, it may be buried in the interference noise signal and the self mixing noise.

Further, the technique disclosed in Patent Literature 1 is a method for subtracting a low level interference noise signal, and therefore, there is a problem in that the technique disclosed in Patent Literature 1 cannot be applied to an interference noise signal of a level higher than the reception signal.

In the technique disclosed in Patent Literature 2, there is a problem in that it is impossible to carry out detection of a target until a replica signal such as a noise signal is obtained.

The present invention is made in view of the above problems, and it is an object of the present invention to provide a pulse radar apparatus and a control method therefor, wherein a multi-pin connector can be used by generating a replica signal of a noise signal to remove it from a reception signal, whereby the size of the apparatus is reduced, and an interference noise signal which is more than a reception signal strength is reduced, and the replica of the interference noise signal is updated at a fast speed, so that an object can be detected reliably.

Solution to Problem

In order to solve the above problems, a first aspect of a control method for a pulse radar apparatus of the present invention is a control method for a pulse radar apparatus providing information by detecting information about a target in a predetermined discovery distance with an update period which is set in advance. The control method includes a transmission signal processing step of gating a carrier wave of a predetermined frequency into a pulse-shape in accordance with two or more transmission control signals, and generating a transmission signal when all the two or more transmission control signals are output; a transmission step of radiating the transmission signal as a radio wave to space, a reception step of receiving a reflected wave generated when the radio wave is reflected by the target; a unit sampling processing step of repeating the transmission signal processing step, the transmission step, and the reception step at a plurality of times with a predetermined repetition period, and obtaining distance data by sampling the reception signals for each measurement distance in accordance with a reception control signal; a unit noise processing step of obtaining a noise signal included in each of the distance data; a replica signal generation step of updating a replica signal using the noise signal obtained in the unit noise processing step; and a target information detection step of performing the unit sampling processing step by a first setting number of times while the measurement distance is changed, thereby obtaining all the distance data within the discovery distance, and detecting the information about the target by subtracting the replica signal from all of the distance data. In a first period in the update period, the target information detection step is performed, in a second period except the first period in the update period, the unit noise processing step is performed by a predetermined number of times while an output condition and/or the measurement distance of the transmission control signal used in the transmission signal processing step are changed, and the unit noise processing step is repeatedly performed until all the noise signals for all the distance data are obtained, and further, processing for obtaining all the noise signals for all the distance data is repeatedly performed.

In another aspect of a control method for a pulse radar apparatus of the present invention, when the transmission control signals are X1 to Xm (m≥2), the unit noise processing step is performed such that, when, among the transmission control signals, the i-th transmission control signal Xi is not output, and the transmission control signal other than that and the reception control signal are output, the transmission signal processing step, the transmission step, and the reception step are repeated a plurality of times with the repetition period, and the signal obtained through sampling for each measurement distance in accordance with the reception control signal at this occasion is saved as a noise signal for each distance data for the i-th background signal; and when all of the m transmission control signals are not output, and the reception control signal is output, the transmission signal processing step, the transmission step, and the reception step are repeated a plurality of times with the repetition period, and the signal obtained through sampling for each measurement distance in accordance with the reception control signal at this occasion are saved as a noise signal for each distance data of the (m+1)-th background signal.

In another aspect of a control method for a pulse radar apparatus of the present invention, the replica signal generation step is performed such that the replica signal is calculated by adding the first to the m-th background signals including all the noise signals for each distance data, subtracting the (m+1)-th background signal, and dividing a result by (m−1).

In another aspect of a control method for a pulse radar apparatus of the present invention, at a start of usage, the unit noise processing step is performed until all the noise signals for all the distance data are obtained, and further, an initial value of the replica signal is generated by performing the replica signal generation step.

A first aspect of a pulse radar apparatus of the present invention is a pulse radar apparatus providing information by detecting information about a target in a predetermined discovery distance with an update period which is set in advance. The pulse radar apparatus includes: a radio frequency transmission unit that includes an oscillation apparatus for generating a carrier wave of a predetermined frequency, and gates the carrier wave into a pulse-shape in accordance with two or more transmission control signals, and generates a transmission signal when all the two or more transmission control signals are output; a transmission antenna that receives the transmission signal from the radio frequency transmission unit, and radiates it as a radio wave to space; a reception antenna that receives a reflected wave generated when the radio wave is reflected by the target; a radio frequency reception unit that receives the reception signal from the reception antenna, and obtains correlation of the reception signal with the transmission signal in accordance with the reception control signal, and converts it into a baseband signal; and a baseband unit that includes an A/D conversion unit for receiving the baseband signal and converting it into a digital signal; a digital signal processing unit for receiving the digital signal from the A/D conversion unit, and detecting the target information; a control unit for outputting the transmission control signal to the radio frequency transmission unit and outputting the reception control signal to the radio frequency reception unit; and a radar function switching unit for controlling operation of the digital signal processing unit and the control unit. The digital signal processing unit further includes: a unit sampling processing unit that receives the digital signal and obtains distance data by performing sampling for each measurement distance; a replica signal generation unit that obtains a noise signal included in the distance data and updates the replica signal; and a target information detection unit that obtains all the distance data within the discovery distance from the unit sampling processing unit, and detects the target information by subtracting the replica signal from all the distance data. When the transmission control signals are X1 to Xm (m≥2), and among the transmission control signals, the control unit does not output the i-th transmission control signal Xi and outputs the transmission control signal other than that and the reception control signal, the distance data obtained by the unit sampling processing unit at this occasion are adopted as a noise signal for each distance data, and when a signal including all the noise signals for each distance data within the discovery distance is adopted as the i-th background signal, the replica signal generation unit calculates the replica signal by adding the first to the m-th background signals, subtracting the (m+1)-th background signal, and dividing the result by (m−1), the radar function switching unit executes the target information detection unit in a first period in the update period, and the radar function switching unit executes the replica signal generation unit in a second period other than the first period in the update period.

Another aspect of a control method for a pulse radar apparatus of the present invention includes a signal gating step of gating a carrier wave of a predetermined frequency into a pulse-shape in accordance with two or more transmission control signals, and generating a transmission signal; a transmission step of radiating the transmission signal as a radio wave to space; a reception step of receiving a reflected wave generated when the radio wave is reflected by the target; a correlation step that obtains correlation between the transmission signal and the reception signal received in the reception step in accordance with a reception control signal; a down-convert step of down-converting an output signal of the correlation step, and outputting a baseband signal, an A/D conversion step of receiving the baseband signal and converting it into a digital signal; and a digital signal processing step of receiving the digital signal, and selectively performing one of replica signal generation processing for generating a replica signal of a noise signal included in the digital signal and target information detection processing for detecting information about the target by subtracting the replica signal from the digital signal. The digital signal processing unit performs the target information detection processing, the signal gating step is performed in a first pulse repetition period, and when the digital signal processing unit is to perform the replica signal generation processing, the signal gating step is performed in a second pulse repetition period which is shorter than the first pulse repetition period.

In another aspect of a control method for a pulse radar apparatus of the present invention, when the transmission control signals are X1 to Xm (m≥2), and in the signal gating step, among the transmission control signals, the i-th transmission control signal Xi is not output and the transmission control signal other than that and the reception control signal are output, a digital signal obtained in the A/D conversion step at this occasion is adopted as the i-th background signal, in this case, in the replica signal generation processing performed in the digital signal processing step, when the transmission control signals are successively selected from X1 to Xm as the i-th transmission control signal Xi, and the transmission control signal except Xi and the reception control signal are output in the signal gating step, digital signals obtained in the A/D conversion step are obtained as the first to the m-th background signals, and further, in the signal gating step, all of the m transmission control signals are not output, and the reception control signal is output, a digital signal obtained in the A/D conversion step is obtained as the (m+1)-th background signal, and a replica signal is generated by adding the first to the m-th background signals, subtracting the (m+1)-th background signal, and dividing the result by (m−1), and in the target information detection processing, when the m transmission control signals and the reception control signal are output in the signal gating step, low noise signal is calculated by subtracting the replica signal from the digital signal obtained in the A/D conversion step, and the target information is detected on the basis of the low noise signal.

Another aspect of a pulse radar apparatus of the present invention includes a radio frequency transmission unit that includes an oscillation apparatus that generates a carrier wave of a predetermined frequency, and generates a transmission signal by gating the carrier wave into a pulse-shape in accordance with two or more transmission control signals; a transmission antenna that receives the transmission signal from the radio frequency transmission unit and radiates it as a radio wave into space; a reception antenna that receives a reflected wave made when the radio wave is reflected by a target; a radio frequency reception unit that includes a correlation unit that receives the reception signal from the reception antenna and obtains correlation of the reception signal with the transmission signal in accordance with the reception control signal, and a down-convert unit that down-converts an output signal given by the correlation unit into a baseband signal; and a baseband unit that includes an A/D conversion unit for receiving the baseband signal and converting it into a digital signal, a digital signal processing unit for receiving the digital signal from the A/D conversion unit and selectively performing any one of replica signal generation processing for generating a replica signal of a noise signal included in the digital signal and target information detection processing for detecting information about the target by subtracting the replica signal from the digital signal, a control unit for outputting the transmission control signal to the radio frequency transmission unit and outputting the reception control signal to the correlation unit, and a radar function switching unit for giving the digital signal processing unit a command to perform the target information detection processing and the replica signal generation processing; and giving the control unit a command of a pulse repetition period with which the radio frequency transmission unit generates the transmission signal. The radar function switching unit gives the control unit a command of a first pulse repetition period as the pulse repetition period when the command of the target information detection processing is given the digital signal processing unit, and when the command of the replica signal generation processing is given, the radar function switching unit gives the control unit a command of a second pulse repetition period shorter than the first pulse repetition period.

In another aspect of a pulse radar apparatus of the present invention, the digital signal processing unit includes a target information detection unit for performing the target information detection processing, a replica signal generation unit for performing the replica signal generation processing, and a selection unit for selecting any one of the target information detection unit and the replica signal generation unit in accordance with the command given by the radar function switching unit and outputting the digital signal which is received from the A/D conversion unit.

In another aspect of a pulse radar apparatus of the present invention, when the transmission control signals are X1 to Xm (m≥2), and the i-th transmission control signal Xi of the transmission control signals is not output from the control unit, and the transmission control signal other than that and the reception control signal are output, a digital signal which is output from the A/D conversion unit at this occasion is adopted as the i-th background signal, and further, when all the m transmission control signals are not output, and the reception control signal is output, a digital signal which is output from the A/D conversion unit at this occasion is adopted as the (m+1)-th background signal, the control unit performs as follows: when the control unit receives a command of the second pulse repetition period from the radar function switching unit, and the control unit successively selects the transmission control signals from X1 to Xm as the i-th transmission control signal Xi, and outputs, to the radio frequency transmission unit, the transmission control signal other than Xi and the reception control signal and further does not output all the m transmission control signals, and outputs the reception control signal, when a command of the first pulse repetition period is received from the radar function switching unit, the m transmission control signals and the reception control signal are output to the radio frequency transmission unit, when a command of the replica signal generation processing is received from the radar function switching unit, the digital signal processing unit obtains the digital signal received from the A/D conversion unit as the first to (m+1)-th background signal in order, and the replica signal is generated by adding the first to m-th background signals, subtracting the (m+1)-th background signal, and dividing the result by (m−1), and when a command of the target information detection processing is received from the radar function switching unit, low noise signal is calculated by subtracting the replica signal from the digital signal received from the A/D conversion unit, and the target information is detected on the basis of the low noise signal.

Another aspect of a pulse radar apparatus of the present invention includes a radio frequency transmission unit that includes an oscillation apparatus for generating a carrier wave of a predetermined frequency, gates the carrier wave into a pulse-shape in accordance with two or more transmission control signals, and generates a transmission signal when all the two or more transmission control signals are output; a transmission antenna that receives the transmission signal from the radio frequency transmission unit and radiates it as a radio wave into space; a reception antenna that receives a reflected wave made when the radio wave is reflected by a target; a radio frequency reception unit that receives the reception signal from the reception antenna and obtains correlation of the reception signal with the transmission signal in accordance with the reception control signal, and converts it into a baseband signal; and a baseband unit that includes an A/D conversion unit for receiving at least the baseband signal and converting it into a digital signal, a digital signal processing unit for receiving the digital signal from the A/D conversion unit, and calculating a distance to the target and/or the relative speed of the target and/or an angle of the target, and a control unit for outputting the transmission control signal to the radio frequency transmission unit and outputting the reception control signal to the radio frequency reception unit. When the control unit does not output some or all of the two or more transmission control signals, and outputs the transmission control signal other than that and the reception control signal, the digital signal processing unit obtains the digital signal which is output from the A/D conversion unit as a first background signal, and when the control unit outputs only some or all of the transmission control signals, the digital signal processing unit obtains the digital signal which is output from the A/D conversion unit as a second background signal, and adds the first background signal and the second background signal, thus calculating a replica signal, when the control unit outputs all of the two or more transmission control signals and the reception control signal and the oscillation apparatus outputs the carrier wave, low noise signal is calculated by subtracting the replica signal from the digital signal which is output from the A/D conversion unit at this occasion, and the distance to the target and/or the relative speed of the target and/or the angle of the target are calculated on the basis of the low noise signal.

In another aspect of a pulse radar apparatus of the present invention, when the first background signal is obtained, the oscillation apparatus outputs the carrier wave, and when the second background signal is obtained, the oscillation apparatus stops the output of the carrier wave.

In another aspect of a pulse radar apparatus of the present invention, when the first background signal is obtained and when the second background signal is obtained, the oscillation apparatus outputs the carrier wave.

In another aspect of a pulse radar apparatus of the present invention, the digital signal processing unit performs Fourier transform processing on the digital signal which is received from the A/D conversion unit, and when the control unit outputs all of the two or more transmission control signals and the reception control signal, and the oscillation apparatus outputs the carrier wave, Fourier component corresponding to 0 Hz of the replica signal is subtracted from Fourier component corresponding to 0 Hz of the digital signal which is output from the A/D conversion unit, whereby the low noise signal is calculated.

In another aspect of a pulse radar apparatus of the present invention, at least the baseband unit is formed on a first circuit board, and the radio frequency transmission unit and the radio frequency reception unit are formed on another circuit board different from the first circuit board, a line connection unit of a multi-pin connector collectively connecting, in an energized state, a signal line transmitting the baseband signal and control lines transmitting the two or more transmission control signals and the reception control signal is provided between the first circuit board the another circuit board, and connection of the control line and connection of the signal line in the line connection unit are arranged in a separated manner so that a level of a leaking signal from the control line to the signal line stays within a dynamic range of the A/D conversion unit.

In another aspect of a pulse radar apparatus of the present invention, the radio frequency transmission unit further includes a first gate unit for gating the carrier wave into a pulse-shape in accordance with a first control signal and a second gate unit generating the transmission signal by further gating the signal, which has been gated by the first gate unit, in accordance with a second control signal, and the radio frequency reception unit includes a correlation unit that receives the reception signal from the reception antenna and obtains correlation of the reception signal with the transmission signal in accordance with a third control signal, and a down-convert unit that down-converts an output signal given by the correlation unit into a baseband, and outputs the baseband signal. The control unit controls ON/OFF states of the first gate unit, the second gate unit, and the correlation unit by outputting the first control signal, the second control signal, and the third control signal, respectively, and the digital signal processing unit calculates the replica signal with the two or more transmission control signal being two signals, i.e., the first control signal and the second control signal and with the reception control signal being the third control signal.

In another aspect of a pulse radar apparatus of the present invention, when the control unit does not output any one of the first control signal and the second control signal, and outputs the other thereof and the third control signal, the digital signal which is output from the A/D conversion unit at that moment is adopted as the first background signal, and when the control unit outputs any one of the first control signal and the second control signal, the digital signal which is output from the A/D conversion unit at that moment is adopted as the second background signal, and the digital signal processing unit calculates the replica signal.

In another aspect of a pulse radar apparatus of the present invention, when the control unit does not output both of the first control signal and the second control signal, and outputs the third control signal, the digital signal which is output from the A/D conversion unit at that moment is adopted as the first background signal, and when the control unit outputs only both of the first control signal and the second control signal, the digital signal which is output from the A/D conversion unit at that moment is adopted as the second background signal, and the digital signal processing unit calculates the replica signal.

In another aspect of a pulse radar apparatus of the present invention, when the first background signal is obtained, the oscillation apparatus outputs the carrier wave, and when the second background signal is obtained, the oscillation apparatus stops the output of the carrier wave.

In another aspect of a pulse radar apparatus of the present invention, when the first background signal is obtained and when the second background signal is obtained, the oscillation apparatus outputs the carrier wave.

In another aspect of a pulse radar apparatus of the present invention, when the control unit outputs the first control signal, the second control signal, and the third control signal, and the oscillation apparatus outputs the carrier wave, the digital signal processing unit calculates the low noise signal by subtracting Fourier component corresponding to 0 Hz of the replica signal from Fourier component corresponding to 0 Hz of the digital signal which is output from the A/D conversion unit.

In another aspect of a pulse radar apparatus of the present invention, the baseband unit is formed on a low frequency circuit board corresponding to an operation frequency band of the baseband unit, the radio frequency transmission unit and the radio frequency reception unit are formed on a radio frequency circuit board corresponding to an operation frequency band of the radio frequency transmission unit and the radio frequency reception unit, and a line connection unit of a multi-pin connector collectively connecting, in an energized state, a signal line transmitting the baseband signal, and the first control line, the second control line, and the third control line transmitting the first control signal, the second control signal, and the third control signal is provided between the low frequency circuit board and the radio frequency circuit board, and connection of the control line and connection of the signal line in the line connection unit are arranged in a separated manner so that a level of a leaking signal from the control line to the signal line stays within a dynamic range of the A/D conversion unit.

Another aspect of a control method for a pulse radar apparatus of the present invention includes: a carrier wave generation step of generating a carrier wave of a predetermined frequency; a signal gating step of generating a transmission signal by gating the carrier wave into a pulse-shape in accordance with two or more transmission control signals; a transmission step of radiating the transmission signal as a radio wave into space; a reception step of receiving a reflected wave made when the radio wave is reflected by a target; a correlation step of obtaining correlation between the transmission signal and the reception signal received in the reception step in accordance with the reception control signal; a down-convert step of obtains a baseband signal by down-converting an output signal in the correlation step into a baseband; and an A/D conversion step of receiving at least the baseband signal and converting it into a digital signal, and a digital signal processing step of receiving the digital signal, and calculating the distance to the target and/or the relative speed of the target and/or the angle of the target. In the digital signal processing step, when, in the signal gating step, some or all of the two or more transmission control signals are not output, and the other transmission control signal is output, and in the correlation step, the reception control signal is output, a digital signal which is obtained in the A/D conversion step at this occasion is obtained as the first background signal, and when, in the signal gating step, only some or all of the transmission control signals are output, a digital signal obtained in the A/D conversion step is obtained as the second background signal, and the replica signal is calculated by adding the first background signal and the second background signal, and when, in the signal gating step, all of the two or more transmission control signals are output, and in the correlation step, the reception control signal is output and the carrier wave generation step is performed, a low noise signal is calculated by subtracting the replica signal from a digital signal obtained in the A/D conversion step at this occasion, and the distance to the target and/or the relative speed of the target and/or the angle of the target are calculated on the basis of the low noise signal.

According to another aspect of a control method for a pulse radar apparatus of the present invention, when the first background signal is obtained, the carrier wave generation step is performed, and when the second background signal is obtained, the carrier wave generation step is not performed.

According to another aspect of a control method for a pulse radar apparatus of the present invention, when the first background signal is obtained, and when the second background signal is obtained, the carrier wave generation step is performed.

According to another aspect of a control method for a pulse radar apparatus of the present invention, in the digital signal processing step, Fourier transform processing is performed on the digital signal converted in the A/D conversion step, and when, in the signal gating step, all of the two or more transmission control signals are output, and in the correlation step, the reception control signal is output and the carrier wave generation step is performed, the low noise signal is calculated by subtracting Fourier component corresponding to 0 Hz of the replica signal from Fourier component corresponding to 0 Hz of the digital signal obtained in the A/D conversion step. In a pulse radar apparatus of the present invention, m (m≥2) control signals (hereinafter referred to as transmission control signals) are used to generate a transmission signal, and one or more control signals (hereinafter referred to as a reception control signals) are used to process a reception signal. In the explanation below, for the sake of simplicity of explanation, two transmission control signals (m=2) are used, and one reception control signal is used. However, the embodiment is not limited thereto. Three or more transmission control signals may be used, and two or more reception control signals may be used.

In another aspect of a control method for a pulse radar apparatus of the present invention, the signal gating step includes a first gating step of gating the carrier wave into a pulse-shape in accordance with the first control signal, and a second gating step of generating a transmission signal by further gating the signal, which has been gated in the first gating step, in accordance with the second control signal. In the correlation step, correlation between the reception signal and the transmission signal is obtained in accordance with the third control signal. In the digital signal processing step, the replica signal is calculated with the two or more transmission control signal being two signals, i.e., the first control signal and the second control signal and with the reception control signal being the third control signal.

According to another aspect of a control method for a pulse radar apparatus of the present invention, the digital signal processing step is performed such that, when, in the signal gating step, any one of the first control signal and the second control signal is not output and the other thereof is output, and the third control signal is output in the correlation step, a digital signal obtained in the A/D conversion step at this occasion is adopted as the first background signal, and when only any one of the first control signal and the second control signal is output in the signal gating step, a digital signal obtained in the A/D conversion step at this occasion is adopted as the second background signal, and thus, the replica signal is calculated.

In another aspect of a control method for a pulse radar apparatus of the present invention, the digital signal processing step is performed such that when, in the signal gating step, neither the first control signal nor the second control signal are output, and the third control signal is output in the correlation step, a digital signal obtained in the A/D conversion step at this occasion is adopted as the first background signal, and when, in the signal gating step, only both of the first control signal and the second control signal are output, a digital signal obtained in the A/D conversion step at this occasion is adopted as the second background signal, and thus, the replica signal is calculated.

In another aspect of a control method for a pulse radar apparatus of the present invention, when the first background signal is obtained, the carrier wave generation step is performed, and when the second background signal is obtained, the carrier wave generation step is not performed.

In another aspect of a control method for a pulse radar apparatus of the present invention, when the first background signal is obtained, and when the second background signal is obtained, the carrier wave generation step is performed.

In another aspect of a control method for a pulse radar apparatus of the present invention, the low noise signal is calculated by subtracting Fourier component corresponding to 0 Hz of the replica signal from Fourier component corresponding to 0 Hz of the digital signal when the first gating step, the second gating step, and the correlation step are executed.

In a pulse radar apparatus of the present invention, there are an aspect in which the oscillation apparatus outputs the carrier wave when the replica signal is generated, and an aspect in which the carrier wave is not output when the replica signal is generated. Likewise, in a control method for a pulse radar apparatus of the present invention, there are an aspect in which the carrier wave generation step is performed to output the transmission wave when the replica signal is generated, and an aspect in which the transmission wave generation step is not performed and the carrier wave is not output when the replica signal is generated.

Advantageous Effects of Invention

According to the present invention, a pulse radar apparatus and a control method therefor can be provided that can detect information about a target with a high degree of accuracy by allowing detection of target information at all times and updating a replica signal of a noise signal in order.

BRIEF DESCRIPTION OF DRAWINGS

FIG. 32 is a flow diagram illustrating a signal processing method with the pulse radar apparatus according to the second embodiment of the present invention.

DESCRIPTION OF EMBODIMENTS

Figure 1:
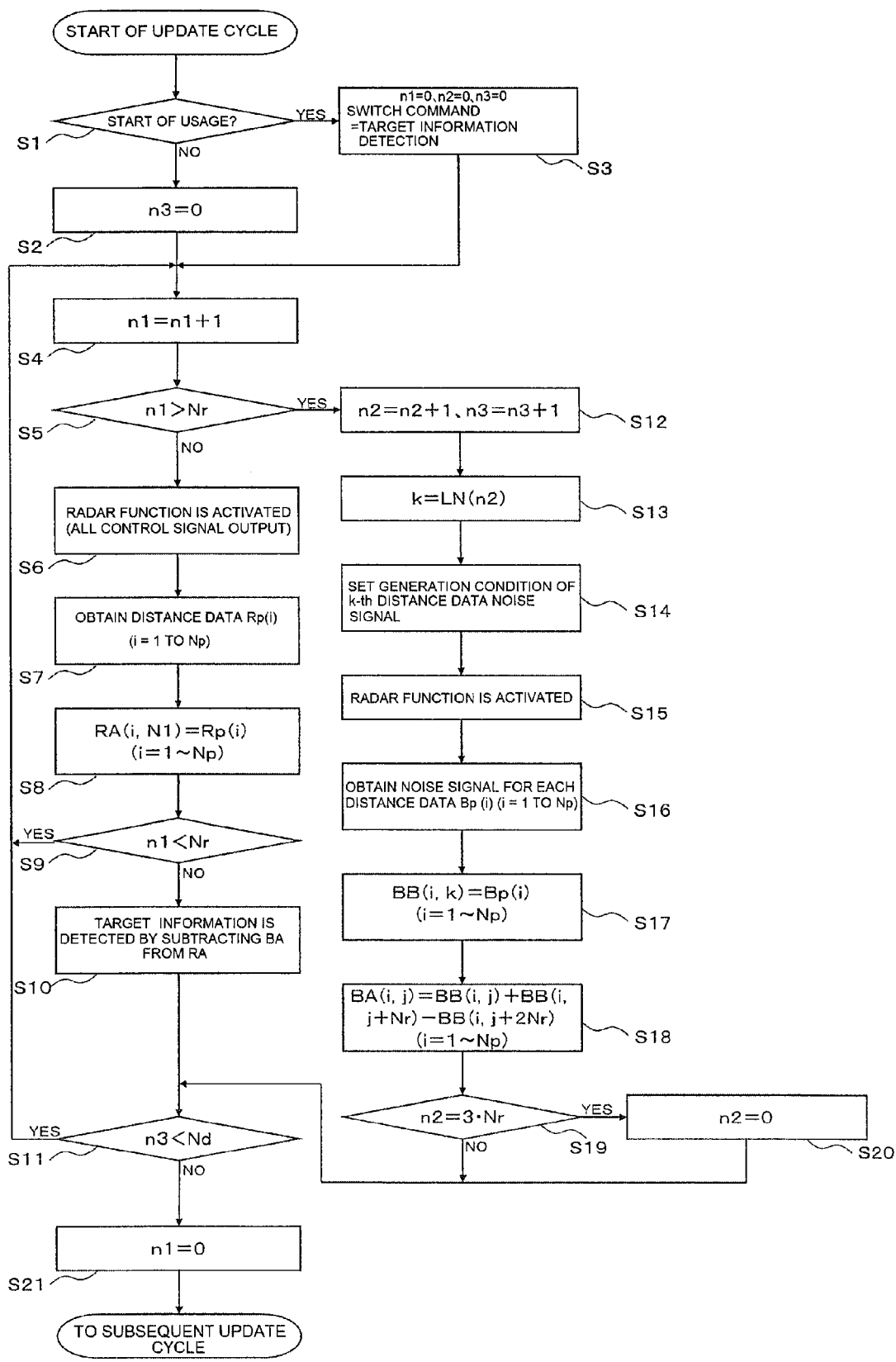
FIG. 1 is a flow diagram illustrating a signal processing method according to a control method for a pulse radar apparatus according to an embodiment of the present invention.

A pulse radar apparatus and a control method therefor according to preferred embodiments of the present invention will be explained in detail with reference to the drawings. Constituent units having the same functions are denoted with the same reference numerals in order to simplify the figures and the explanation. In a pulse radar apparatus of the present invention, m (m≥2) control signals (hereinafter referred to as transmission control signals) are used to generate a transmission signal, and one or more control signals (hereinafter referred to as a reception control signals) are used to process a reception signal. In the explanation below, for the sake of simplicity of explanation, two transmission control signals (m=2) are used, and one reception control signal is used. However, the invention is not limited thereto. Three or more transmission control signals may be used, and two or more reception control signals may be used.

First Embodiment

Figure 2:
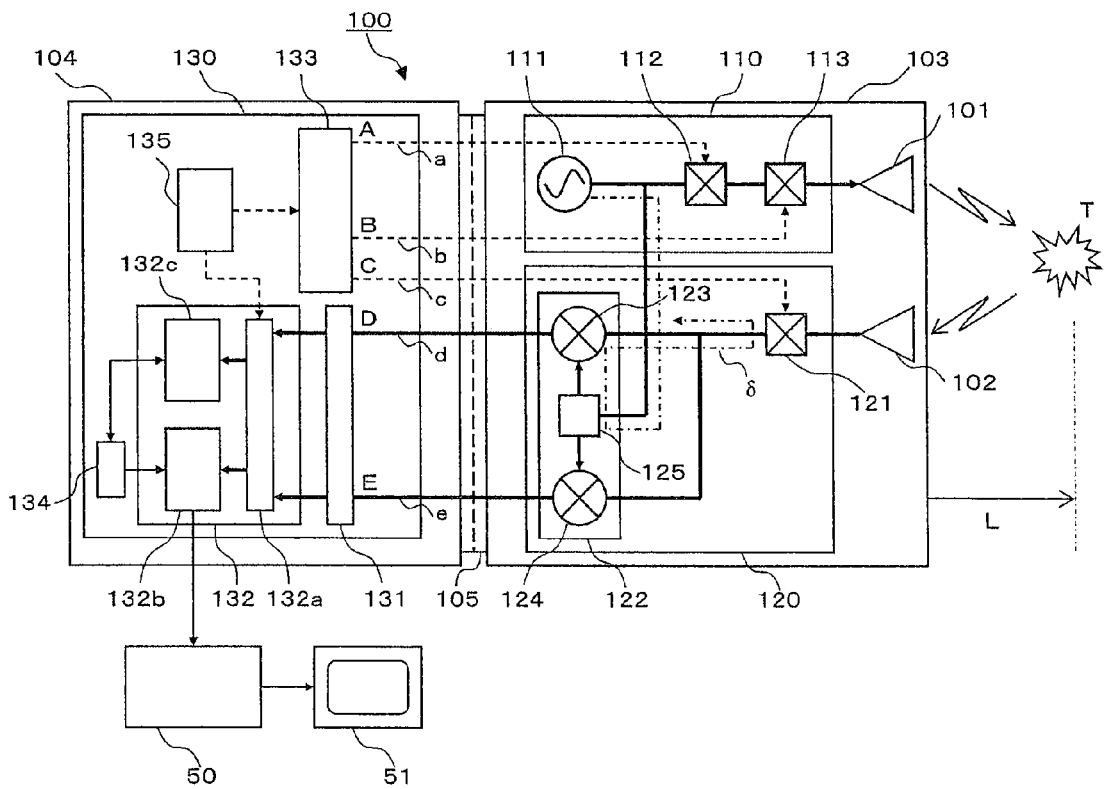
FIG. 2 is a block diagram illustrating a configuration of a pulse radar apparatus according to an embodiment of the present invention.

A pulse radar apparatus of the first embodiment of the present invention will be explained below with reference to FIG. 2. FIG. 2 is a block diagram illustrating a configuration of a pulse radar apparatus 100 according to the present embodiment. In FIG. 2, the pulse radar apparatus 100 includes a radio frequency transmission unit 110 and a radio frequency reception unit 120 for processing a radio frequency signal, a baseband unit 130 for processing a low frequency signal, a transmission antenna 101 for radiating a radio wave into space, and a reception antenna 102 for receiving a reflected wave reflected by a target. In the explanation below, for the sake of easy explanation, the target detected by the pulse radar apparatus 100 is denoted as symbol T.

The radio frequency transmission unit 110 includes an oscillation apparatus 111 generating a predetermined radio frequency signal (carrier wave) which is a source of generation of a transmission signal of an electromagnetic wave and a first gate unit 112 and a second gate unit 113 for gating the radio frequency signal generated by the oscillation apparatus 111 into a pulse-shape signal in a predetermined time width (pulse signal). The first gate unit 112 and the second gate unit 113 are circuits for gating the radio frequency signal which is input from the oscillation apparatus 111 into a pulse signal of, for example, 1 [ns] width. A frequency multiplier and a switch can be used as the first gate unit 112 and the second gate unit 113. Two signal gating circuits including the first gate unit 112 and the second gate unit 113 are used, and therefore, a pulse signal sharply formed can be generated. The pulse-shape transmission signal which is output from the second gate unit 113 is transmitted to the transmission antenna 101, and is radiated as radio wave from the transmission antenna 101 into the air.

The radio frequency reception unit 120 includes a correlation apparatus 121 for receiving the reception signal received with the reception antenna 102 and obtaining correlation between the reception signal and the transmission signal, and an IQ mixer 122 for down-converting the signal, which is output from the correlation apparatus 121, using the carrier wave received from the oscillation apparatus 111. The IQ mixer 122 includes a first mixer 123 for down-converting the signal into a baseband signal of I component, a second mixer 124 for down-converting the signal into a baseband signal of Q component, and an phase shifter 125 for applying a 90-degree phase difference to the carrier wave received from the oscillation apparatus 111 and outputting it to the first mixer 123 and the second mixer 124. The correlation apparatus 121 retrieves a signal of each measurement distance from the reception signal, and outputs it to the first mixer 123 and the second mixer 124.

The baseband unit 130 includes an A/D conversion unit 131 for receiving I component and Q component of the baseband signal down-converted by the first mixer 123 and the second mixer 124 and converting them into a digital signal, a digital signal processing unit 132 for calculating information about the target T by applying complex signal processing (complex Fourier transform (FFT: Fast Fourier Transform)) on the digital signal given by the A/D conversion unit 131, a control unit 133 for controlling operation of the pulse radar apparatus 100, and a storage unit 134. In addition, a radar function switching unit 135 is also provided to switch operation of the digital signal processing unit 132 and the control unit 133.

In accordance with a switch command given by the radar function switching unit 135, the control unit 133 controls the ON/OFF state of each of the first gate unit 112, the second gate unit 113, and the correlation apparatus 121, which are radio frequency components. When the control unit 133 turns on both of the first gate unit 112 and the second gate unit 113 in accordance with a switch command given by the radar function switching unit 135, the radio frequency transmission unit 110 outputs a transmission signal. The control signal generated by the control unit 133 is a signal of 1 [ns] width.

The pulse radar apparatus 100 of the present embodiment performs not only original signal processing for detecting target information but also signal processing for generating the replica signal of the noise signal. In order to perform processing of target information detection and processing of replica signal generation, the digital signal processing unit 132 is provided with a unit sampling processing unit 132a, a target information detection unit 132b, and a replica signal generation unit 132c. According to a switch command given by the radar function switching unit 135, the unit sampling processing unit 132a outputs processing result to any one of the target information detection unit 132b and the replica signal generation unit 132c.

A control method for detecting target information with the pulse radar apparatus 100 of the present embodiment will be hereinafter explained. In the pulse radar apparatus 100, the radio frequency transmission unit 110 generates a pulse signal of which pulse width is, for example, 1 [ns] width, with a predetermined pulse repetition period (defined as Tp), and this radiated as a transmission signal from the transmission antenna 101. For example, when the pulse repetition period Tp is 1 [μs], the discovery distance with the pulse radar apparatus 100 is up to 150 meters. The reception signal received by the reception antenna 102 is down-converted into a baseband signal by the radio frequency reception unit 120, and is output to the baseband unit 130. In the baseband unit 130, the baseband signal is converted into a digital signal by the A/D conversion unit 131, and thereafter, is input into the digital signal processing unit 132.

In order to detect the target information within the predetermined discovery distance range, the pulse radar apparatus 100 radiates a plurality of transmission signals with the pulse repetition period Tp, processes the reception signal which is the reflected wave of each of them, and obtains all distance data within the discovery distance range. The digital signal processing unit 132 detects the target information from the all distance data. Equivalent sampling method may be used as a method for obtaining the all distance data within the discovery distance range. In this case, a method for obtaining the all distance data within the discovery distance range using the equivalent sampling method will be explained.

When the radio frequency transmission unit 110 outputs a pulse signal, the reflected wave thereof is received, and the correlation apparatus 121 retrieves a signal for each of the plurality of measurement distances. The number of the measurement distances will be hereinafter referred to as Np. The signal for every Np measurement distances can be obtained by deriving correlation between reception signal and transmission signal at each point in time of Np after the pulse signal is output but before subsequent pulse repetition period Tp is reached (hereinafter referred to as sampling point in time). The signal for every Np measurement distances obtained by the correlation apparatus 121 is down-converted into the baseband signal, and is then converted into a digital signal by the A/D conversion unit 131, which is output to the unit sampling processing unit 132a.

In order to obtain a predetermined set of signals for every Np measurement distances explained above, the pulse signal is output for a predetermined number of times with the pulse repetition period Tp while the sampling point in time is unchanged. Then, digital values of the signals for every Np measurement distance obtained from each reception signal are integrated by the unit sampling processing unit 132a for each measurement distance. The digital signal obtained by integrating the signals for every Np measurement distance for a predetermined number of times will be hereinafter referred to as distance data. The distance data obtained by integrating operation by the unit sampling processing unit 132a are output to the target information detection unit 132b when the target information is detected.

When one set of distance data is obtained, subsequently, each of Np sampling points in time is slightly shifted, and the pulse signals are radiated for the predetermined number of times which is the same as the above, and then distance data in which the measurement distance is slightly shifted are obtained. Hereinafter, in the same manner, the pulse signals are radiated for the predetermined number of times while the Np sampling points in time are slightly shifted, whereby the all distance data within the predetermined discovery distance range are obtained. In the explanation below, the number of times until the all distance data is obtained by obtaining each distance data by shifting Np sampling points in time (first setting number of times) will be hereinafter referred to as Nr. More specifically, the all distance data is constituted by Nr sets of distance data. When the all distance data are input into the target information detection unit 132b, the target information detection unit 132b detects the target information on the basis of the all distance data.

In the pulse radar apparatus 100 of the present embodiment configured as described above, each component constituting the radio frequency transmission unit 110 and the radio frequency reception unit 120 operates on a frequency in several dozen GHz band, whereas each component constituting the baseband unit 130 operates on a frequency no more than about 2 GHz. As described above, the operation frequency of the radio frequency transmission unit 110 and the radio frequency reception unit 120 is greatly different from the operation frequency of the baseband unit 130, and therefore, the radio frequency transmission unit 110 and the radio frequency reception unit 120 and the baseband unit 130 are preferably formed on separate circuit boards designed for the respective frequency bands. In the present embodiment, the radio frequency transmission unit 110 and the radio frequency reception unit 120 are formed on a radio frequency circuit board 103, and the baseband unit 130 is formed on a low frequency circuit board 104. The transmission antenna 101 and the reception antenna 102 for transmitting and receiving the radio frequency signal are arranged on the radio frequency circuit board 103.

The circuit board used for radio frequency is more expensive than the circuit board for low frequency, and therefore, in the present embodiment, only the radio frequency transmission unit 110, the radio frequency reception unit 120, the transmission antenna 101, and the reception antenna 102 are arranged on the radio frequency circuit board 103 which is expensive, and the baseband unit 130 for processing the low frequency signal is arranged on a low frequency circuit board 104 which is less expensive. Therefore, the cost of the pulse radar apparatus 100 can be reduced.

As explained above, in order to arrange the components of the pulse radar apparatus 100 on the radio frequency circuit board 103 and the low frequency circuit board 104 in a separated manner, it is necessary to have means for electrically connecting the components on the radio frequency circuit board 103 and the components on the low frequency circuit board 104. In the pulse radar apparatus 100 of the present embodiment, the multi-pin connector 105 which is inexpensive and small and has been conventionally used can be used. The control signal which is output from the control unit 133 on the low frequency circuit board 104 is transmitted to the radio frequency transmission unit 110 and the radio frequency reception unit 120 on the radio frequency circuit board 103 via the connector 105. The baseband signal which is output from the radio frequency reception unit 120 on the radio frequency circuit board 103 is transmitted to the baseband unit 130 on the low frequency circuit board 104 via the connector 105.

As described above, when the control signal and the baseband signal are exchanged using the conventional multi-pin connector 105 between the radio frequency circuit board 103 and the low frequency circuit board 104, the interference noise signal due to the control signal may be mixed into the baseband signal of a low signal strength having information about the target T. In addition, a self mixing noise, that is generated when the carrier wave output from the oscillation apparatus 111 passes through the IQ mixer 122, is reflected by the correlation apparatus 121, and is down-converted again with the IQ mixer 122, is also mixed into the baseband signal. In particular, when the target T is located at a distance, the amplitude level of each reflected signal is low, and therefore, the baseband signal may be buried in the above-described interference noise signal and the self mixing noise.

Accordingly, the pulse radar apparatus 100 of the present embodiment generates a replica signal of an undesired wave such as noise mixed into the baseband signal passing through the connector 105, and removes the replica signal from the baseband signal during detection of the target T. The undesired wave such as self mixing noise and the interference noise signal explained above is considered to change when, for example, ambient temperature changes, or vibration is applied. For this reason, it is preferable to successively update and use the replica signal of the undesired wave, and, for example, it is preferable to update the replica signal with a regular interval.

Figure 3:
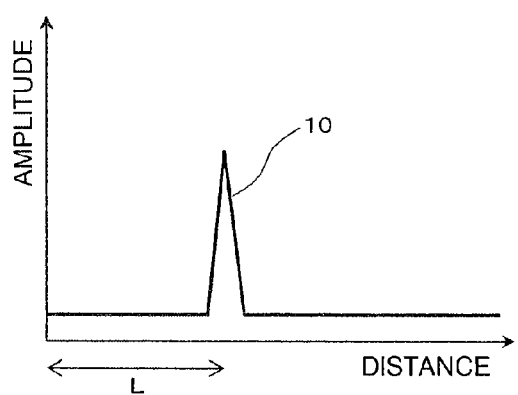
FIG. 3 is a time waveform chart of a signal when there is no influence by noise.
Figure 4:
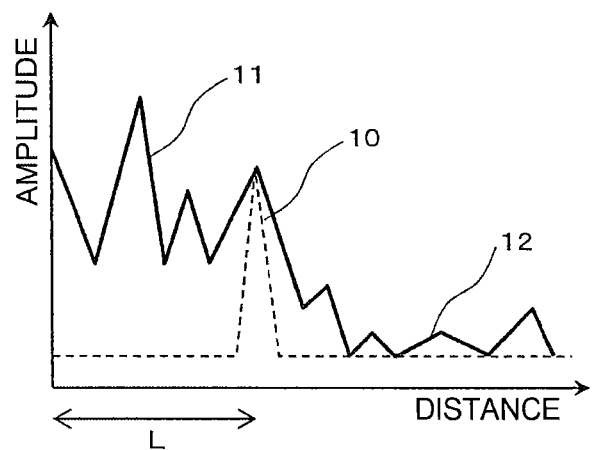
FIG. 4 is a time waveform chart of a signal when a signal of an undesired wave is mixed.

An example of replica signal of the undesired wave will be explained with reference to FIGS. 3 and 4. The transmission antenna 101 radiates a pulse signal generated by the radio frequency transmission unit 110, the reception antenna 102 receives a reflected wave reflected by the target T, and the digital signal processing unit 132 processes it. FIG. 3 is a time waveform chart illustrating an example of signal 10 processed by the digital signal processing unit 132. (It should be noted that the horizontal axis represents a distance corresponding to a time. Hereinafter, this is also applicable to FIGS. 4, and 6 to 9). The waveform of the signal 10 shown in FIG. 3 is a waveform when it is not affected by noise. FIG. 4 illustrates a time waveform chart when the signal of the above-described undesired wave is mixed into the signal 10 as illustrated in FIG. 3. The signal of reference numeral 11 schematically denotes an interference noise signal mixed into the baseband signal at the connector 105, and the signal of reference numeral 12 schematically denotes a self mixing noise.

In the present embodiment, the replica signal of the undesired wave combining the interference noise signal 11 and the self mixing signal 12 as illustrated in FIG. 4 is successively generated, and stored in the storage unit 134. The replica signal saved in the storage unit 134 is updated and replaced with the latest every time generated. Then, when the pulse radar apparatus 100 is activated to detect the target T, the above-described replica signal is subtracted from the signal obtained by causing the baseband unit 130 to receive a signal via the connector 105 from the radio frequency reception unit 120 and causing the digital signal processing unit 132 to process the signal, whereby a signal as illustrated in FIG. 3 (low noise signal) is obtained.

In FIG. 2, a control signal which is output from the control unit 133 to the first gate unit 112 (first control signal) and a control line transmitting it (first control line) are defined as A, a, respectively, and a control signal which is output from the control unit 133 to the second gate unit 113 (second control signal) and a control line transmitting it (second control line) are defined as B, b, respectively, and a control signal which is output from the control unit 133 to the correlation apparatus 121 (third control signal) and a control line transmitting it (third control line) are defined as C, c, respectively. The control signals A, B control the ON/OFF state of the first gate unit 112 and the second gate unit 113, respectively, and the control signal C controls the ON/OFF state of the correlation apparatus 121. In this case, the transmission control signal includes two signals, i.e., the first control signal and the second control signal, and the reception control signal includes one signal, i.e., the third control signal. In the pulse radar apparatus and the control method therefor of the present invention, the numbers of transmission control signals and reception control signals are not limited to the above, and more control signals may be provided therefor.

A baseband signal which is output from the first mixer 123 of the IQ mixer 122 to the A/D conversion unit 131 (I component) and a signal line transmitting it are denoted as D, d, respectively, and a baseband signal which is output from the second mixer 124 to the A/D conversion unit 131 (Q component) and a signal line transmitting it are denoted as E, e, respectively. All of the above-described control lines a, b, c, and the signal lines d, e are passed through different pins of the connector 105.

Hereinafter, operation for causing the pulse radar apparatus 100 to detect the target information will be explained in detail with reference to FIG. 2. When target information detection processing is performed, first, a switch command for instructing target information detection is transmitted from the radar function switching unit 135 to the unit sampling processing unit 132a of the digital signal processing unit 132 and the control unit 133. When the control unit 133 receives the switch command for instructing the target information detection from the radar function switching unit 135, the control unit 133 outputs the control signals A, B to the first gate unit 112 and the second gate unit 113 with appropriate timing via the control lines a, b. When the first gate unit 112 and the second gate unit 113 are energized for substantially 1 [ns] according to the control signals A, B, a carrier wave generated by the oscillation apparatus 111 is gated into a pulse width of 1 [ns]. Accordingly, a transmission signal of 1 [ns] width pulse based on the carrier wave of the predetermined frequency is generated, and this is transmitted to the transmission antenna 101, and is radiated into the air as radio wave. The radiated radio wave is reflected by the target T located at a position away by a distance L, and is received by the reception antenna 102.

When, according to the switch command given by the radar function switching unit 135, the control unit 133 outputs a control signal C to the correlation apparatus 121 with predetermined timing via a control line c, the correlation apparatus 121 is energized, and correlation between the transmission signal and the reception signal received by the reception antenna 102 is obtained. The signal which is output from the correlation apparatus 121 is down-converted into a complex baseband signal by the IQ mixer 122. The baseband signals D, E down-converted by the first mixer 123 and the second mixer 124, respectively, are input into the A/D conversion unit 131 of the baseband unit 130 via the signal lines d, e, and thereby, is converted into a digital signal. The digital signal is output to the unit sampling processing unit 132a of the digital signal processing unit 132.

The unit sampling processing unit 132a generates distance data by integrating the digital signal received from the A/D conversion unit 131 for the predetermined number of times, and outputs the distance data to the target information detection unit 132b according to the switch command given by the radar function switching unit 135. When the target information detection unit 132b receives the distance data from the unit sampling processing unit 132a, and obtains the all distance data within the discovery distance range, then, the complex signal processing is performed to calculate the target information such as relative speed information and position information about the target T. The calculated target information is transferred to a host computer 50, and in this case, a GUI (Graphical User Interface) is used to perform processing for displaying the target information in an easy to see manner, and the result thereof is displayed on a display unit 51. After the target information is updated as described above, the transmission signal is output from the radio frequency transmission unit 110 again, and the target information detection is performed in a subsequent update period.

The control lines a, b, c, and the signal lines d, e as illustrated in FIG. 2 are connected with the connector 105 between the radio frequency circuit board 103 and the low frequency circuit board 104. Each pin (terminal) of the connector 105 is not covered, and therefore, the signal flowing through each terminal sneaks into another terminal to cause interference though it is very low level. The control signals A, B, C flowing through the control lines a, b, c are signals for energizing/deenergizing RF components (the first gate unit 112, the second gate unit 113, the correlation apparatus 121), and have a signal strength of about, for example, 2 to 3 [V]. In contrast, the baseband signals D, E flowing through the signal lines d, e are signals obtained by down-converting a signal of a low strength reflected by the target T, and is a signal of an extremely low strength. For this reason, the control signals A, B, C are signals of relatively extremely high strength as compared with the baseband signals D, E, and the control signals A, B, C leak from the control lines a, b, c into the signal lines d, e at the connector 105.

Figure 5:
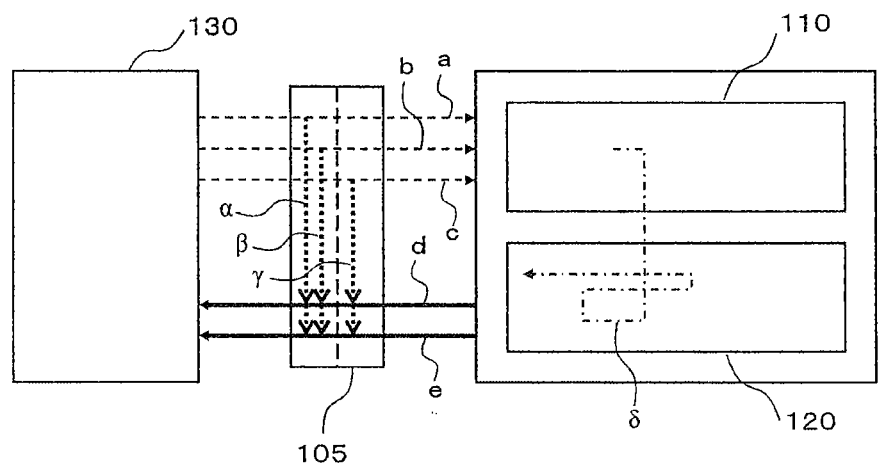
FIG. 5 is an enlarged diagram enlarging and displaying a control line and a signal line of a pulse radar apparatus according to an embodiment of the present invention.

The control lines and the signal line explained above in the pulse radar apparatus 100 are enlarged and shown in FIG. 5. In FIG. 5, the signals sneaking from the control lines a, b, c to the signal lines d, e at the connector 105 are denoted as interference noise signals $\alpha$, $\beta$, $\gamma$, respectively. The interference noise signals $\alpha$, $\beta$, $\gamma$ are the signals having substantially the same strength as the baseband signals D, E passing through the signal lines d, e. In FIG. 5, symbol $\delta$ denotes a self mixing noise which is output from the oscillation apparatus 111, passes through the IQ mixer 122, is reflected by the correlation apparatus 121, and is again down-converted by the IQ mixer 122. This self mixing noise $\delta$ is also mixed into the baseband signals D, E. In this case, the interference noise signals $\alpha$, $\beta$, $\gamma$ are combined with the baseband signals D, E, and the multi-pin connector through which each signal flows is arranged so that the signal strength thereof is at such a level that it is not saturated at the A/D conversion unit 131, i.e., so that as much isolation as possible is ensured between each control signal and the baseband signal.

In the pulse radar apparatus 100 of the present embodiment, the first gate unit 112, the second gate unit 113, and the correlation apparatus 121 are operated with appropriate timing via the control lines a, b, c, so as to successively generate and update the replica signal of the undesired wave including each of the above-described noises mixed into the baseband signals D, E. Then the obtained replica signal of the undesired wave is stored in the storage unit 134, and during detection of the target T, each noise is removed by subtracting the replica signal from the baseband signals D, E obtained by down-converting the reception signal.

In the explanation below, a generation method of the replica signal of the undesired wave will be explained with reference to FIGS. 6 to 9. FIGS. 6 to 9 are figures illustrating examples of a noise signal and a replica signal obtained according to the control method for the pulse radar apparatus of the present embodiment. If the transmission radio wave is radiated into the air from the transmission antenna 101 when the replica signal of the undesired wave is generated, the transmission radio wave may be reflected by some target, and it may be received by the reception antenna 102. When such a reflected wave is received, it is impossible to generate the replica signal of only the undesired wave. For this reason, when the replica signal of the undesired wave is generated, the transmission radio wave is not radiated from the transmission antenna 101.

When the replica signal is generated, a switch command for replica signal generation is transmitted from the radar function switching unit 135 to the control unit 133 and the unit sampling processing unit 132a of the digital signal processing unit 132. First, a signal for commanding a first stage replica signal generation is output from the radar function switching unit 135 to the control unit 133. Accordingly, the control unit 133 operates the radar while the control signals B, C are passed to the control lines b, c and the control signals A flowing through the control line a is stopped as the first stage replica signal generation. In the pulse radar apparatus 100, the pulse signal is output to the transmission antenna 101 only when both of the first gate unit 112 and the second gate unit 113 are turned on. Therefore, if the control signal A is not output to the first gate unit 112 when the radar is activated, the pulse signal is not output to the transmission antenna 101. Therefore, the reception antenna 102 is also unable to receive the reflected wave.

Figure 6:
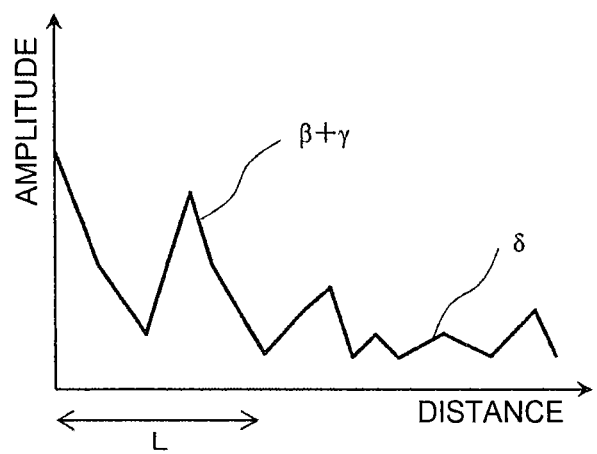
FIG. 6 is a time waveform chart of a noise signal when a control signal is not output to a first gate unit of a pulse radar apparatus according to an embodiment of the present invention.

As a result, the unit sampling processing unit 132a of the digital signal processing unit 132 receives distance data of a noise signal ($\beta+\gamma+\delta$) obtained by combining the self mixing noise $\delta$ and the interference noise signals $\beta$, $\gamma$ made when the control signals B, C are mixed into the signal lines d, e. The distance data is only the noise signal, and is noise signal for each distance data. When the replica signal generation unit 132c receives Nr sets of noise signals for each distance data, of which measurement distance is different, from the unit sampling processing unit 132a, i.e., all the noise signals for each of the distance data, then the replica signal generation unit 132c saves them as the first background signal to the storage unit 134. Accordingly, the first background signal is obtained, which is made of the noise signal ($\beta+\gamma+\delta$) as illustrated in FIG. 6, for example. FIG. 6 is a figure illustrating an example of a time waveform of the noise signal ($\beta+\gamma+\delta$).

When the first stage replica signal generation is finished, subsequently, a signal for commanding a second stage replica signal generation is output from the radar function switching unit 135 to the control unit 133. The control unit 133 operates the radar while the control signals A, C are passed to the control lines a, c and the output of the control signals B flowing through the control line b is stopped as the second stage replica signal generation. In this case, only the first gate unit 112 is turned on, and the second gate unit 113 is not turned on, and therefore, in this case, the pulse signal is not output to the transmission antenna 101, either. Therefore, the reception antenna 102 is also unable to receive the reflected wave.

Figure 7:
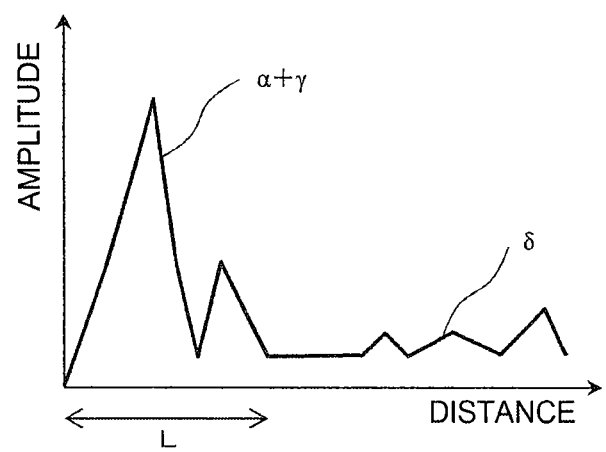
FIG. 7 is a time waveform chart of a noise signal when a control signal is not output to a second gate unit of a pulse radar apparatus according to an embodiment of the present invention.

As a result, the unit sampling processing unit 132a of the digital signal processing unit 132 receives noise signals for each distance data of a noise signal ($\alpha+\gamma+\delta$) obtained by combining the self mixing noise $\delta$ and the interference noise signals $\alpha$, $\gamma$ made when the control signals A, C are mixed into the signal lines d, e. When the replica signal generation unit 132c receives Nr sets of noise signals for each distance data, of which measurement distance is different, from the unit sampling processing unit 132a, then the second background signal is obtained, which is made of the noise signal ($\alpha+\gamma+\delta$) as illustrated in FIG. 7, for example. FIG. 7 is a figure illustrating an example of a time waveform of the noise signal ($\alpha+\gamma+\delta$). The replica signal generation unit 132c saves the noise signal ($\alpha+\gamma+\delta$) of the second background signal thus obtained upon adding it to the noise signal ($\beta+\gamma+\delta$) of the first background signal saved in the storage unit 134.

When the second stage replica signal generation is finished, the radar function switching unit 135 further outputs a signal for commanding a third stage replica signal generation to the control unit 133. The control unit 133 operates the radar while the control signal C is passed to the control line c and the output of both of the control signals A, B flowing through the control lines a, b is stopped as the third stage replica signal generation. In this case, the pulse signal is not output to the transmission antenna 101, either. Therefore, the reception antenna 102 is also unable to receive the reflected wave.

Figure 8:
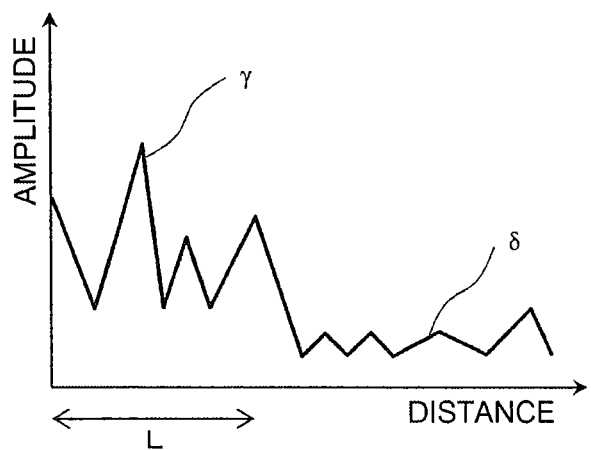
FIG. 8 is a time waveform chart of a noise signal when a control signal is not output to the first gate unit and the second gate unit of a pulse radar apparatus according to an embodiment of the present invention.

As a result, the unit sampling processing unit 132a of the digital signal processing unit 132 receives noise signals for each distance data of a noise signal $(\gamma+\delta)$ obtained by combining the self mixing noise $\delta$ and the interference noise signal $\gamma$ made when the control signal C is mixed into the signal lines d, e. When the replica signal generation unit 132c receives Nr sets of noise signals for each distance data, of which measurement distance is different, from the unit sampling processing unit 132a, then the third background signal is obtained, which is made of the noise signal $(\gamma+\delta)$ as illustrated in FIG. 8, for example. FIG. 8 is a figure illustrating an example of a time waveform of the noise signal $(\gamma+\delta)$. The replica signal generation unit 132c saves the noise signal $(\gamma+\delta)$ of the third background signal thus obtained upon subtracting it from the noise signal saved in the storage unit 134.

As described above, the noise signal $(\alpha+\gamma+\delta)$ of the second background signal is added to the noise signal $(\beta+\gamma+\delta)$ of the first background signal, and the noise signal $(\gamma+\delta)$ of the third background signal is subtracted therefrom, whereby a noise signal obtained by combining all the undesired waves can be calculated as shown in the expression below.

$$(\beta+\gamma+\delta)+(\alpha+\gamma+\delta)-(\gamma+\delta)=\alpha+\beta+\gamma+\delta$$

Figure 9:
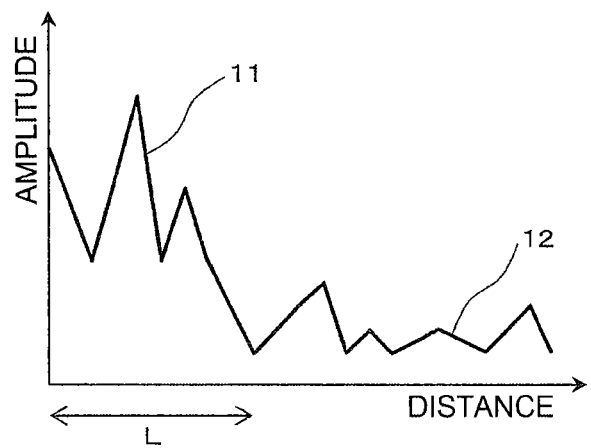
FIG. 9 is a time waveform chart illustrating a replica signal generated by a pulse radar apparatus according to an embodiment of the present invention.

As described above, the replica signal $(\alpha+\beta+\gamma+\delta)$ of the noise signal obtained by combining the interference noise signals $\alpha$, $\beta$, $\gamma$, and the self mixing noise $\delta$ can be saved in the storage unit 134. The time waveform of the replica signal $(\alpha+\beta+\gamma+\delta)$ is obtained by adding the time waveform of FIG. 6 and the time waveform of FIG. 7, and subtracting the time waveform of FIG. 8 therefrom. The time waveform of the replica signal $(\alpha+\beta+\gamma+\delta)$ in this case is shown in FIG. 9.

As explained above, in order to generate the replica signal of the undesired wave, it is necessary to perform, for three times, the same radar operation as the normal target information detection. When there are m transmission control signals, it is necessary to perform, for (m+1) times, the radar operation for generating the replica signal of the undesired wave. In a set of processing of target information detection or in processing of obtaining one background signal, it is necessary to obtain Nr sets of distance data of which measurement distances are different or Nr sets of noise signals for each distance data. When a time required for the unit sampling processing unit 132a to obtain a set of distance data or a noise signal for each distance data is defined as a unit sampling time Tu, then, a time required to perform one set of processing of target information detection or obtain one background signal (defined as first period Ts) is Tu×Nr. For example, when the unit sampling time Tu is 4 [ms], and the number of sets of distance data Nr is 20, then the time Ts required for the target information detection processing is 4 [ms]×20=80 [ms].

In order to generate the replica signal of the undesired wave, it is necessary to perform the process of obtaining the noise signal for each distance data for Nr×3 times, it takes a time of 80 [ms]×3=240 [ms] which corresponds to three times the time Ts required to perform the target information detection processing. During this time, the target information detection processing cannot be performed, and therefore, when the replica signals are generated in order, the target information cannot be appropriately detected, which greatly reduces the radar function.

On the other hand, when a period with which the target information is updated is defined as Tc, it is necessary to determine the setting value in view of the distance for which the target moves during the update period Tc. The pulse radar apparatus 100 transfers the detected target information to a host computer 50 to display it on the display unit 51 in an easy to see manner, and it is necessary to determine the setting value of the update period Tc in view of the time required to transfer the target information and a time required to process GUI data. The time to perform the data transfer and processing is a time in which the target information cannot be updated (unusable even if updated). For example, when the time Ts required for the target information detection processing is 80 [ms], then, the update period Tc may be, for example, 100 [ms] in view of the time required to transfer and process the target information.

When the pulse radar apparatus 100 is used to detect an on-coming automobile, for example, the following case is considered: the relative speed of the on-coming vehicle is 200 [km/h], and the update time Tc is 100 [ms]. In such a case, the on-coming vehicle moves closer about 5.6 meters during the update time Tc. If the on-coming vehicle can be detected in such a distance by which the vehicles move closer, then there would be no problem in terms of safety. Accordingly, in the explanation below, the update period Tc is set at 100 [ms], for example.

Figure 10A:
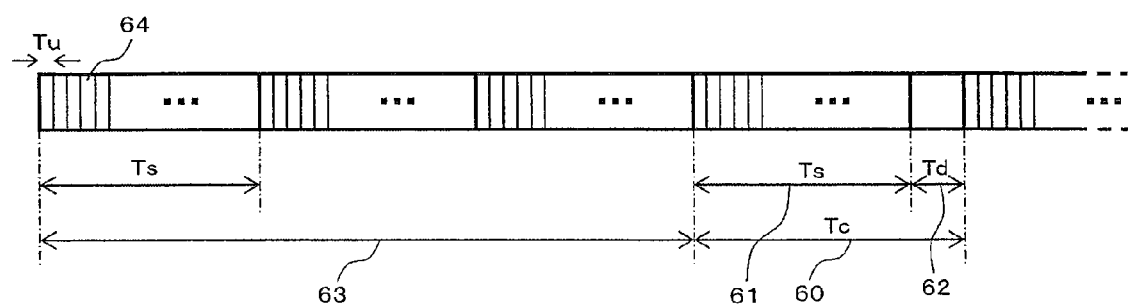
FIGS. 10A and 10B are diagrams for explaining a flow, in terms of time, of operation of a pulse radar apparatus according to an embodiment of the present invention.
Figure 10B:
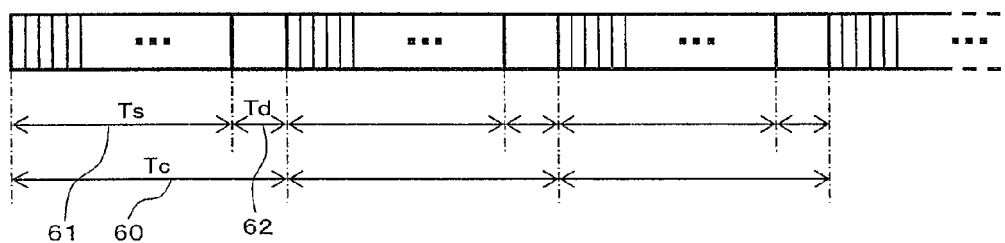

As described above, FIG. 10A illustrates a flow of operation of the pulse radar apparatus in terms of time, where the update period Tc of the target information is 100 [ms], and the time Ts required for the target information detection processing is 80 [ms]. In FIG. 10A, reference numeral 60 denotes an update period Tc, and reference numeral 61 denotes a time Ts in which the target information detection processing is done. In a time denoted with reference numeral 62 (second period Td), the target information is transferred and processed. For example, when the update period Tc is 100 [ms], and the time Ts required to detect the target information is 80 [ms], a time Td denoted with reference numeral 62 is 20 [ms]. FIGS. 10A and 10B further illustrate a unit sampling time Tu with reference numeral 64.

In the flow of operation of the pulse radar apparatus in terms of time as illustrated in FIG. 10A, the transmission signal is not output from the radio frequency transmission unit during the time Td denoted with reference numeral 62, and even if it is output, it cannot be used to update the target information. When the replica signal of the undesired wave is generated at the early period of start of use of the pulse radar apparatus 100, the target information cannot be detected in the period denoted with reference numeral 63 from when the pulse radar apparatus is started to be used. In the above example, the period denoted with reference numeral 63 is 240 [ms], and the radar function may be greatly impaired.

Accordingly, the pulse radar apparatus 100 of the present embodiment, the time Td in which the target information cannot be updated is used to obtain data required for generation of the replica signal during that period. Accordingly, the replica signal can be generated and updated without impairing the radar function for detecting the target information. However, although generation of the replica signal requires a time of 240 [ms] (=Tu×Nr×3), the time Td has only a time length of 20 [ms]. When there are m transmission control signals, the time required to generate the replica signal is Tu×Nr×(m+1), when m is equal to or more than 3, a still longer time is required. Accordingly, data required to generate the replica signal are partially obtained during the time Td, and all the required data are obtained by repeating this process.

As described above, FIG. 10B illustrates a flow of operation of the pulse radar apparatus 100 of the present embodiment in terms of time where data required for generation of the replica signal are obtained during the time Td in which the target information cannot be updated. As illustrated in FIG. 10B, in the pulse radar apparatus 100, the data required to generate the replica signal are obtained only during the time Td in which the target information cannot be updated, and therefore, the time Ts in which the target information detection processing is performed is not at all affected, and the radar function would not be impaired.

The minimum unit of the sampling data obtained from the digital signal processing unit 132 by causing the pulse radar apparatus 100 to operate is one set of distance data generated by the unit sampling processing unit 132a or the noise signal for each distance data, and the time required for acquisition thereof is the unit sampling time Tu. Since the unit sampling time Tu is shorter than the time Td, one or more sets of noise signals for each distance data can be obtained during the time Td. Accordingly, when Nd sets of noise signals for each distance data are to be obtained during the time Td, the maximum value of Nd is an integer value obtained by rounding down the fractional part of (Td/Tu). When the number of cycles of the update period Tc required to obtain all the noise signals for each distance data is defined as Nc, the number of cycles Nc is an integer value obtained by rounding up the fractional part of (Nr×(m+1)/Nd).

For example, when the above-described values are used as Tc, Tu, Td, and Nr, the maximum value of Nd is 5. When Nd is 5, the number of cycles required to generate the replica signal is 12. Therefore, when the replica signal is to be generated in the shortest period of time, the replica signal can be generated in the update period of 12 cycles, i.e., 1.2 [s]. Alternatively, Nd is set to one so as to allow for margin in the acquisition processing of the noise signals for each distance data performed in the time Td, then, an update period of 60 cycles is required to generate the replica signal, but even in this case, the replica signal can be generated in 6 [s]. The replica signal is considered to change relatively mildly due to, e.g., vibration, change of an ambient temperature or the like, and therefore, no problem would be caused even if it takes 6 [s] to generate the replica signal.

As explained above, in the pulse radar apparatus 100 of the present embodiment, the processing of the target information detection and the processing of the replica signal generation are performed in parallel, and the processing is controlled by the radar function switching unit 135. In the explanation below, a flow of processing according to the control method for the pulse radar apparatus of the present embodiment will be explained with reference to FIG. 1. FIG. 1 is a flow diagram illustrating the control method for the pulse radar apparatus of the present embodiment. In this case, the flow of processing for updating the target information performed in the update cycle Tc is shown, and also, a flow of processing for obtaining background signal required to generate a replica signal performed during the update cycle Tc is shown.

In the generation method of the replica signal of the undesired wave explained above with reference to FIGS. 6 to 9, the first to third background signals are successively generated, and thereafter, the replica signal is updated using them. The update method of the replica signal is not limited thereto. For example, every time the noise signal for each distance data is obtained, the data of the replica signal corresponding thereto may be updated. The noise signal for each distance data may not be obtained in the order of the first to third background signals, and may be obtained a random order. For example, when one set of noise signals for each distance data for the first background signal is obtained, one set of noise signals for each distance data for the subsequent second or third background signals may be obtained.

Accordingly, in the explanation below, for example, the data of the replica signal are updated every time the noise signal for each distance data is obtained. For the sake of ease of explanation, distance data for each of Np measurement distances obtained with the output of one pulse signal are defined as $Rp(i)$ ($i=1$ to Np), and the noise signal for each distance data is defined as $Bp(i)$ ($i=1$ to Np). The all distance data are defined as $RA(i, j)$ ($i=1$ to Np, $j=1,Nr$), and the all noise signal for each distance data is defined as $BB(i, k)$ ($i=1$ to Np, $k=1$ to Nt), and the replica signal is defined as $BA(i, j)$ ($i=1$ to Np, $j=1,Nr$). However, $Nt=Nr\times(m+1)$ holds. When m is 2, $BB(i, k)$ ($k=1$ to Nr) is the first background signal, $BB(i, k)$ ($k=(Nr+1)$ to $2\cdot Nr$) is the second background signal, and $BB(i, k)$ ($k=(2\cdot Nr+1)$ to $3\cdot Nr$ ($=Nt$)) is the third background signal.

The replica signal $BA(i, j)$ is given by:

$$BA(i,j)=BB(i,j)+BB(i,j+Nr)-BB(i,j+2\cdot Ir) \ (i=1 \text{ to } Np, j=1 \text{ to } Nr)$$

Further, the order of generation of noise signals for each distance data is given by $LN(k)$ ($i=1$ to Nt). More specifically, in the process of replica signal generation, the noise signal for each distance data generated in the k-th processing is $BB(i, n2)$ ($i=1$ to Np) where $n2=LN(k)$. The order of generation of noise signals for each distance data is set with $LN(k)$ in advance.

First, in step S1, a determination is made as to whether the pulse radar apparatus 100 is started to be used. When the pulse radar apparatus 100 is determined to be started to be used, then, step S3 is subsequently performed. On the other hand, when the pulse radar apparatus 100 is determined to be already being used, step S2 is subsequently performed. In step S2, a variable n3 for counting the number of obtained sets of noise signals for each distance data for replica signal generation during a time Td of the update cycle is initialized to zero. Subsequently, step S4 is performed.

On the other hand, in step S3, initialization is performed to start target information detection processing and replica signal generation processing. In this case, the number of sets of distance data of which measurement distances are different, which are obtained for the target information detection processing is defined as n1, and the number of noise signals for each distance data of which measurement distances are different, which are obtained for the replica signal generation processing is defined as n2, and in step S3, n1, n2, n3 are initialized to zero. The target information detection is set as the initial value of the switch command which is output from the radar function switching unit 135. After the initialization, step S4 is performed.

In step S4, the number of sets of distance data n1 is increased by one, step S5 is subsequently performed. In step S5, a determination is made as to whether the number of sets of distance data n1 is more than the number of sets of all distance data Nr. When n1 is determined to be more than Nr, the all distance data are determined to have been already obtained, and step S12 is subsequently performed. On the other hand, when n1 is determined to be equal to or less than Nr, step S6 is subsequently performed. In step S6, the radar function is activated. At this occasion, the switch command of the target information detection is output from the radar function switching unit 135 to the control unit 133, and therefore, all of the first control signal A, the second control signal B, and the third control signal C are output, and the distance data are obtained.

Subsequently, in step S7, on the basis of the reception signal received with the operation of the radar function in step S6, the unit sampling processing unit 132a obtains distance data Rp(i) (i=1 to Np), and the data are output to the target information detection unit 132b in accordance with the switch command given by the radar function switching unit 135. Subsequent in step S8, the obtained distance data Rp(i) (i=1 to Np) are set in the all distance data RA(i, N1) and saved. In step S9, a determination is made as to whether the number of sets of distance data n1 has reached the number of sets of all distance data Nr or not. When it has not yet reached the number of sets of all distance data Nr, step S4 is performed back again, and the processing in steps S4 to S8 is performed again to obtain subsequent distance data.

On the other hand, when the number of sets of distance data n1 is determined to have reached the number of sets of all distance data Nr in the determination of step S9, step S10 is subsequently performed to process the target information detection with the target information detection unit 132b. In this processing, the replica signals BA(i, j) (i=1 to Np, j=1 to Nr) which have already generated are read from the storage unit 134, and after the replica signals BA(i, j) are subtracted from the all distance data RA(i, j) received from the unit sampling processing unit 132a, the target information such as the distance to the target and the relative speed is detected. Thereafter, step S11 is subsequently performed.

In step S11, a determination is made as to whether the number of sets of noise signals for each distance data for replica signal generation obtained during the time Td of the update cycle is less than the upper limit value Nd. When n3 is determined to be less than Nd, step S4 is performed back again. When step S11 is performed after step S10, n3=0 holds. Therefore, in the determination of step S11, step S4 is performed back again. At this occasion, n1=Nr holds, and therefore, when 1 is added to n1 in step S4, step S12 is subsequently performed in the determination of step S5.

In step S12, 1 is added to each of the numbers of sets n2, n3, and thereafter, step S13 is subsequently performed. In step S13, the number k of the noise signal for each distance data obtained this time among the all noise signals for each distance data BB(i, k) is derived from LN(n2) generated in advance. In subsequent step S14, the condition of the control signals A, B, C for obtaining the k-th noise signal for each distance data is set on the basis of the number k. More specifically, when $1 \leq k \leq Nr$ holds, the condition for obtaining the first background signal is set. When $(Nr+1) \leq k \leq (2 \cdot Nr)$ holds, the condition for obtaining the second background signal is set. When $(2 \cdot Nr+1) \leq k \leq (3 \cdot Nr)$ holds, the condition for obtaining the third background signal is set. In step S15, the condition set in step S14 is output from the radar function switching unit 135 to the control unit 133, and the radar function is activated.

In step S16, the noise signals for each distance data Bp(i) (i=1 to Np) are received from the unit sampling processing unit 132a. Then, in step S17, the noise signals for each distance data Bp(i) (i=1 to Np) are set in the all noise signals for each distance data BB(i,k) and saved. Further, in step S18, the replica signals BA(i, j) (i=1 to Np, j=1 to Nr) are calculated from the all noise signals for each distance data BB(i, k) thus updated, and updated.

In step S19, a determination is made as to whether the number of sets n2 is equal to the number of sets of the all noise signals for each distance data 3·Nr. When the number of sets n2 is equal to the number of sets 3·Nr, then the number of sets n2 is initialized to zero in step S20, and thereafter step S11 is subsequently performed. On the other hand, when the number of sets n2 is not equal to the number of sets of the all noise signals for each distance data 3·Nr, step S11 is subsequently performed.

In step S11, a determination is made as to whether the number of sets n3 is less than Nd. When the number of sets n3 is determined to be less than Nd, step S4 is performed back again. On the other hand, when the number of sets n3 is equal to Nd, step S21 is subsequently performed. In step S21, the number of sets n1 is initialized to zero. Thereafter, the apparatus waits until subsequent update cycle.

According to the control method for the pulse radar apparatus of the present embodiment, the replica signal can be successively updated using the time Td in which the target information cannot be updated, and the replica signal is updated without impairing the radar function, and the target information can be detected with a high degree of accuracy. In addition to successive updating of the replica signal, for example, when the pulse radar apparatus 100 is turned on, the target information detection processing may be temporarily stopped, and the initial value of replica signal may be generated.

In the present embodiment, in the processing of the digital signal processing unit 132, in order to calculate the relative speed, complex signal processing (FFT processing) is performed on an input signal to calculate a Doppler component of a target. Any one of the noise signals generated in the pulse radar apparatus 100 explained above is steady-state noise, and therefore, none of the noise signals α, β, γ, δ includes Doppler component, and the noise signals α, β, γ, δ include only 0 [Hz] component corresponding to the relative speed of zero.

Accordingly, the background signal obtained in the processing of the replica signal generation unit 132c performed in steps S16, S17 is only the noise signal of 0 [Hz] component corresponding to the relative speed 0, and the Fourier transform data of the replica signal (α+β+γ+δ) obtained in step S18 are also only 0 [Hz] component corresponding to a relative speed of zero. Therefore, in the above-described step S10, the replica signal (α+β+γ+δ) may be subtracted from only 0 [Hz] component obtained by performing complex signal processing on the all distance data.

When it is not necessary to measure the relative speed of the target, it is not necessary for the digital signal processing unit 132 to perform the FFT processing, and it may be possible to make determination only as to whether a signal of a target is detected within each distance gate. Further, even when it is not necessary to measure the relative speed of the target, the digital signal processing unit 132 may perform the FFT processing to improve the S/N ratio, and it may be possible to make determination only as to whether a signal of a target is detected within each distance gate. In these cases, a low noise signal can be obtained by subtracting the corresponding distance data of the replica signal (α+β+γ+δ) from the all distance data obtained by the target information detection unit 132b, and therefore, the target can be detected on the basis of this with a high degree of accuracy.

Second Embodiment

Figure 11:
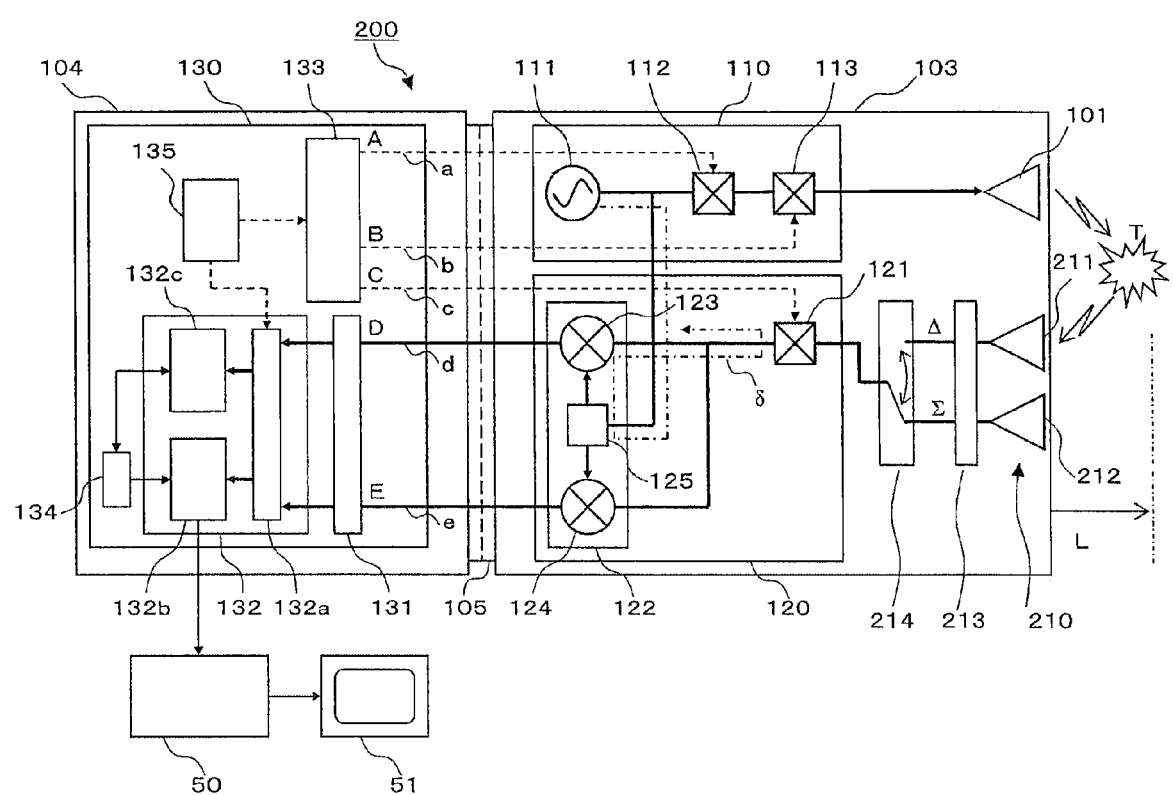
FIG. 11 is a block diagram illustrating a configuration of a pulse radar apparatus according to a second embodiment of the present invention.

A pulse radar apparatus of a second embodiment of the present invention will be explained below with reference to FIG. 11. FIG. 11 is a block diagram illustrating a configuration of a pulse radar apparatus 200 according to the present embodiment. The pulse radar apparatus 200 of the present embodiment includes two antennas, i.e., a first antenna 211 and a second antenna 212 as the reception antenna 210 in order to measure the angle of a target T using a phase monopulse method (angle measurement). Reception signals received by the first antenna 211 and the second antenna 212 are input into a hybrid circuit 213, and the hybrid circuit 213 converts them into a summation signal (Σ) and a difference signal (Δ) of the two reception signals, and output to a switch apparatus 214.

In the present embodiment, processing of the summation signal and the difference signal by the radio frequency reception unit 120 and the baseband unit 130 is configured to be selectively switched by the switch apparatus 214. Switching of the summation signal and the difference signal by the switch apparatus 214 is done at a sufficiently high speed as compared with relative movement of the target T, and therefore, the angle of the target T can be detected with a high degree of accuracy using the summation signal and the difference signal detected by alternately switching the processing. In the present embodiment, angle measurement according to the monopulse method can be done without changing the configuration of the radio frequency reception unit 120 and the baseband unit 130, and the small-sized pulse radar apparatus 200 can be provided at a low cost.

Third Embodiment

Figure 12:
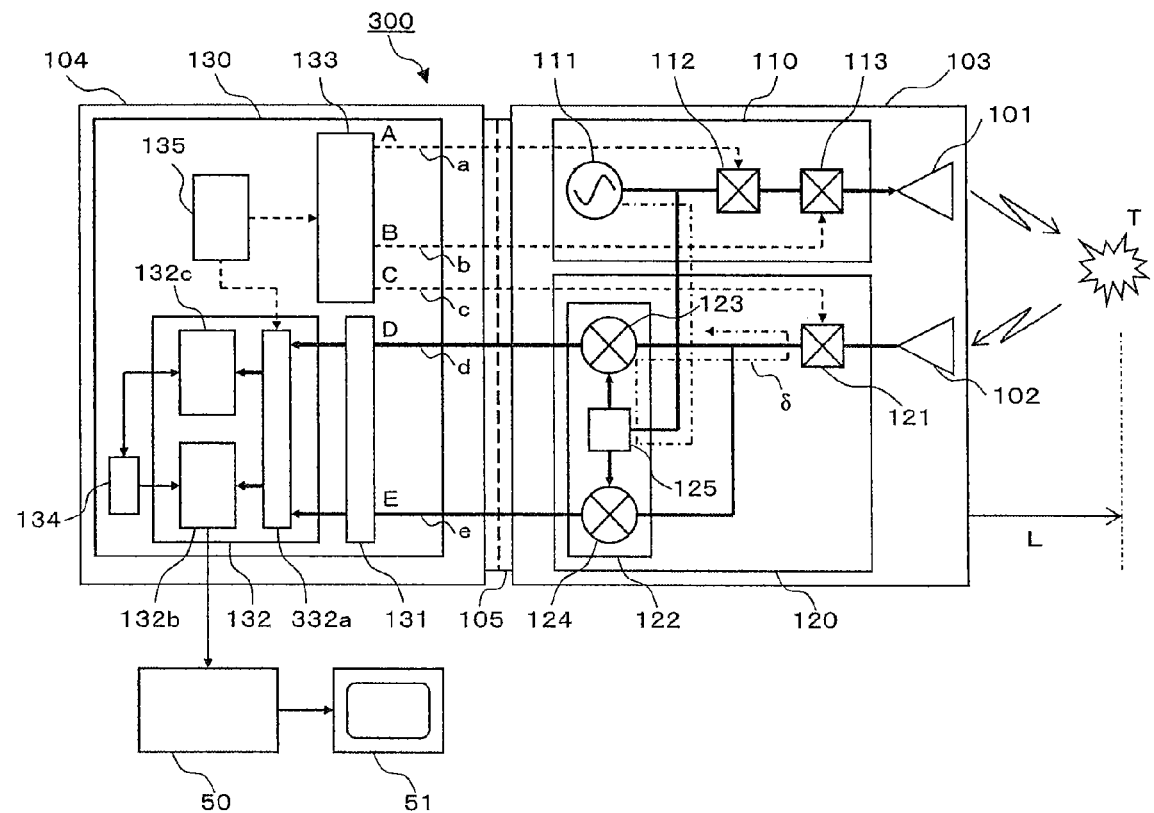
FIG. 12 is a block diagram illustrating a configuration of a pulse radar apparatus according to an embodiment of the present invention.

A pulse radar apparatus of the third embodiment of the present invention will be explained below with reference to FIG. 12. FIG. 12 is a block diagram illustrating a configuration of a pulse radar apparatus 300 according to the present embodiment. In FIG. 12, the pulse radar apparatus 300 includes a radio frequency transmission unit 110 and a radio frequency reception unit 120 for processing a radio frequency signal, the baseband unit 130 for processing a low frequency signal, a transmission antenna 101 for radiating a radio wave into space, and a reception antenna 102 for receiving a reflected wave reflected by a target. In the explanation below, for the sake of easy explanation, the target detected by the pulse radar apparatus 300 is denoted as symbol T.

The radio frequency transmission unit 110 includes an oscillation apparatus 111 generating a predetermined radio frequency signal (carrier wave) which is a source of generation of a transmission signal of an electromagnetic wave, and a first gate unit 112 and a second gate unit 113 for gating the radio frequency signal generated by the oscillation apparatus 111 into a pulse-shape signal in a predetermined time width (pulse signal). The first gate unit 112 and the second gate unit 113 are circuits for gating the radio frequency signal which is input from the oscillation apparatus 111 into a pulse signal of, for example, 1 [ns] width. A frequency multiplier and a switch can be used as the first gate unit 112 and the second gate unit 113. Two signal gating circuits including the first gate unit 112 and the second gate unit 113 are used, and therefore, a pulse signal sharply formed can be generated. The pulse-shape transmission signal which is output from the second gate unit 113 is transmitted to the transmission antenna 101, and is radiated into the air as radio wave from the transmission antenna 101.

The radio frequency reception unit 120 includes a correlation apparatus 121 for receiving the reception signal received with the reception antenna 102 and obtaining correlation between the reception signal and the transmission signal, and also includes an IQ mixer 122 for down-converting the signal, which is output from the correlation apparatus 121, using the carrier wave received from the oscillation apparatus 111. The IQ mixer 122 includes a first mixer 123 for down-converting the signal into a baseband signal of I component, a second mixer 124 for down-converting the signal into a baseband signal of Q component, and an phase shifter 125 for applying a 90-degree phase difference to the carrier wave received from the oscillation apparatus 111 and outputting it to the first mixer 123 and the second mixer 124. The correlation apparatus 121 retrieves a signal of each measurement distance from the reception signal, and outputs it to the first mixer 123 and the second mixer 124.

The baseband unit 130 includes an A/D conversion unit 131 for receiving I component and Q component of the baseband signal down-converted by the first mixer 123 and the second mixer 124 and converting them into a digital signal, a digital signal processing unit 132 for calculating information about the target T by applying complex signal processing (complex Fourier transform (FFT: Fast Fourier Transform)) on the digital signal given by the A/D conversion unit 131, a control unit 133 for controlling operation of the pulse radar apparatus 300, and a storage unit 134, and also includes a radar function switching unit 135 for switching operation of the digital signal processing unit 132 and the control unit 133.

In accordance with a switch command given by the radar function switching unit 135, the control unit 133 controls the ON/OFF state of each of the first gate unit 112, the second gate unit 113, and the correlation apparatus 121, which are radio frequency components. When the control unit 133 turns on both of the first gate unit 112 and the second gate unit 113 in accordance with a switch command given by the radar function switching unit 135, the radio frequency transmission unit 110 outputs a transmission signal. The control signal generated by the control unit 133 is, for example, a signal of 1 [ns] width.

The pulse radar apparatus 300 of the present embodiment performs not only original signal processing for detecting target information but also signal processing for generating the replica signal of the noise signal. In order to perform processing of target information detection and processing of replica signal generation, the digital signal processing unit 132 is provided with a selection unit 332a, a target information detection unit 132b, and a replica signal generation unit 132c. According to a switch command given by the radar function switching unit 135, the selection unit 332a outputs digital signal received from the A/D conversion unit to any one of the target information detection unit 132b and the replica signal generation unit 132c.

In the pulse radar apparatus 300, one pulse-shape radio wave is transmitted from the transmission antenna 101, and a pulse reflected and returned from a target in a discovery distance is received by the reception antenna 102, and a distance to the target is calculated from the time it takes from the transmission to the reception. The signal strength of the received pulse is extremely low, and therefore, in order to improve S/N, the signals of the reception pulses for several times are integrated and used. When the target is moving, the reception pulse includes Doppler component, and therefore, by performing FFT processing on the data within a predetermined time, the speed of the target is calculated by obtaining the Doppler component. While the FFT processing data are obtained, the pulse is continuously transmitted in a predetermined pulse repetition period (first pulse repetition period Tp).

For a pulse radar radiating a pulse-shape radio wave of which used frequency band is very wide, a prescribed spectrum is set in the Radio Law to limit the upper limit of the transmission average output power. In the pulse radar apparatus 300 of the present embodiment, the transmission average output power determined from the pulse repetition period Tp and the voltage of the pulse transmitted is designed to satisfy the Radio Law.

The pulse radar apparatus 300 of the present embodiment also performs generation processing of the replica signal in addition to the detection processing of the target information. In the generation processing of the replica signal, the same operation as the detection processing of the target information is performed while the control condition is changed, and during this period, the detection processing of the target information cannot be performed. Accordingly, it is required to reduce the processing time required for generation of the replica signal. In order to achieve this, the present embodiment is configured such that, during the replica signal generation processing, the pulse repetition period of the transmission signal generated by the radio frequency transmission unit 110 (second pulse repetition period Tz) is less than the pulse repetition period Tp when the target information detection processing is performed (Tz<Tp). Accordingly, the replica signal can be successively updated without impairing the radar function, and the target information can be detected with a high degree of accuracy.

When the repetition period of the radiated pulses is reduced in the pulse radar apparatus, the transmission average output power increases, and may exceed the prescribed spectrum of the transmission average output power. However, in the generation method of the replica signal of the present embodiment, the first gate unit 112 and the second gate unit 113 are controlled so that the transmission signal is not output from the radio frequency transmission unit 110 while the replica signal is generated as explained later. For this reason, even when the repetition period of the pulses is reduced only in the generation processing of the replica signal, the transmission average output power does not exceed the prescribed spectrum.

On the other hand, as the pulse repetition period is reduced, the maximum discovery distance with the pulse radar apparatus 300 is also reduced. For example, when the pulse repetition period Tp is 1 [μs], the discovery distance with the pulse radar apparatus 300 is up to 150 [m]. In contrast, when the pulse repetition period Tz during the replica signal generation is, for example, 0.5 [μs] which is half of Tp, only a replica signal up to a distance of 75 [m] can be obtained. However, a high degree of accuracy is not always required for a target at a far location, and therefore, when a replica signal for a far location is unnecessary, the pulse repetition period Tz may be reduced.

Figure 19:
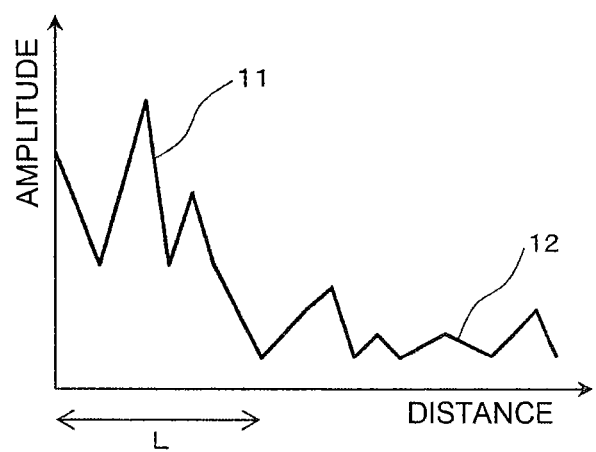
FIG. 19 is a time waveform chart illustrating a replica signal generated by a pulse radar apparatus according to an embodiment of the present invention.
Figure 20A:
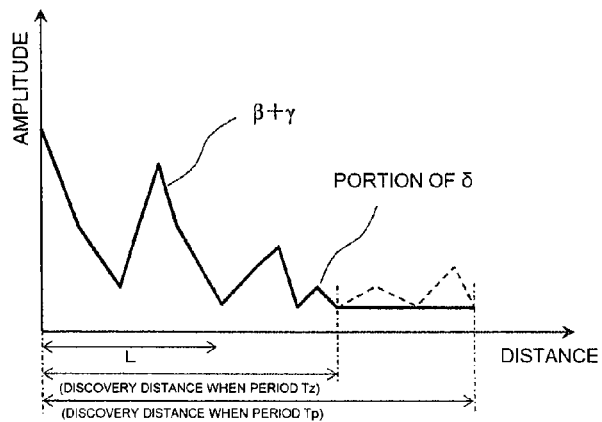
FIG. 20A is a time waveform chart of a noise signal when a pulse repetition period is reduced.
Figure 20B:
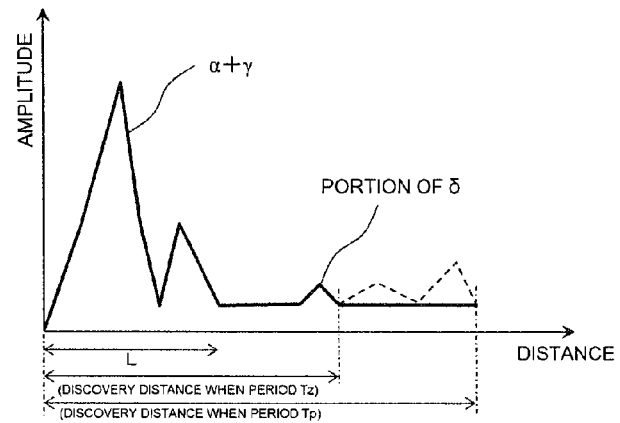
FIG. 20B is a time waveform chart of a noise signal when a pulse repetition period is reduced.
Figure 20C:
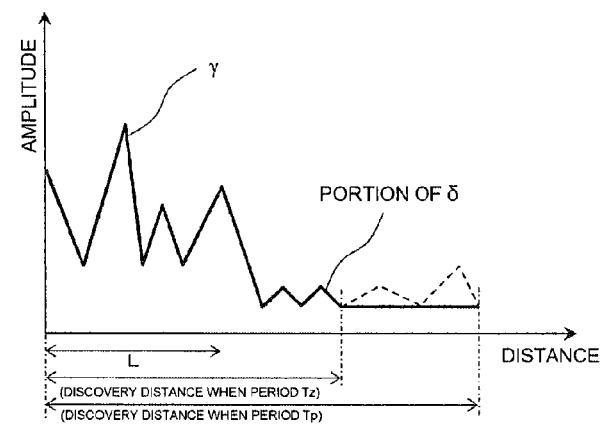
FIG. 20C is a time waveform chart of a noise signal when a pulse repetition period is reduced.
Figure 20D:
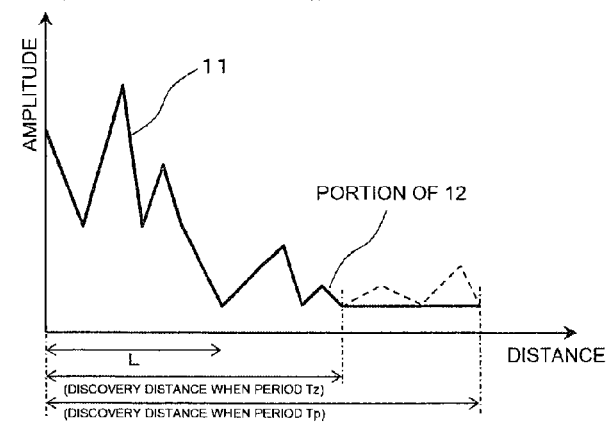
FIG. 20D is a time waveform chart of a noise signal when a pulse repetition period is reduced.

As shown in FIG. 19 explained later, the farther the location is, the smaller the amplitude of the replica signal tends to be. Therefore, even when a replica signal for a far location is not generated, the accuracy of detection of the target information is considered not to be greatly affected. When, for example, the pulse repetition period Tz is reduced to one fourth of Tp, a replica signal can be obtained up to only 37.5 [m], but when a replica signal farther than that is considered to be hardly affected, the replica signal may not be subtracted from the reception signal farther than 37.5 [m].

A control method for detecting target information with the pulse radar apparatus 300 of the present embodiment will be hereinafter explained. In the pulse radar apparatus 100, the radio frequency transmission unit 110 generates a pulse signal having a pulse width of, e.g., 1 [ns], with a predetermined pulse repetition period Tp, and this radiated as a transmission signal from the transmission antenna 101. For example, when the pulse repetition period Tp is 1 [μs], the discovery distance with the pulse radar apparatus 300 is up to 150 meters. The reception signal received by the reception antenna 102 is down-converted into a baseband signal by the radio frequency reception unit 120, and is output to the baseband unit 130. In the baseband unit 130, the baseband signal is converted into a digital signal by the A/D conversion unit 131, and thereafter, is input into the digital signal processing unit 132.

In order to detect the target information within the predetermined discovery distance range, the pulse radar apparatus 300 radiates a plurality of transmission signals with the pulse repetition period Tp, processes the reception signal which is the reflected wave of each of them, and obtains all distance data within the discovery distance range. The digital signal processing unit 132 detects the target information from the all distance data. For example, equivalent sampling method may be used as a method for obtaining the all distance data within the discovery distance range.

In the pulse radar apparatus 300 of the present embodiment configured as described above, each component constituting the radio frequency transmission unit 110 and the radio frequency reception unit 120 operates on a frequency in several dozen GHz band, whereas each component constituting the baseband unit 130 operates on a frequency no more than about 2 GHz. As described above, the operation frequency of the radio frequency transmission unit 110 and the radio frequency reception unit 120 is greatly different from the operation frequency of the baseband unit 130, and therefore, the radio frequency transmission unit 110 and the radio frequency reception unit 120 and the baseband unit 130 are preferably formed on separate circuit boards designed for the respective frequency bands. In the present embodiment, the radio frequency transmission unit 110 and the radio frequency reception unit 120 are formed on a radio frequency circuit board 103, and the baseband unit 130 is formed on a low frequency circuit board 104. The transmission antenna 101 and the reception antenna 102 for transmitting and receiving the radio frequency signal are arranged on the radio frequency circuit board 103.

The circuit board used for radio frequency is more expensive than the circuit board for low frequency, and therefore, in the present embodiment, only the radio frequency transmission unit 110, the radio frequency reception unit 120, the transmission antenna 101, and the reception antenna 102 are arranged on the radio frequency circuit board 103 which is expensive, and the baseband unit 130 for processing the low frequency signal is arranged on a low frequency circuit board 104 which is less expensive. Therefore, the cost of the pulse radar apparatus 300 can be reduced.

As explained above, in order to arrange the components of the pulse radar apparatus 300 on the radio frequency circuit board 103 and the low frequency circuit board 104 in a separated manner, it is necessary to have means for electrically connecting the components on the radio frequency circuit board 103 and the components on the low frequency circuit board 104. In the pulse radar apparatus 300 of the present embodiment, the multi-pin connector 105 which is inexpensive and small and has been conventionally used can be used. The control signal which is output from the control unit 133 on the low frequency circuit board 104 is transmitted to the radio frequency transmission unit 110 and the radio frequency reception unit 120 on the radio frequency circuit board 103 via the connector 105. The baseband signal which is output from the radio frequency reception unit 120 on the radio frequency circuit board 103 is transmitted to the baseband unit 130 on the low frequency circuit board 104 via the connector 105.

As described above, when the control signal and the baseband signal are exchanged using the conventional multi-pin connector 105 between the radio frequency circuit board 103 and the low frequency circuit board 104, the interference noise signal due to the control signal may be mixed into the baseband signal of a low signal strength having information about the target T. In addition, a self mixing noise, that is generated when the carrier wave output from the oscillation apparatus 111 passes through the IQ mixer 122, is reflected by the correlation apparatus 121, and is down-converted again with the IQ mixer 122, is also mixed into the baseband signal. In particular, when the target T is located at a distance, the amplitude level of each reflected signal is low, and therefore, the baseband signal may be buried in the above-described the interference noise signal and the self mixing noise.

Accordingly, the pulse radar apparatus 300 of the present embodiment generates a replica signal of an undesired wave such as noise mixed into the baseband signal passing through the connector 105, and removes the replica signal from the baseband signal during detection of the target T. The undesired wave such as self mixing noise and the interference noise signal explained above is considered to change when, for example, ambient temperature changes, or vibration is applied. For this reason, it is preferable to successively update and use the replica signal of the undesired wave, and, for example, it is preferable to update the replica signal with a regular interval.

Figure 13:
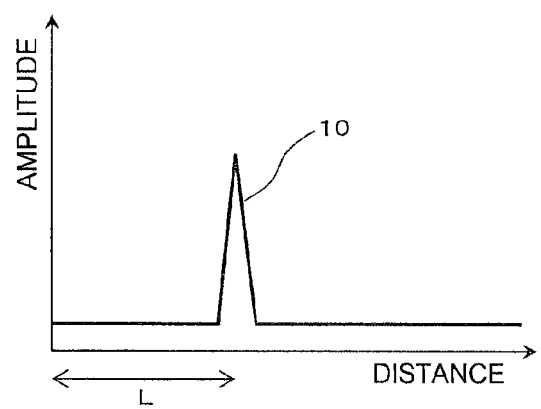
FIG. 13 is a time waveform chart of a signal when there is no influence by noise.
Figure 14:
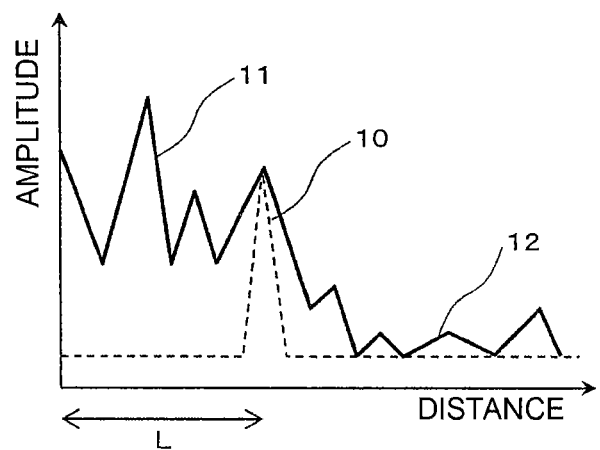
FIG. 14 is a time waveform chart of a signal when a signal of an undesired wave is mixed.

An example of replica signal of the undesired wave will be explained with reference to FIGS. 13 and 14. The transmission antenna 101 radiates a pulse signal generated by the radio frequency transmission unit 110, the reception antenna 102 receives a reflected wave reflected by the target T, and the digital signal processing unit 132 processes it. FIG. 13 is a time waveform chart illustrating an example of signal 10 processed by the digital signal processing unit 132. (it should be noted that the horizontal axis represents a distance corresponding to a time. Hereinafter, this is also applicable to FIGS. 14, and 16 to 20D). The waveform of the signal 10 shown in FIG. 13 is a waveform when it is not affected by noise. FIG. 14 illustrates a time waveform chart when the signal of the above-described undesired wave is mixed into the signal 10 as illustrated in FIG. 13. The signal of reference numeral 11 schematically denotes an interference noise signal mixed into the baseband signal at the connector 105, and the signal of reference numeral 12 schematically denotes a self mixing noise.

In the present embodiment, the replica signal of the undesired wave combining the interference noise signal 11 and the self mixing signal 12 as illustrated in FIG. 14 is generated as necessary, and stored in the storage unit 134. Then, when the pulse radar apparatus 300 is activated to detect the target T, the above-described replica signal is subtracted from the signal obtained by causing the baseband unit 130 to receive a signal via the connector 105 and causing the digital signal processing unit 132 to process the signal, whereby a signal as illustrated in FIG. 13 (low noise signal) is obtained.

In FIG. 12, a control signal which is output from the control unit 133 to the first gate unit 112 (first control signal) and a control line transmitting it (first control line) are defined as A, a, respectively, and a control signal which is output from the control unit 133 to the second gate unit 113 (second control signal) and a control line transmitting it (second control line) are defined as B, b, respectively. A control signal which is output from the control unit 133 to the correlation apparatus 121 (third control signal) and a control line transmitting it (third control line) are defined as C, c, respectively. The control signals A, B control the ON/OFF state of the first gate unit 112 and the second gate unit 113, respectively, and the control signal C controls the ON/OFF state of the correlation apparatus 121. In this case, the transmission control signal includes two signals, i.e., the first control signal and the second control signal, and the reception control signal includes one signal, i.e., the third control signal. In the pulse radar apparatus and the control method therefor of the present invention, the numbers of transmission control signals and reception control signals are not limited to the above, and more control signals may be provided therefor.

A baseband signal which is output from the first mixer 123 of the IQ mixer 122 to the A/D conversion unit 131 (I component) and a signal line transmitting it are denoted as D, d, respectively, and a baseband signal which is output from the second mixer 124 to the A/D conversion unit 131 (Q component) and a signal line transmitting it are denoted as E, e, respectively. All of the above-described control lines a, b, c, and the signal lines d, e are passed through different pins of the connector 105.

Hereinafter, operation for causing the pulse radar apparatus 300 to detect the target information will be explained in detail with reference to FIG. 12. When target information detection processing is performed, first, a switch command for instructing target information detection is transmitted from the radar function switching unit 135 to the selection unit 332a of the digital signal processing unit 132 and the control unit 133. When the control unit 133 receives the switch command for instructing the target information detection from the radar function switching unit 135, the control unit 133 outputs the control signals A, B to the first gate unit 112 and the second gate unit 113 with appropriate timing via the control lines a, b. When the first gate unit 112 and the second gate unit 113 are energized for substantially 1 [ns] according to the control signals A, B, a carrier wave generated by the oscillation apparatus 111 is gated into a pulse width of 1 [ns]. Accordingly, a transmission signal of 1 [ns] width pulse based on the carrier wave of the predetermined frequency is generated, and this is transmitted to the transmission antenna 101, and is radiated into the air as radio wave. The radiated radio wave is reflected by the target T located at a position away by a distance L, and is received by the reception antenna 102.

When, according to the switch command given by the radar function switching unit 135, the control unit 133 outputs a control signal C to the correlation apparatus 121 with predetermined timing via a control line c, the correlation apparatus 121 is energized, and correlation between the transmission signal and the reception signal received by the reception antenna 102 is obtained. The signal which is output from the correlation apparatus 121 is down-converted into a complex baseband signal by the IQ mixer 122. The baseband signals D, E down-converted by the first mixer 123 and the second mixer 124, respectively, are input into the A/D conversion unit 131 of the baseband unit 130 via the signal lines d, e, and is converted into a digital signal thereby.

The digital signal converted by the A/D conversion unit 131 is input into the selection unit 332a of the digital signal processing unit 132, and the digital signal is output to the target information detection unit 132b in accordance with the switch command from the radar function switching unit 135. The target information detection unit 132b calculates the target information such as position information and relative speed information about the target T by performing complex signal processing on the basis of the digital signal which is input from the selection unit 332a.

The control lines a, b, c, and the signal lines d, e as illustrated in FIG. 12 are connected with the connector 105 between the radio frequency circuit board 103 and the low frequency circuit board 104. Each pin (terminal) of the connector 105 is not covered, and therefore, the signal flowing through each terminal sneaks into another terminal to cause interference though it is very low level. The control signals A, B, C flowing through the control lines a, b, c are signals for energizing/deenergizing RF components (the first gate unit 112, the second gate unit 113, the correlation apparatus 121), and have a signal strength of about, for example, 2 to 3 [V]. In contrast, the baseband signals D, E flowing through the signal lines d, e are signals obtained by down-converting a signal of a low strength reflected by the target T, and is a signal of an extremely low strength. For this reason, the control signals A, B, C are signals of relatively extremely high strength as compared with the baseband signals D, E, and the control signals A, B, C leak from the control lines a, b, c into the signal lines d, e at the connector 105.

Figure 15:
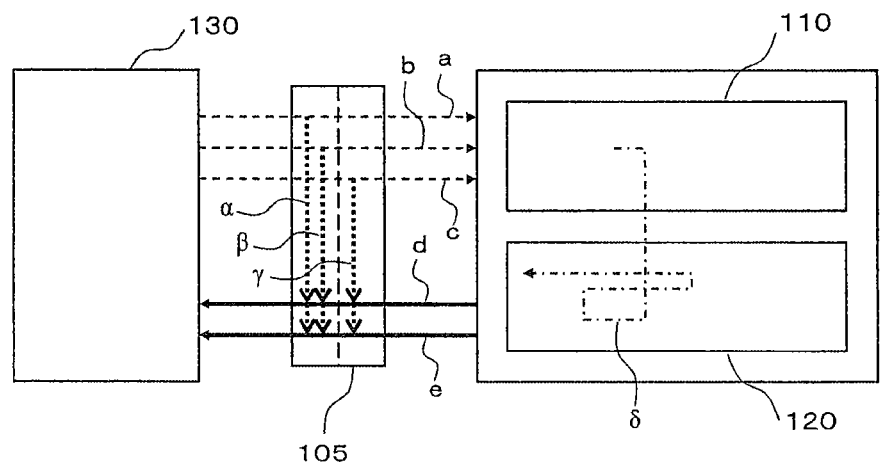
FIG. 15 is an enlarged diagram enlarging and displaying a control line and a signal line of a pulse radar apparatus according to an embodiment of the present invention.

The control lines and the signal line explained above in the pulse radar apparatus 300 are enlarged and shown in FIG. 15. In FIG. 15, the signals sneaking from the control lines a, b, c to the signal lines d, e at the connector 105 are denoted as interference noise signals $\alpha$, $\beta$, $\gamma$, respectively. The interference noise signals $\alpha$, $\beta$, $\gamma$ are the signals having substantially the same strength as the baseband signals D, E passing through the signal lines d, e. In FIG. 15, symbol $\delta$ denotes a self mixing noise which is output from the oscillation apparatus 111, passes through the IQ mixer 122, is reflected by the correlation apparatus 121, and is again down-converted by the IQ mixer 122. This self mixing noise $\delta$ is also mixed into the baseband signals D, E. In this case, the interference noise signals $\alpha$, $\beta$, $\gamma$ are combined with the baseband signals D, E, and the multi-pin connector through which each signal flows is arranged so that the signal strength thereof is at such a level that it is not saturated at the A/D conversion unit 131, i.e., so that as much isolation as possible is ensured between each control signal and the baseband signal.

In the pulse radar apparatus 300 of the present embodiment, while the pulse radar apparatus 300 is started to be used or is being used, the first gate unit 112, the second gate unit 113, and the correlation apparatus 121 are successively operated with appropriate timing via the control lines a, b, c, so as to generate and update, as necessary, the replica signal of the undesired wave including each of the above-described noises mixed into the baseband signals D, E. Then the obtained replica signal of the undesired wave is stored in the storage unit 134, and during detection of the target T, each noise is removed by subtracting the replica signal from the baseband signals D, E obtained by down-converting the reception signal.

In the explanation below, a generation method of the replica signal of the undesired wave will be explained with reference to FIGS. 16 to 19. FIGS. 16 to 19 are figures illustrating examples of a noise signal and a replica signal obtained according to the control method for the pulse radar apparatus of the present embodiment. If the transmission radio wave is radiated into the air from the transmission antenna 101 when the replica signal of the undesired wave is generated, the transmission radio wave may be reflected by some target, and it may be received by the reception antenna 102. When such a reflected wave is received, it is impossible to generate the replica signal of only the undesired wave. For this reason, when the replica signal of the undesired wave is generated, the transmission radio wave is not radiated from the transmission antenna 101.

When the replica signal is generated, a switch command for replica signal generation is transmitted from the radar function switching unit 135 to the control unit 133 and the selection unit 332a of the digital signal processing unit 132. First, a signal for commanding a first stage replica signal generation is output from the radar function switching unit 135 to the control unit 133. Accordingly, the control unit 133 operates the radar while the control signals B, C are passed to the control lines b, c and the output of the control signals A flowing through the control line a is stopped as the first stage replica signal generation. In the pulse radar apparatus 300, the pulse signal is output to the transmission antenna 101 only when both of the first gate unit 112 and the second gate unit 113 are turned on. Therefore, if the control signal A is not output to the first gate unit 112 when the radar is activated, the pulse signal is not output to the transmission antenna 101. Therefore, the reception antenna 102 is also unable to receive the reflected wave.

Figure 16:
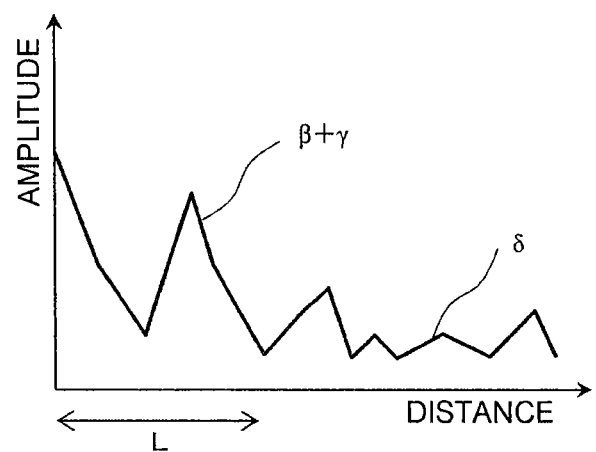
FIG. 16 is a time waveform chart of a noise signal when a control signal is not output to a first gate unit of a pulse radar apparatus according to an embodiment of the present invention.

As a result, the digital signal processing unit 132 receives a noise signal $(\beta+\gamma+\delta)$ obtained by combining the self mixing noise $\delta$ and the interference noise signals $\beta$, $\gamma$ made when the control signals B, C are mixed into the signal lines d, e, and this is output to the replica signal generation unit 132c by the selection of the selection unit 332a. The replica signal generation unit 132c processes a noise signal $(\beta+\gamma+\delta)$, and obtains a noise signal as exemplified in FIG. 16. FIG. 16 is a figure illustrating an example of a time waveform of the noise signal $(\beta+\gamma+\delta)$. The noise signal $(\beta+\gamma+\delta)$ obtained by processing in the replica signal generation unit 132c is saved as the first background signal in the storage unit 134.

When the first stage replica signal generation is finished, subsequently, a signal for commanding a second stage replica signal generation is output from the radar function switching unit 135 to the control unit 133. The control unit 133 operates the radar while the control signals A, C are passed to the control lines a, c and the output of the control signals B flowing through the control line b is stopped as the second stage replica signal generation. In this case, only the first gate unit 112 is turned on, and the second gate unit 113 is not turned on, and therefore, in this case, the pulse signal is not output to the transmission antenna 101, either. Therefore, the reception antenna 102 is also unable to receive the reflected wave.

Figure 17:
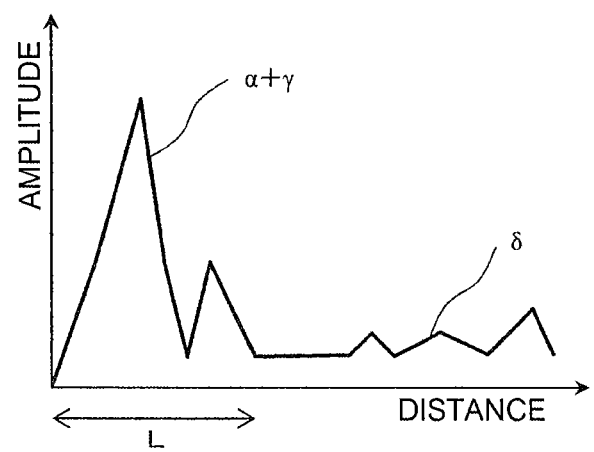
FIG. 17 is a time waveform chart of a noise signal when a control signal is not output to a second gate unit of a pulse radar apparatus according to an embodiment of the present invention.

As a result, the digital signal processing unit 132 receives a noise signal $(\alpha+\gamma+\delta)$ obtained by combining the self mixing noise $\delta$ and the interference noise signals $\alpha$, $\gamma$ made when the control signals A, C are mixed into the signal lines d, e, and this is output to the replica signal generation unit 132c by the selection of the selection unit 332a. The replica signal generation unit 132c processes a noise signal $(\alpha+\gamma+\delta)$, and obtains a noise signal as exemplified in FIG. 17. FIG. 17 is a figure illustrating an example of a time waveform of the noise signal $(\alpha+\gamma+\delta)$. The noise signal $(\alpha+\gamma+\delta)$ obtained by processing in the replica signal generation unit 132c is added to the noise signal $(\beta+\gamma+\delta)$ saved in the storage unit 134 as the second background signal.

When the second stage replica signal generation is finished, the radar function switching unit 135 further outputs a signal for commanding a third stage replica signal generation to the control unit 133. The control unit 133 operates the radar while the control signal C is passed to the control line c and the output of both of the control signals A, B flowing through the control lines a, b is stopped as the third stage replica signal generation. In this case, the pulse signal is not output to the transmission antenna 101, either. Therefore, the reception antenna 102 is also unable to receive the reflected wave.

Figure 18:
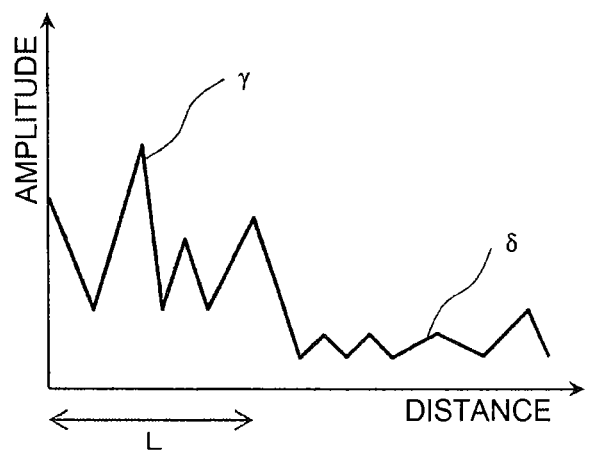
FIG. 18 is a time waveform chart of a noise signal when a control signal is not output to the first gate unit and the second gate unit of a pulse radar apparatus according to an embodiment of the present invention.

As a result, the digital signal processing unit 132 receives a noise signal $(\gamma+\delta)$ obtained by combining the self mixing noise $\delta$ and the interference noise signal $\gamma$ made when the control signals C is mixed into the signal lines d, e, and this is output to the replica signal generation unit 132c by the selection of the selection unit 332a. The replica signal generation unit 132c processes the noise signal $(\gamma+\delta)$. Accordingly, the noise signal as illustrated in FIG. 18 is obtained. FIG. 18 is a figure illustrating an example of a time waveform of the noise signal (γ+δ). The noise signal (γ+δ) obtained by processing in the replica signal generation unit 132c is subtracted from the noise signal saved in the storage unit 134 as the third background signal.

As described above, the noise signal (++γ+δ) of the second background signal is added to the noise signal (β+γ+δ) of the first background signal, and the noise signal (γ+δ) of the third background signal is subtracted therefrom, whereby a noise signal obtained by combining all the undesired waves can be calculated as shown in the expression below.

$$(\beta+\gamma+\delta)+(\alpha+\gamma+\delta)-(\gamma+\delta)=\alpha+\beta+\gamma+\delta$$

As described above, the replica signal (α+β+γ+δ) of the noise signal obtained by combining the interference noise signals α, β, γ, and the self mixing noise δ can be saved in the storage unit 134. The time waveform of the replica signal (α+β+γ+δ) is obtained by adding the time waveform of FIG. 16 and the time waveform of FIG. 17, and subtracting the time waveform of FIG. 18 therefrom. The time waveform of the replica signal (α+β+γ+δ) in this case is shown in FIG. 19.

As explained above, in order to generate the replica signal of the undesired wave, it is necessary to perform, for three times, the same radar operation as the normal target information detection. When there are m transmission control signals, it is necessary to perform, for (m+1) times, the radar operation for generating the replica signal of the undesired wave. In one set of target information detection processing or processing for obtaining one background signal, Nr set of distance data of which measurement distances are different or Nr sets of noise signals for each distance data are obtained, and the time required to obtain one set of distance data or the noise signals for each distance data is defined as a unit sampling time Tu. In such a case, the time required for one set of target information detection processing or the time required to obtain one background signal (defined as first period Ts) is Tu×Nr. For example, when the unit sampling time Tu is 4 [ms], and the number of sets of distance data Nr is 20, then the time Ts required for the target information detection processing is 4 [ms]×20=80 [ms].

In order to generate the replica signal of the undesired wave, it is necessary to perform the process of obtaining the noise signal for each distance data for Nr×3 times, it takes a time of 80 [ms]×3=240 [ms] (=Tr) which corresponds to three times the time Ts required to perform the target information detection processing. During this time, the target information detection processing cannot be performed, and therefore, when the replica signals are generated in order, the target information cannot be appropriately detected, which greatly reduces the radar function.

Accordingly, the pulse radar apparatus 300 of the present embodiment is configured such that, while the replica signal generation processing is performed, the pulse repetition period Tz in which the radio frequency transmission unit 110 generates the transmission signal is less than the pulse repetition period Tp when the target information detection processing is performed. Accordingly, this reduces the influence caused on search processing of the target information as much as possible.

For example, the period Tz is ½×Tp, which means that the pulse repetition period is executed half the period, and the unit sampling time Tu is 2 [ms], and therefore, the time it takes to generate the replica signal, which is 240 [ms], can be reduced to the half, i.e., Tr=120 [ms]. More specifically, when Tz is 1/N times of Tp, the time it takes to generate the replica signal Tr is 1/N. However, when the period Tz is reduced, the distance information about the replica signal that can be generated is reduced, and this makes it impossible to generate a replica signal at a far location. However, a high degree of accuracy is not always required for a target at a far location, and therefore, when a replica signal for a far location is unnecessary, no problem would be caused.

Desirably, the replica signal is updated when the radar is started or with a regular interval of time, but when the update period of the target information is Tc, Tr is as follows. Where, for example, Tc is 100 [ms], and the period Tz is ¼×Tp, then Tr is only 60 [ms]. In contrast, when the update period Tc is 100 [ms] whereas Tr is 60 [ms], there may be a case where there would be a long time in which the radar does not function. In such a case, the replica generation may be partially generated, the replica generation time per processing in the replica update may be reduced. For example, when the replica generation may be divided into three stages, the replica generation time Tr per processing is 60 [ms]/3=20 [ms], then the function of the radar is not greatly impaired.

For example, the discovery distance and replica signal information obtained when the pulse repetition period Tpls is reduced from Tp to Tz (<Tp) will be explained with reference to FIGS. 20A, 20B, 20C, 20D, 21A and 21B. When the pulse repetition period is reduced, then the discovery distance is reduced, and therefore, only a portion corresponding to the discovery distance in which information about the replica signal is also reduced can be obtained. As a result, the information about the replica signal as illustrated in FIGS. 16 to 19 cannot be obtained for only a portion of the self mixing noise δ as illustrated in FIGS. 20A to 20D.

Figure 21A:
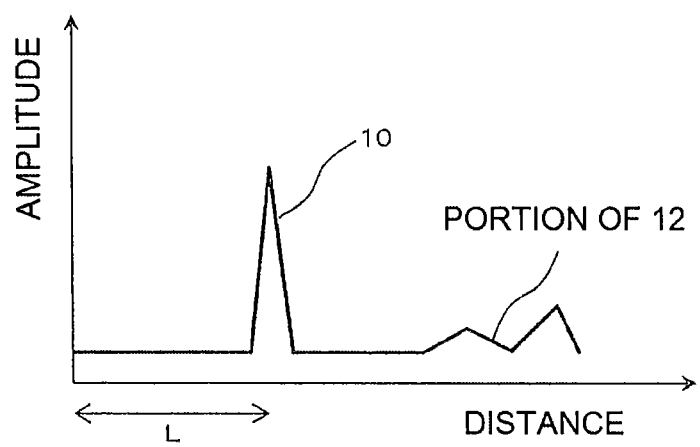
FIG. 21A is a time waveform chart of a signal from which a replica signal is removed when a pulse repetition period is reduced.
Figure 21B:
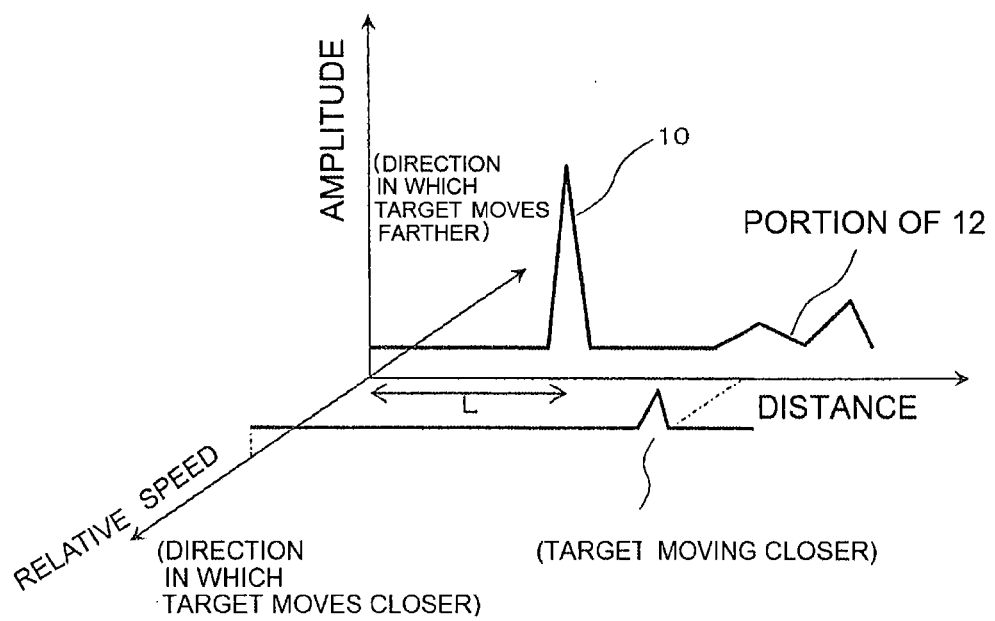
FIG. 21B is a time waveform chart of a signal from which a replica signal is removed when a pulse repetition period is reduced.

In this case, as shown in FIG. 21A, the interference signal remains at a far location, and when there is a reflected wave from the target at that location, it is difficult to detect it. However, in such a case, the target does not have any relative speed with respect to the radar, and more specifically, the target maintains a certain distance therefrom, and therefore, it is not dangerous. When the relative speed of the target at that distance is detected, the relative speed of the target, e.g., as illustrated in FIG. 21B can be detected separated from the interference signal, and therefore no problem would be caused.

In the present embodiment, in the processing of the digital signal processing unit 132, in order to calculate the relative speed, complex signal processing (FFT processing) is performed on an input signal to calculate a Doppler component of a target. Any one of the noise signals generated in the pulse radar apparatus 300 explained above is steady-state noise, and therefore, none of the noise signals α, β, γ, δ includes Doppler component, and the noise signals α, β, γ, δ include only 0 [Hz] component corresponding to the relative speed of zero.

Accordingly, the first to third background signals obtained in the processing of the digital signal processing unit 132 is only the noise signal of 0 [Hz] component corresponding to the relative speed of zero, and the Fourier transform data of the replica signal (α+β+γ+δ) are also only 0 [Hz] component corresponding to a relative speed of zero. Therefore, the replica signal (α+β+γ+δ) may be subtracted from only 0 [Hz] component obtained by performing complex signal processing on the signal received from the A/D conversion unit 131.

When it is not necessary to measure the relative speed of the target, it is not necessary for the digital signal processing unit 132 to perform the FFT processing, and it may be possible to make determination only as to whether a signal of a target is detected within each distance gate. Further, even when it is not necessary to measure the relative speed of the target, the digital signal processing unit 132 may perform the FFT processing to improve the S/N ratio, and it may be possible to make determination only as to whether a signal of a target is detected within each distance gate. Even in such cases, the data of the corresponding distance gate of the replica signal ($\alpha+\beta+\gamma+\delta$) is subtracted from data of each distance gate obtained when the control signals A, B, C are output from the control unit 133, whereby low noise signal can be obtained, and therefore, the target can be detected reliably on the basis of this.

As explained above, according to the pulse radar apparatus of the present invention, the replica signal of the noise signal can be generated in a short time, and the target information can be detected with a high degree of accuracy while the influence caused upon the detection processing of the target information is reduced.

In the pulse radar apparatus of the above-described embodiment, one transmission antenna and one reception antenna are provided, but the configuration is not limited thereto. For example, a pulse radar apparatus for measuring a phase angle according to a phase monopulse method needs to have two reception antennas, but in such a pulse radar apparatus, the replica signal of the noise signal may be likewise generated, and it may be removed from the reception signal.

The pulse radar apparatus of the present invention includes the oscillation apparatus that generates a carrier wave of a predetermined frequency, the radio frequency transmission unit that generates a transmission signal by gating the carrier wave generated by the oscillation apparatus into a pulse-shape in accordance with two or more transmission control signals, the transmission antenna that receives the transmission signal from the radio frequency transmission unit and radiates it as a radio wave into space, the reception antenna that receives a reflected wave made when the radio wave is reflected by the target, and the radio frequency reception unit that receives the reception signal from the reception antenna and converts it into a baseband signal by obtaining correlation between the transmission signal and the reception signal in accordance with a reception control signal. In addition, the baseband unit is provided that includes the A/D conversion unit that receives the baseband signal and converts it into a digital signal, the digital signal processing unit that receives the digital signal from the A/D conversion unit and calculates the distance to the target and/or the relative speed of the target and/or the angle of the target, and the control unit that outputs the transmission control signal to the radio frequency transmission unit and outputs the reception control signal to the radio frequency reception unit.

When the control unit does not output some or all of two or more transmission control signals, and the transmission control signal and the reception control signal other than that are output, and the oscillation apparatus outputs the carrier wave, then the digital signal processing unit obtains the digital signal which is output from the A/D conversion unit as the first background signal. When only some or all of the transmission control signals are output from the control unit, and the oscillation apparatus stops output of the carrier wave, then, the digital signal which is output from the A/D conversion unit is obtained as the second background signal. Then, the first background signal and the second background signal are added to calculate the replica signal.

When the replica signal is calculated, the processing is performed as follows. When all of the two or more transmission control signals and the reception control signal are output from the control unit, and the carrier wave is output from the oscillation apparatus, the digital signal which is output from the A/D conversion unit is input, and the above-described replica signal is subtracted therefrom, whereby low noise signal is calculated. Then, on the basis of this low noise signal, the distance to the target and/or the relative speed of the target and/or the angle of the target are calculated.

The digital signal processing unit is configured to perform Fourier transform processing on the digital signal which is input from the A/D conversion unit. Then, when all of the transmission control signals and the reception signal are output from the control unit, and the oscillation apparatus outputs the carrier wave, the low noise signal is calculated by subtracting the Fourier component corresponding to 0 Hz of the replica signal from the Fourier component corresponding to 0 Hz of the digital signal which is output from the A/D conversion unit.

In the configuration of the pulse radar apparatus, at least the baseband unit can be formed on a first circuit board, and the radio frequency transmission unit and the radio frequency reception unit can be formed on a circuit board which is separate from the first circuit board. In this case, a line connection unit of a multi-pin connector for collectively connecting, in an energized state, the control lines transmitting each of the two or more transmission control signals and reception control signal and the signal line transmitting the baseband signal can be provided between the first circuit board and the another circuit board. At this occasion, the signal line and the control line are arranged as far as possible to ensure isolation.

A control method for a pulse radar apparatus of the present invention includes a carrier wave generation step of generating a carrier wave of a predetermined frequency, a signal gating step of generating a transmission signal by gating the carrier wave into a pulse-shape in accordance with two or more transmission control signals, a transmission step of radiating the transmission signal as a radio wave into space, a reception step of receiving a reflected wave reflected by the target when the radio wave radiated into the space is reflected, a correlation step of obtaining correlation between the transmission signal and the reception signal received in the reception step in accordance with the reception control signal, a down-convert step of down-converting the output signal in the correlation step into a baseband and outputs the baseband signal, an A/D conversion step of receiving the baseband signal and converting the baseband signal into a digital signal, and a digital signal processing step of receiving the digital signal and calculating the distance to the target and/or the relative speed of the target and/or the angle of the target.

In the digital signal processing step, when some or all of two or more transmission control signals are not output and the transmission control signal other than those are output in the signal gating step, and the reception control signal is output in the correlation step, a digital signal obtained in the A/D conversion step when the carrier wave generation step is performed is obtained as a first background signal. When only some or all of the transmission control signals are output in the signal gating step, a digital signal obtained in the A/D conversion step when the carrier wave generation step is not performed is obtained as a second background signal. Then, the first background signal and the second background signal are added to calculate the replica signal.

When the replica signal is calculated, low noise signal is calculated as follows. When all of the transmission control signals are output in the signal gating step, and the reception control signal is output in the correlation step, and the carrier wave generation step is performed, then the low noise signal is calculated by subtracting the above-described replica signal from the digital signal obtained in the A/D conversion step. Then, on the basis of this low noise signal, the distance to the target and/or the relative speed of the target and/or the angle of the target are calculated.

In the above-described digital signal processing step, the digital signal converted in the A/D conversion step may be subjected to Fourier transform processing. In this case, all of the transmission control signals are output in the signal gating step, and the reception control signal is output in the correlation step, and the carrier wave generation step is performed, and under this condition, the low noise signal is calculated by subtracting the Fourier component corresponding to 0 Hz of the replica signal from the Fourier component corresponding to 0 Hz of the digital signal obtained in the A/D conversion step.

Fourth Embodiment

Figure 22:
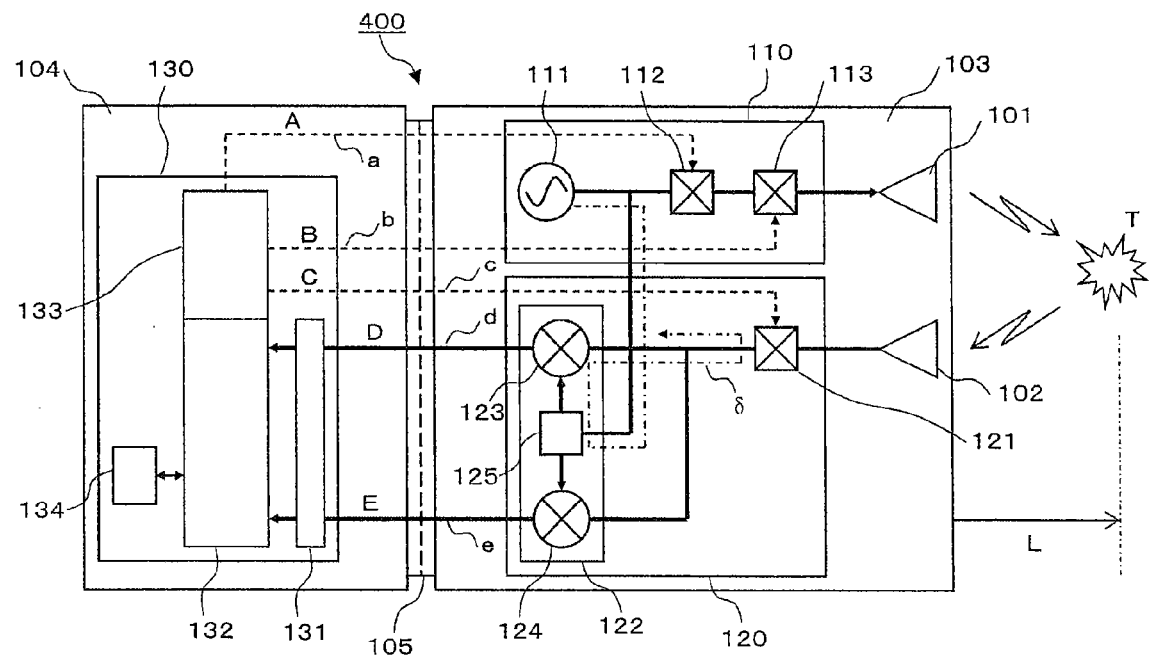
FIG. 22 is a block diagram illustrating a configuration of a pulse radar apparatus according to a first embodiment of the present invention.

A pulse radar apparatus of the fourth embodiment of the present invention will be explained below with reference to FIG. 22. FIG. 22 is a block diagram illustrating a configuration of a pulse radar apparatus 400 of the present embodiment. In FIG. 22, the pulse radar apparatus 400 includes a radio frequency transmission unit 110 and a radio frequency reception unit 120 for processing a radio frequency signal, the baseband unit 130 for processing a low frequency signal, a transmission antenna 101 for radiating a radio wave into space, and a reception antenna 102 for receiving a reflected wave reflected by a target. In the explanation below, for the sake of easy explanation, the target detected by the pulse radar apparatus 400 is denoted as symbol T.

The radio frequency transmission unit 110 includes an oscillation apparatus 111 generating a predetermined radio frequency signal (carrier wave) which is a source of generation of a transmission signal of an electromagnetic wave and a first gate unit 112 and a second gate unit 113 for gating the radio frequency signal generated by the oscillation apparatus 111 into a pulse-shape signal in a predetermined time width (pulse signal). The first gate unit 112 and the second gate unit 113 are circuits for gating the radio frequency signal which is input from the oscillation apparatus 111 into a pulse signal of, for example, 1 [ns] width. A frequency multiplier and a switch can be used as the first gate unit 112 and the second gate unit 113. Two signal gating circuits including the first gate unit 112 and the second gate unit 113 are used, and therefore, a pulse signal sharply formed can be generated. The pulse-shape transmission signal which is output from the second gate unit 113 is transmitted to the transmission antenna 101, and is radiated as radio wave from the transmission antenna 101.

The radio frequency reception unit 120 includes a correlation apparatus 121 for receiving the reception signal received with the reception antenna 102 and obtaining correlation between the reception signal and the transmission signal, and also includes an IQ mixer 122 for down-converting the signal, which is output from the correlation apparatus 121, using the carrier wave received from the oscillation apparatus 111. The IQ mixer 122 includes a first mixer 123 for down-converting the signal into a baseband signal of I component, a second mixer 124 for down-converting the signal into a baseband signal of Q component, and an phase shifter 125 for applying a 90-degree phase difference to the carrier wave received from the oscillation apparatus 111 and outputting it to the first mixer 123 and the second mixer 124. The correlation apparatus 121 retrieves a signal of each measurement distance from the reception signal, and outputs it to the first mixer 123 and the second mixer 124.

The baseband unit 130 includes an A/D conversion unit 131 for receiving I component and Q component of the baseband signal down-converted by the first mixer 123 and the second mixer 124 and converting them into a digital signal, a digital signal processing unit 132 for calculating information about the target T by applying complex signal processing (complex Fourier transform (FFT: Fast Fourier Transform)) on the digital signal given by the A/D conversion unit 131, and a control unit 133 for controlling operation of the pulse radar apparatus 400, and a storage unit 134. The control unit 133 controls the ON/OFF state of each of the first gate unit 112, the second gate unit 113, and the correlation apparatus 121, which are radio frequency components. When both of the first gate unit 112 and the second gate unit 113 are turned on, the radio frequency transmission unit 110 outputs a transmission signal. The control signal generated by the control unit 133 is a signal of 1 [ns] width.

In the pulse radar apparatus 400 of the present embodiment configured as described above, each component constituting the radio frequency transmission unit 110 and the radio frequency reception unit 120 operates on a frequency in several dozen GHz band, whereas each component constituting the baseband unit 130 operates on a frequency no more than about 2 GHz. As described above, the operation frequency of the radio frequency transmission unit 110 and the radio frequency reception unit 120 is greatly different from the operation frequency of the baseband unit 130, and therefore, the radio frequency transmission unit 110 and the radio frequency reception unit 120 and the baseband unit 130 are preferably formed on separate circuit boards designed for the respective frequency bands. In the present embodiment, the radio frequency transmission unit 110 and the radio frequency reception unit 120 are formed on a radio frequency circuit board 103, and the baseband unit 130 is formed on a low frequency circuit board 104. The transmission antenna 101 and the reception antenna 102 for transmitting and receiving the radio frequency signal are arranged on the radio frequency circuit board 103.

The circuit board used for radio frequency is more expensive than the circuit board for low frequency, and therefore, in the present embodiment, only the radio frequency transmission unit 110, the radio frequency reception unit 120, the transmission antenna 101, and the reception antenna 102 are arranged on the radio frequency circuit board 103 which is expensive, and the baseband unit 130 for processing the low frequency signal is arranged on a low frequency circuit board 104 which is less expensive. Therefore, the cost of the pulse radar apparatus 400 can be reduced.

As explained above, in order to arrange the components of the pulse radar apparatus 400 on the radio frequency circuit board 103 and the low frequency circuit board 104 in a separated manner, it is necessary to have means for electrically connecting the components on the radio frequency circuit board 103 and the components on the low frequency circuit board 104. In the pulse radar apparatus 400 of the present embodiment, the multi-pin connector 105 which is inexpensive and small and has been conventionally used is used. The control signal which is output from the control unit 133 on the low frequency circuit board 104 is transmitted to the radio frequency transmission unit 110 and the radio frequency reception unit 120 on the radio frequency circuit board 103 via the connector 105. The baseband signal which is output from the radio frequency reception unit 120 on the radio frequency circuit board 103 is transmitted to the baseband unit 130 on the low frequency circuit board 104 via the connector 105.

As described above, when the control signal and the baseband signal are exchanged using the conventional multi-pin connector 105 between the radio frequency circuit board 103 and the low frequency circuit board 104, the interference noise signal due to the control signal is mixed into the baseband signal of a low signal strength having information about the target T. The carrier wave which is output from the oscillation apparatus 111 passes through the IQ mixer 122 and is reflected by the correlation apparatus 121, and again, the self mixing noise generated by down-converting with the IQ mixer 122 is also mixed into the baseband signal. In particular, when the target T is located at a distance, the amplitude level of each reflected signal is low, and therefore, the baseband signal may be buried in the above-described the interference noise signal and the self mixing noise.

Figure 23:
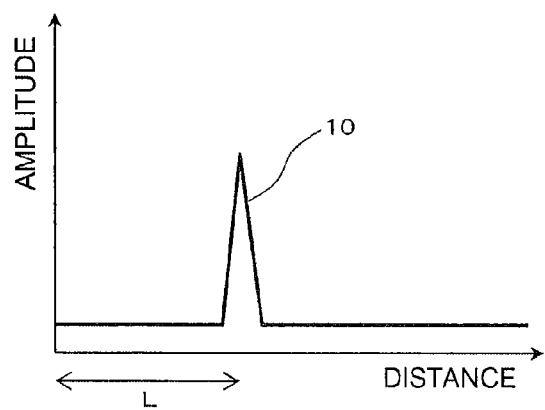
FIG. 23 is a time waveform chart of a signal when there is no influence by noise.
Figure 24:
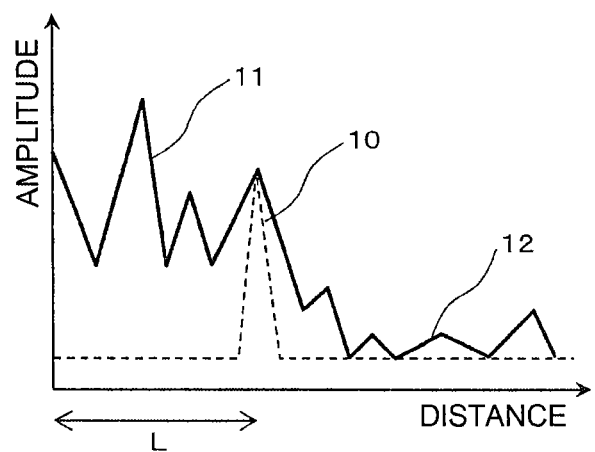
FIG. 24 is a time waveform chart of a signal when a signal of an undesired wave is mixed.

Accordingly, the pulse radar apparatus 400 of the present embodiment generates, in advance, a replica signal of an undesired wave such as noise mixed into the baseband signal passing through the connector 105, and removes the replica signal from the baseband signal during detection of the target T. An example of replica signal of the undesired wave will be explained with reference to FIGS. 23 and 24. In FIG. 23, the transmission antenna 101 radiates a pulse signal generated by the radio frequency transmission unit 110, and the reception antenna 102 receives a reflected wave reflected by the target T, and FIG. 23 is a time waveform chart illustrating an example of signal 10 processed by the digital signal processing unit 132 (it should be noted that the horizontal axis represents a distance corresponding to a time. Hereinafter, this is also applicable to FIGS. 24, and 27 to 30). The waveform of the signal 10 shown in FIG. 23 is a waveform when it is not affected by noise. FIG. 24 illustrates a time waveform chart when the signal of the above-described undesired wave is mixed into the signal 10 as illustrated in FIG. 23. The signal of reference numeral 11 schematically denotes an interference noise signal mixed into the baseband signal at the connector 105, and the signal of reference numeral 12 schematically denotes a self mixing noise.

In the present embodiment, the replica signal of the undesired wave combining the interference noise signal 11 and the self mixing signal 12 as illustrated in FIG. 24 is generated in advance, and stored in the storage unit 134. Then, when the pulse radar apparatus 400 is activated to detect the target T, the reception signal is processed by the radio frequency reception unit 120, and is output to the baseband unit 130 via the connector 105, and the above-described replica signal is subtracted from the signal processed by the digital signal processing unit 132. Therefore, a signal as illustrated in FIG. 23 (low noise signal) is obtained. In the explanation below, a method for generating the above-described replica signal in advance will be explained in detail with reference to the drawings.

In FIG. 22, a control signal which is output from the control unit 133 to the first gate unit 112 (first control signal) and a control line transmitting it (first control line) are defined as A, a, respectively, and a control signal which is output from the control unit 133 to the second gate unit 113 (second control signal) and a control line transmitting it (second control line) are defined as B, b, respectively. A control signal which is output from the control unit 133 to the correlation apparatus 121 (third control signal) and a control line transmitting it (third control line) are defined as C, c, respectively. The control signals A, B control the ON/OFF state of the first gate unit 112 and the second gate unit 113, respectively, and the control signal C controls the ON/OFF state of the correlation apparatus 121. In this case, the transmission control signal includes two signals, i.e., the first control signal and the second control signal, and the reception control signal includes one signal, i.e., the third control signal. In the pulse radar apparatus and the control method therefor of the present invention, the numbers of transmission control signals and reception control signals are not limited to the above, and more control signals may be provided therefor.

A baseband signal which is output from the first mixer 123 of the IQ mixer 122 to the A/D conversion unit 131 (I component) and a signal line transmitting it are denoted as D, d, respectively, and a baseband signal which is output from the second mixer 124 to the A/D conversion unit 131 (Q component) and a signal line transmitting it are denoted as E, e, respectively. All of the above-described control lines a, b, c, and the signal lines d, e are passed through different pins of the connector 105.

In the pulse radar apparatus 400, when the control signals A, B are output to the first gate unit 112 and the second gate unit 113 with appropriate timing via the control lines a, b from the control unit 133, and each of them is energized for substantially 1 [ns] according to the control signals A, B, a carrier wave generated by the oscillation apparatus 111 is gated into a pulse width of 1 [ns]. Accordingly, a transmission signal of 1 [ns] width pulse based on the carrier wave of the predetermined frequency is generated, and this is transmitted to the transmission antenna 101, and is radiated into the air as radio wave. The radiated radio wave is reflected by the target T located at a position away by a distance L, and is received by the reception antenna 102.

When the control unit 133 outputs a control signal C to the correlation apparatus 121 with predetermined timing via a control line c, the correlation apparatus 121 is energized, and correlation between the transmission signal and the reception signal received by the reception antenna 102 is obtained. The signal which is output from the correlation apparatus 121 is down-converted into a complex baseband signal by the IQ mixer 122. The baseband signals D, E down-converted by the first mixer 123 and the second mixer 124, respectively, are input into the A/D conversion unit 131 of the baseband unit 130 via the signal lines d, e, and is converted into a digital signal thereby. This digital signal is subjected to the complex signal processing in the digital signal processing unit 132, and the position information and the relative speed information about the target T are calculated.

The control lines a, b, c, and the signal lines d, e as illustrated in FIG. 22 are connected with the connector 105 between the radio frequency circuit board 103 and the low frequency circuit board 104. Each pin (terminal) of the connector 105 is not covered, and therefore, the signal flowing through each terminal sneaks into another terminal to cause interference though it is very low level. The control signals A, B, C flowing through the control lines a, b, c are signals for energizing/deenergizing RF components (the first gate unit 112, the second gate unit 113, the correlation apparatus 121), and have a signal strength of about, for example, 2 to 3 [V]. In contrast, the baseband signals D, E flowing through the signal lines d, e are signals obtained by down-converting a signal of a low signal strength reflected by the target T, and is a signal of an extremely low strength. For this reason, the control signals A, B, C are signals of relatively extremely high strength as compared with the baseband signals D, E, and the control signals A, B, C leak from the control lines a, b, c into the signal lines d, e at the connector 105.

Figure 25:
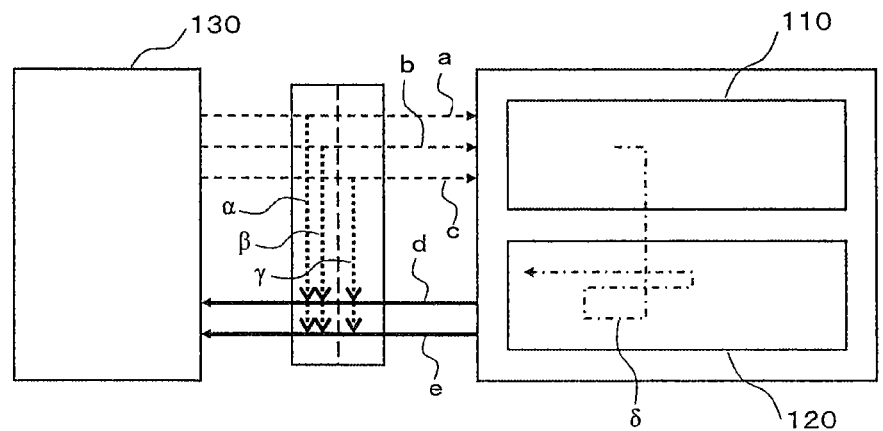
FIG. 25 is an enlarged diagram enlarging and displaying a control line and a signal line of the pulse radar apparatus according to the first embodiment of the present invention.

The control lines and the signal line explained above in the pulse radar apparatus 400 are enlarged and shown in FIG. 25. In FIG. 25, the signals sneaking from the control lines a, b, c to the signal lines d, e at the connector 105 are denoted as interference noise signals α, β, γ, respectively. The interference noise signals α, β, γ are the signals having substantially the same strength as the baseband signals D, E passing through the signal lines d, e. In FIG. 25, symbol δ denotes a self mixing noise which is output from the oscillation apparatus 111, passes through the IQ mixer 122, is reflected by the correlation apparatus 121, and is again down-converted by the IQ mixer 122. This self mixing noise δ is also mixed into the baseband signals D, E.

In the pulse radar apparatus 400 of the present embodiment, the first gate unit 112, the second gate unit 113, and the correlation apparatus 121 are operated at appropriate timing via the control lines a, b, c, so as to generate, in advance, the replica signal of the undesired wave including each of the above-described noises mixed into the baseband signals D, E before the pulse radar apparatus 900 is started to be used. Then the obtained replica signal of the undesired wave is stored in the storage unit 134, and during detection of the target T, each noise is removed by subtracting the replica signal from the baseband signals D, E obtained by down-converting the reception signal.

Figure 26:
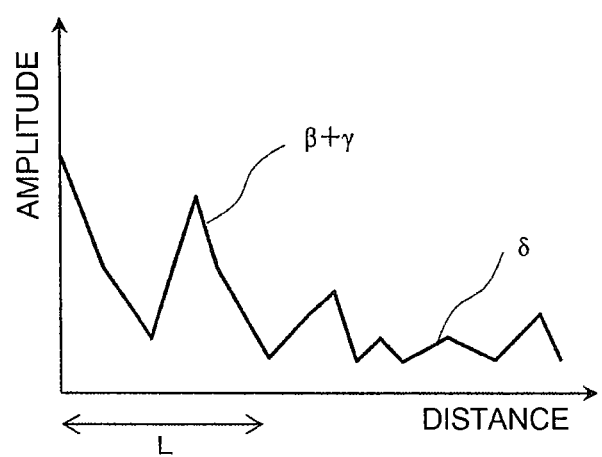
FIG. 26 is a time waveform chart of a noise signal when a control signal is not output to the first gate unit of the pulse radar apparatus according to the first embodiment of the present invention.
Figure 27:
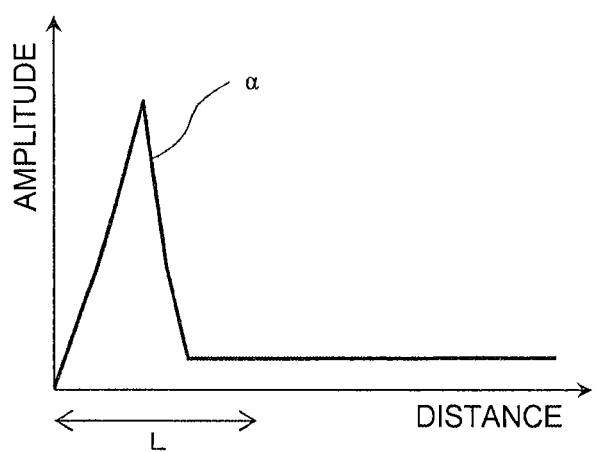
FIG. 27 is a time waveform chart of a noise signal when a control signal is output only to the first gate unit of the pulse radar apparatus according to the first embodiment of the present invention.
Figure 28:
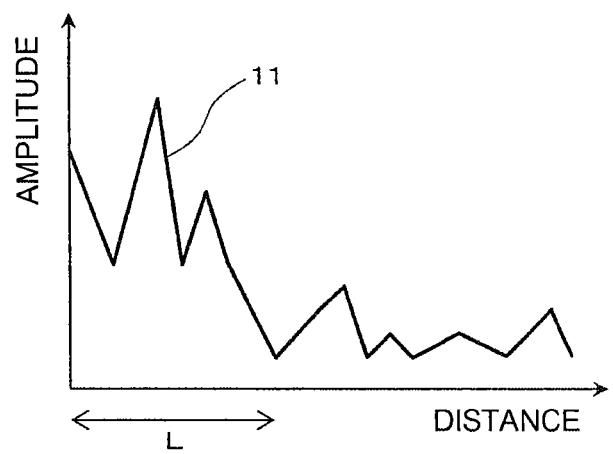
FIG. 28 is a time waveform chart illustrating a replica signal generated by a pulse radar apparatus according to the first embodiment of the present invention.

In the explanation below, a method for generating the replica signal of the undesired wave will be explained in detail with reference to FIGS. 26 to 28. FIGS. 26 to 28 are figures illustrating examples of a noise signal and a replica signal obtained according to the control method for the pulse radar apparatus of the present embodiment. In the present embodiment, when the replica signal of the undesired wave is generated, the transmission radio wave is not radiated from the transmission antenna 101.

In the present embodiment, the replica signal is generated in two radar operations. In the two radar operations, each of the two control signals A, B is output one by one so that the transmission radio wave is not output. In a radar operation for outputting any one of the two control signals A, B, the third control signal C is not output, and the oscillation apparatus 111 stops outputting the carrier wave. By stopping the output of the carrier wave, the self mixing noise δ does not occur. Accordingly, only the noise signal from any one of the two control signals A, B can be obtained. In the explanation below, for example, a replica signal is generated from two radar manipulations including a radar operation for not outputting only the control signals A and a radar operation for outputting only the control signal A.

First, the radar is activated under the following condition: the control unit 133 does not output only the control signals A and outputs the control signals B, C to pass them to the control lines b, c, and the oscillation apparatus 111 outputs the carrier wave. Accordingly, the digital signal processing unit 132 receives a noise signal (β+γ+δ) obtained by combining the self mixing noise δ and the interference noise signals β, γ made when the control signals B, C are mixed into the signal lines d, e. The noise signal (β+γ+δ) is processed by the digital signal processing unit 132, and a noise signal as shown in FIG. 26 can be obtained. FIG. 26 is a figure illustrating an example of a time waveform of the noise signal (β+γ+δ). The noise signal (β+γ+δ) obtained by processing in the digital signal processing unit 132 is saved as the first background signal in the storage unit 134.

Subsequently, only the control signal A is output from the control unit 133, and is passed to the control line a, and the output of the control signals B, C is stopped. Further, the output of the carrier wave from the oscillation apparatus 111 is stopped, and the radar is activated. Accordingly, the digital signal processing unit 132 receives a noise signal of only the interference noise signal α made when the control signal A is mixed into the signal lines d, e. The noise signal α is processed by the digital signal processing unit 132, and a noise signal as shown in FIG. 27 can be obtained. FIG. 27 is a figure illustrating an example of a time waveform of the noise signal α. The noise signal α obtained by processing in the digital signal processing unit 132 is adopted as the second back-ground, and is added to the noise signal (β+γ+δ) saved in the storage unit 134 and saved therein.

In the above two radar operations, the noise signal (β+γ+δ) and the noise signal α are added, and the noise signal obtained by combining all the undesired waves is calculated as follows.

$$(\beta+\gamma+\delta)+\alpha=\alpha+\beta+\gamma+\delta$$

As described above, the replica signal (α+β+γ+δ) of the noise signal obtained by combining the interference noise signals α, β, γ, and the self mixing noise δ can be saved in the storage unit 134. The time waveform of the replica signal (α+β+γ+δ) is obtained by adding the time waveform of FIG. 26 and the time waveform of FIG. 27. An example of a time waveform of the replica signal (α+β+γ+δ) is shown in FIG. 28.

Figure 29:
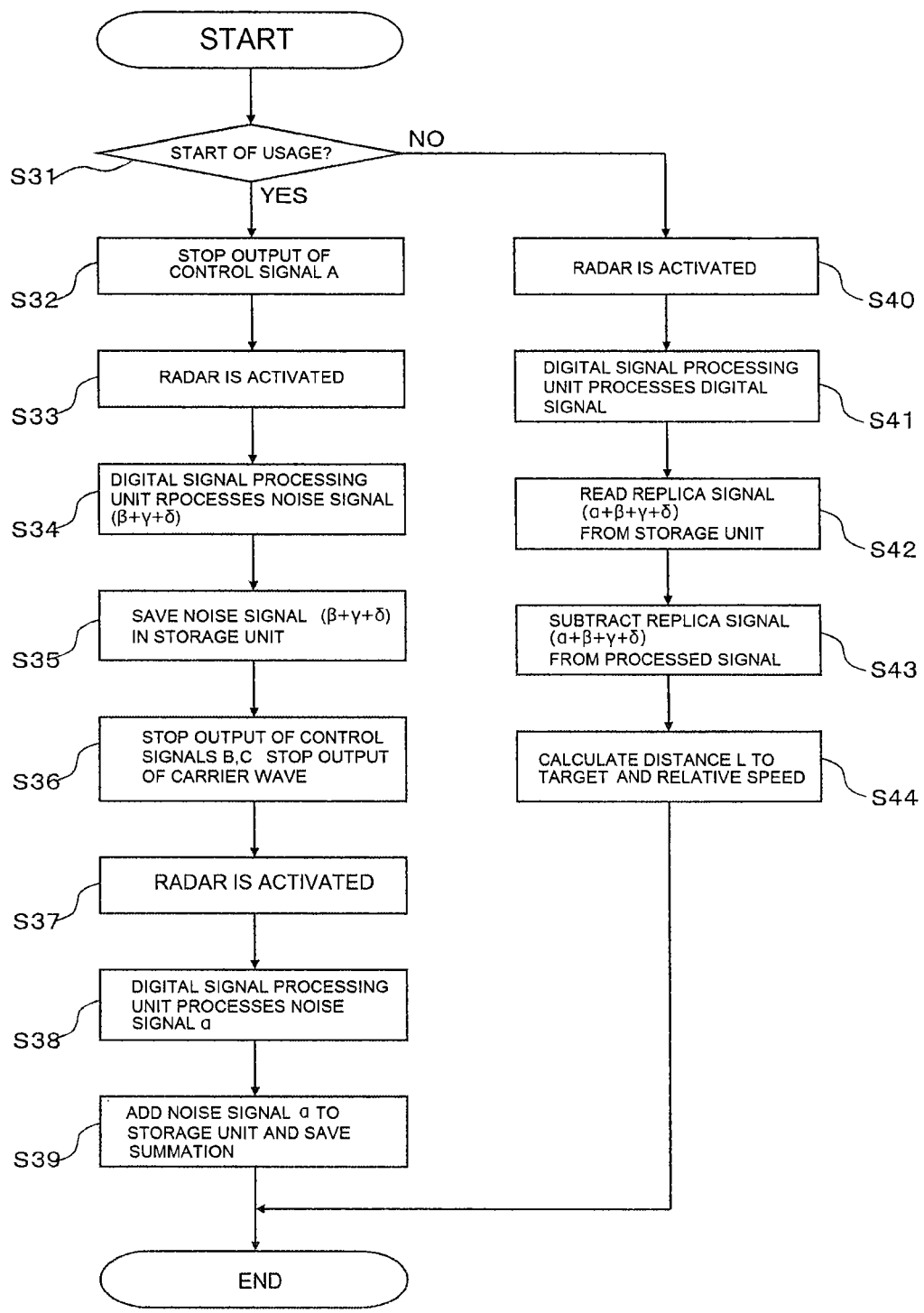
FIG. 29 is a flow diagram illustrating a signal processing method with the pulse radar apparatus according to the first embodiment of the present invention.

In the explanation below, a method for generating, in advance, the replica signal of the undesired wave and making correction using this will be explained with reference to the flow diagram illustrated in FIG. 29. FIG. 29 is a flow diagram for explaining the control method for the pulse radar apparatus of the present embodiment. In the present embodiment, when the replica signal of the undesired wave is generated, the transmission radio wave is not radiated from the transmission antenna 101.

First, in step S31, a determination is made as to whether the pulse radar apparatus 400 is started to be used. When the pulse radar apparatus 100 is determined to be started to be used, then, step S32 is subsequently performed. On the other hand, when the pulse radar apparatus 100 is determined to be already being used, step S40 is subsequently performed. In step S32, the output is stopped so that the control unit 133 does not output the control signal A. Subsequently, the radar is activated in step S33. At this occasion, the control unit 133 outputs the control signals B, C, which are passed to the control lines b, c. The oscillation apparatus 111 outputs the carrier wave. With such a radar operation, the digital signal processing unit 132 receives the noise signal (β+γ+δ) of the first background signal. In step S34, the noise signal (β+γ+δ) is processed by the digital signal processing unit 132, and saved in the storage unit 134 in step S35.

In subsequent in step S36, the output of both control signals are stopped so that the control unit 133 does not output the control signals B, C. In addition, the output of the carrier wave from the oscillation apparatus 111 is also stopped. Subsequently, the radar is activated in step S37. At this occasion, the control unit 133 outputs only the control signal A which flows into the control line a. The oscillation apparatus 111 does not output the carrier wave. With such a radar operation, the digital signal processing unit 132 receives the noise signal α of the second background signal. In step S38, the noise signal α is processed by the digital signal processing unit 132, and is added to the noise signal (β+γ+δ) saved in the storage unit 134 and saved in step S39.

In the above-described two radar operations, the noise signal (β+γ+δ) and the noise signal α are added, and the noise signal (α+β+γ+δ) obtained by combining all the undesired waves is calculated. The replica signal (α+β+γ+δ) of the noise signal obtained by combining the interference noise signals α, β, γ, and the self mixing noise δ can be saved in the storage unit 134.

On the other hand, when the pulse radar apparatus 400 is determined to be already used in step S31, the radar is activated in step S40. At this occasion, the control unit 133 outputs the control signals A, B, C, which are respectively passed to the control lines a, b, c. The oscillation apparatus 111 outputs the carrier wave. With the radar operation, the radio frequency transmission unit 110 generates the transmission signal, and this is radiated as a radio wave from the transmission antenna 101. Then, the reflected wave reflected by the target T is received by the reception antenna 102. The reception signal received by the reception antenna 102 is down-converted into a baseband signal by the radio frequency reception unit 120, and is transmitted via the connector 105 to the A/D conversion unit 131.

The baseband signal received by the A/D conversion unit 131 is converted into a digital signal here, and thereafter, it is transmitted to the digital signal processing unit 132. The digital signal transmitted to the digital signal processing unit 132 includes the noise signal ($\alpha+\beta+\gamma+\delta$) mixed at the connector 105 and the like. In step S41, the digital signal obtained from the reception signal is processed by the digital signal processing unit 132. Accordingly, a signal as shown in FIG. 24 is obtained, which is made by mixing the interference noise signal 11 and self mixing noise 12 into the signal 10.

In step S42, the replica signal ($\alpha+\beta+\gamma+\delta$) is read from the storage unit 134, and in step S43, the replica signal ($\alpha+\beta+\gamma+\delta$) is subtracted from the signal processed by the digital signal processing unit 132. Therefore, a signal 10 as illustrated in FIG. 23 is obtained. On the basis of this signal 10, the distance L to the target T and the relative speed thereof are calculated in step S44.

In the present embodiment, in order to calculate the relative speed in the processing of the digital signal processing unit 132, the complex signal processing (FFT processing) is performed on the input signal, and the Doppler component of the target is calculated. Any of the noise signals generated in the pulse radar apparatus 400 explained above is steady-state noise, and therefore, none of the noise signals $\alpha$, $\beta$, $\gamma$, $\delta$ includes Doppler component, and the noise signals include only 0 [Hz] component corresponding to the relative speed of zero.

Accordingly, the noise signal data obtained from the processing of the digital signal processing unit 132 in steps S34 and S38 are only the noise signal of 0 [Hz] component corresponding to the relative speed of zero. The Fourier transform data of the replica signal ($\alpha+\beta+\gamma+\delta$) saved in the storage unit 134 in step S39 are also only 0 [Hz] component corresponding to the relative speed of zero. Therefore, the replica signal ($\alpha+\beta+\gamma+\delta$) is subtracted from only 0 [Hz] component obtained by performing complex signal processing on the signal received from the A/D conversion unit 131 in the above in step S43.

When it is not necessary to measure the relative speed of the target, it is not necessary for the digital signal processing unit 132 to perform the FFT processing, and it may be possible to make determination only as to whether a signal of a target is detected within each distance gate. Further, even when it is not necessary to measure the relative speed of the target, the digital signal processing unit 132 may perform the FFT processing to improve the S/N ratio, and it may be possible to make determination only as to whether a signal of a target is detected within each distance gate. Even in such cases, the data of the corresponding distance gate of the replica signal ($\alpha+\beta+\gamma+\delta$) is subtracted from data of each distance gate obtained when the control signals A, B, C are output from the control unit 133, whereby low noise signal can be obtained. The target can be detected reliably on the basis of this.

In the flow diagram as illustrated in FIG. 29, the replica signal ($\alpha+\beta+\gamma+\delta$) is generated when the pulse radar apparatus 400 is started to be used (when it is turned on), but the configuration is not limited thereto. The replica signal ($\alpha+\beta+\gamma+\delta$) may be generated with a regular interval while the pulse radar apparatus 400 is used. While the pulse radar apparatus 400 is used, for example, the temperature in the apparatus may increase and the replica signal may slightly change. For this reason, even while the pulse radar apparatus 400 is used, the replica signal is generated again with a regular interval, so that the radar performance of the pulse radar apparatus 400 can be further improved.

As explained above, according to the pulse radar apparatus of the present invention, the replica signal of the noise signal is generated in advance, and is removed from the reception signal, so that the information about the target can be detected with a high degree of accuracy. In the pulse radar apparatus of the present invention, a circuit board for low frequency which is less expensive may be used for the baseband unit of which operation frequency is low, and the circuit board for the low frequency and the circuit board for the high frequency can be connected using a generally-available connector conventionally used. Therefore, the small pulse radar apparatus can be provided at a low cost.

Fifth Embodiment

Figure 30:
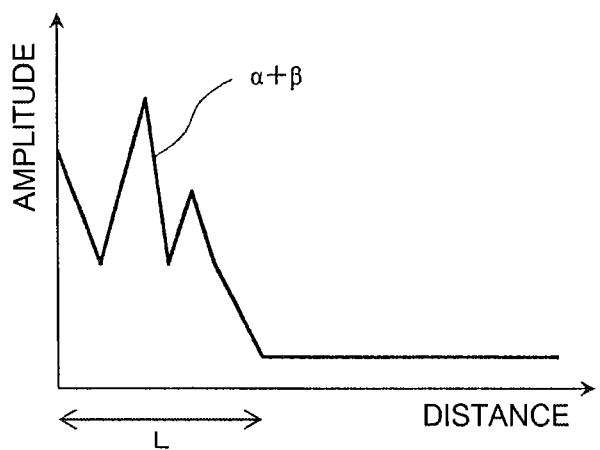
FIG. 30 is a time waveform chart of a noise signal when a control signal is output only to the first gate unit and the second gate unit of the pulse radar apparatus according to the second embodiment of the present invention.
Figure 31:
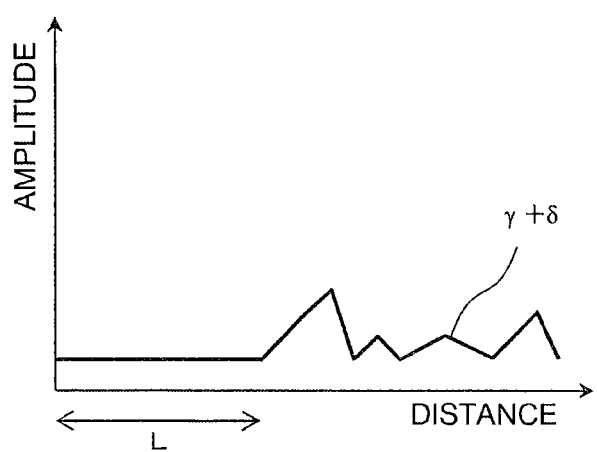
FIG. 31 is a time waveform chart of a noise signal when a control signal is not output only to the first gate unit and the second gate unit of the pulse radar apparatus according to the second embodiment of the present invention.

A control method of a pulse radar apparatus of a fifth embodiment of the present invention will be explained below with reference to FIGS. 30 and 31. FIGS. 30 and 31 are figures illustrating an example of a noise signal obtained according to the control method for the pulse radar apparatus of the present embodiment. In the present embodiment, the replica signal is generated in two radar operations, but the control signal which is output in each of them is different from that of the first embodiment.

In the present embodiment, one of the two radar operations for generating the replica signal is done as follows. The radar is activated under the following condition: the control signals A, B for activating the radio frequency transmission unit 110 are output at a time to be passed to the control lines a, b, and the control signal C for activating the correlation apparatus 121 is not output, and the oscillation apparatus 111 stops outputting the carrier wave. Accordingly, the digital signal processing unit 132 receives a noise signal ($\alpha+\beta$) of the interference noise signals $\alpha$, $\beta$ made when the control signals A, B is mixed into the signal lines d, e. The noise signal ($\alpha+\beta$) is processed by the digital signal processing unit 132, and a noise signal as shown in FIG. 30 can be obtained. FIG. 30 is a figure illustrating an example of a time waveform of the noise signal ($\alpha+\beta$). The noise signal ($\alpha+\beta$) obtained by processing in the digital signal processing unit 132 is saved as the second background signal in the storage unit 134.

In the other of the two radar operations, the radar is activated under the following condition: the control signals A, B are not output, the control signal C is output to be passed to the control line c, and the oscillation apparatus 111 outputs the carrier wave. Accordingly, the digital signal processing unit 132 receives a noise signal ($\gamma+\delta$) obtained by combining the self mixing noise $\delta$ and the interference noise signals $\gamma$ made when the control signals C are mixed into the signal lines d, e. The noise signal ($\gamma+\delta$) is processed by the digital signal processing unit 132, and a noise signal as shown in FIG. 31 can be obtained. FIG. 31 is a figure illustrating an example of a time waveform of the noise signal ($\gamma+\delta$). The noise signal ($\gamma+\delta$) obtained by processing in the digital signal processing unit 132 is adopted as the first background, and is added to the noise signal ($\alpha+\beta$) saved in the storage unit 134 and saved therein.

By the way, when the oscillation apparatus 111 cannot be stopped, one of the two radar operations for generating the replica signal is done such that the two control signals A, B which are output to the radio frequency transmission unit 110 are output at a time, and at this occasion, the control signal C is not output. Accordingly, the radio frequency transmission unit 110 generates the transmission signal, and this is radiated as a radio wave from the transmission antenna 101. When the radio wave is radiated, and there is a target within the discovery distance, this is received by the reception antenna 102 and is output to the digital signal processing unit 132, and therefore, the reception signal and the noise signal are added, and only the noise signal alone cannot be obtained.

However, when there is not target in the discovery distance, the strength of the reception signal is reduced, and therefore, no problem would be caused. Even when there is a target, the control signal C is not output, and the correlation apparatus 121 is not activated, and therefore, the digital signal which is output to the digital signal processing unit 132 is a signal of which strength is greatly reduced and at an extremely low level. The replica signal generated in the present embodiment has a little bit lower degree of accuracy as compared with generation without radiating the radio wave, but a sufficient replica signal for improving the accuracy of the target information can be obtained. In addition, the control signals A, B can be output to the radio frequency transmission unit 110 according to the same method as the case where the target information is detected, and the control during the replica signal generation can be further facilitated.

In the above-described two radar operations, the noise signal ($\alpha+\beta$) of the second background and the noise signal ($\gamma+\delta$) of the first background are added, and the noise signal obtained by combining all the undesired waves is calculated as follows.

$$(\alpha+\beta)+(\gamma+\delta)=\alpha+\beta+\gamma+\delta$$

As described above, the replica signal ($\alpha+\beta+\gamma+\delta$) of the noise signal obtained by combining the interference noise signals $\alpha$, $\beta$, $\gamma$, and the self mixing noise $\delta$ can be saved in the storage unit 134. The time waveform of the replica signal ($\alpha+\beta+\gamma+\delta$) can be obtained as what is shown in FIG. 28, for example, by adding the time waveform of FIG. 30 and the time waveform of FIG. 31.

In the explanation below, a method for generating, in advance, the replica signal of the undesired wave and making correction using it will be explained with reference to the flow diagram illustrated in FIG. 32. FIG. 32 is a flow diagram for explaining the control method for the pulse radar apparatus of the present embodiment. In the explanation below, processing different from the fourth embodiment will be mainly explained.

When the pulse radar apparatus 400 is determined to be started to be used in step S31, then, in step S52, the output is stopped so that the control unit 133 does not output the control signal C, and the output of the carrier wave from the oscillation apparatus 111 is also stopped. Accordingly, in step S54, the noise signal ($\alpha+\beta$) is processed by the digital signal processing unit 132, and saved in the storage unit 134 in step S55. In the subsequent step S56, the output is stopped so that the control unit 133 does not output the control signals A, B. The oscillation apparatus 111 outputs the carrier wave. Accordingly, in step S58, the noise signal ($\gamma+\delta$) is processed by the digital signal processing unit 132, and saved in the storage unit 134 in step S59.

In the above-described two radar operations, the noise signal ($\gamma+\delta$) is added to the noise signal ($\alpha+\beta$), and the replica signal ($\alpha+\beta+\gamma+\delta$) of the noise signal obtained by combining all the undesired waves is stored in the storage unit 134. As described above, even in the present embodiment, the replica signal can be generated in the two radar operations.

In the pulse radar apparatus 400 of the above embodiment, each of the transmission and reception antennas is provided, but the configuration is not limited thereto. For example, a pulse radar apparatus for measuring a phase angle according to a phase monopulse method needs to have two reception antennas, but in such a pulse radar apparatus, the replica signal of the noise signal may be likewise generated, and it may be removed from the reception signal.

In the pulse radar apparatus and the control method therefor of the above-described embodiment, when the background signal is obtained, there are cases where the carrier wave is output from the oscillation apparatus, and the case where the carrier wave is not be output. Among them, in the case where the oscillation apparatus outputs the carrier wave, when there is an external target (reflection object), a reflected signal therefrom may be received, and the replica signal may involve error, but the error is small, and causes no problem in particular in detection of the target information.

The description in the present embodiments illustrates an example of a pulse radar apparatus and a control method therefor according to the present invention, and the present invention is not limited thereto. The detailed configuration and the detailed operation of the pulse radar apparatus and the control method therefor according to the present embodiments may be changed as necessary without deviating from the gist of the present invention.

REFERENCE SIGNS LIST

100,200,300,400 pulse radar apparatus
101 transmission antenna
102 reception antenna
103 radio frequency circuit board
104 low frequency circuit board
105 connector
110 radio frequency transmission unit
111 oscillation apparatus
112 first gate unit
113 second gate unit
120 radio frequency reception unit
121 correlation apparatus
122 IQ mixer
123 first mixer
124 second mixer
125 phase shifter
130 baseband unit
131 A/D conversion unit
132 digital signal processing unit
132*a* unit sampling processing unit
132*b* target information detection unit
132*c* replica signal generation unit
133 control unit
134 storage unit
135 radar function switching unit
332*a* selection unit

The invention claimed is:

1. A control method for a pulse radar apparatus providing information by detecting information about a target in a predetermined discovery distance with an update period which is set in advance, the control method comprising:

a transmission signal processing step of gating a carrier wave of a predetermined frequency into a pulse-shape in accordance with two or more transmission control signals, and generating a transmission signal when the two or more transmission control signals are output;

a transmission step of radiating the transmission signal as a radio wave to space;

a reception step of receiving a reflected wave generated when the radio wave is reflected by the target;

a unit sampling processing step of repeating the transmission signal processing step, the transmission step, and the reception step at a plurality of times with a predetermined repetition period, and obtaining distance data by sampling the reception signals for each measurement distance in accordance with a reception control signal;

a unit noise processing step of obtaining a noise signal included in each of the distance data;

a replica signal generation step of updating a replica signal using the noise signal obtained in the unit noise processing step; and a target information detection step of performing the unit sampling processing step for a first set number of times while the measurement distance is changed, so as to obtain all the distance data within the discovery distance, and detecting the information about the target by subtracting the replica signal from all of the distance data, wherein in a first period in the update period, the target information detection step is performed, in a second period which is the remaining period except the first period in the update period, the unit noise processing step is performed a predetermined number of times while an output condition and/or the measurement distance of the transmission control signal used in the transmission signal processing step are changed, and the unit noise processing step is repeatedly performed until all the noise signals for all the distance data are obtained, and further, processing for obtaining all the noise signals for all the distance data is repeatedly performed.

2. The control method for the pulse radar apparatus according to claim 1, wherein when the transmission control signals are X1 to Xm (m≥2), wherein in the unit noise processing step, when, among the transmission control signals, the i-th transmission control signal Xi is not output, and the transmission control signals other than Xi and the reception control signal are output, the transmission signal processing step, the transmission step, and the reception step are repeated a plurality of times with the repetition period, and a signal obtained through sampling for each measurement distance in accordance with the reception control signal at this occasion is saved as a noise signal for each distance data for the i-th background signal; and when all of the m transmission control signals are not output, and the reception control signal is output, the transmission signal processing step, the transmission step, and the reception step are repeated a plurality of times with the repetition period, and a signal obtained through sampling for each measurement distance in accordance with the reception control signal at this occasion are saved as a noise signal for each distance data of the (m+1)-th background signal.

3. The control method for the pulse radar apparatus according to claim 2, wherein in the replica signal generation step, the replica signal is calculated by adding the first to the m-th background signals including all the noise signals for each distance data, subtracting the (m+1)-th background signal, and dividing a result by (m−1).

4. The control method for the pulse radar apparatus according to claim 1, wherein at a start of usage, the unit noise processing step is performed until all the noise signals for all the distance data are obtained, and further, an initial value of the replica signal is generated by performing the replica signal generation step.

5. A pulse radar apparatus providing information by detecting information about a target in a predetermined discovery distance with an update period which is set in advance, the pulse radar apparatus comprising:

a radio frequency transmission unit that includes an oscillation apparatus for generating a carrier wave of a predetermined frequency, gates the carrier wave into a pulse-shape in accordance with two or more transmission control signals, and generates a transmission signal when the two or more transmission control signals are output;

a transmission antenna that receives the transmission signal from the radio frequency transmission unit, and radiates the transmission signal as a radio wave to space;

a reception antenna that receives a reflected wave generated when the radio wave is reflected by the target;

a radio frequency reception unit that receives the reception signal from the reception antenna, performs correlation of the reception signal with the transmission signal in accordance with a reception control signal, and converts the correlated signal into a baseband signal; and a baseband unit that includes an A/D conversion unit for receiving the baseband signal and converting the baseband signal into a digital signal, a digital signal processing unit for receiving the digital signal from the A/D conversion unit, and detecting the target information, a control unit for outputting the transmission control signals to the radio frequency transmission unit and outputting the reception control signal to the radio frequency reception unit, and a radar function switching unit for controlling operation of the digital signal processing unit and the control unit;

wherein the digital signal processing unit further includes:

a unit sampling processing unit that receives the digital signal and obtains distance data by performing sampling for each measurement distance;

a replica signal generation unit that obtains a noise signal included in the distance data and updates a replica signal; and a target information detection unit that obtains all the distance data within the discovery distance from the unit sampling processing unit, and detects the target information by subtracting the replica signal from all the distance data, wherein when the transmission control signals are X1 to Xm (m≥2), and among the transmission control signals, the control unit does not output the i-th transmission control signal Xi and outputs the transmission control signal other than Xi and the reception control signal, the distance data obtained by the unit sampling processing unit at this occasion are adopted as a noise signal for each distance data, and a signal including all the noise signals for each distance data within the discovery distance is adopted as the i-th background signal, in this case, the replica signal generation unit calculates the replica signal by adding the first to the m-th background signals, subtracting the (m+1)-th background signal, and dividing the result by (m−1), and the radar function switching unit executes the target information detection unit in a first period in the update period, and executes the replica signal generation unit in a second period which is the remaining period other than the first period in the update period.

6. A control method for a pulse radar apparatus, comprising:
- a signal gating step of gating a carrier wave of a predetermined frequency into a pulse-shape in accordance with two or more transmission control signals, and generating a transmission signal;
- a transmission step of radiating the transmission signal as a radio wave to space;
- a reception step of receiving a reflected wave generated when the radio wave is reflected by the target;
- a correlation step that obtains correlation between the transmission signal and the reception signal received in the reception step in accordance with a reception control signal;
- a down-convert step of down-converting an output signal of the correlation step, and outputting a baseband signal;
- an A/D conversion step of receiving the baseband signal and converting the baseband signal into a digital signal; and
- a digital signal processing step of receiving the digital signal, and selectively performing one of replica signal generation processing for generating a replica signal of a noise signal included in the digital signal and target information detection processing for detecting information about the target by subtracting the replica signal from the digital signal,
- wherein when the digital signal processing step is to perform the target information detection processing, the signal gating step is performed in a first pulse repetition period, and when the digital signal processing step is to perform the replica signal generation processing, the signal gating step is performed in a second pulse repetition period which is shorter than the first pulse repetition period.

7. The control method for the pulse radar apparatus according to claim 6, wherein when the transmission control signals are X1 to Xm (m≥2), and in the signal gating step, among the transmission control signals, the i-th transmission control signal Xi is not output and the transmission control signals other than Xi and the reception control signal are output, a digital signal obtained in the A/D conversion step at this occasion is adopted as the i-th background signal,
- in this case, in the replica signal generation processing performed in the digital signal processing step,
- when the transmission control signals are successively selected from X1 to Xm as the i-th transmission control signal Xi, and the transmission control signal except Xi and the reception control signal are output in the signal gating step, digital signals obtained in the A/D conversion step are obtained as the first to the m-th background signals, and further, in the signal gating step, all of the m transmission control signals are not output, and the reception control signal is output, a digital signal obtained in the A/D conversion step is obtained as the (m+1)-th background signal, and a replica signal is generated by adding the first to the m-th background signals, subtracting the (m+1)-th background signal, and dividing the result by (m−1), and
- in the target information detection processing,
- when the m transmission control signals and the reception control signal are output in the signal gating step, low noise signal is calculated by subtracting the replica signal from the digital signal obtained in the A/D conversion step, and the target information is detected based on the low noise signal.

8. A pulse radar apparatus comprising:
- a radio frequency transmission unit that includes an oscillation apparatus that generates a carrier wave of a predetermined frequency, and generates a transmission signal by gating a carrier wave into a pulse-shape in accordance with two or more transmission control signals;
- a transmission antenna that receives the transmission signal from the radio frequency transmission unit and radiates the transmission signal as a radio wave into space;
- a reception antenna that receives a reflected wave made when the radio wave is reflected by a target;
- a radio frequency reception unit that includes a correlation unit that receives the reception signal from the reception antenna and performs correlation of the reception signal with the transmission signal in accordance with a reception control signal and a down-convert unit that down-converts an output signal given by the correlation unit into a baseband signal; and
- a baseband unit that includes an A/D conversion unit for receiving the baseband signal and converting the baseband signal into a digital signal, a digital signal processing unit for receiving the digital signal from the A/D conversion unit and selectively performing any one of replica signal generation processing for generating a replica signal of a noise signal included in the digital signal and target information detection processing for detecting information about the target by subtracting the replica signal from the digital signal, a control unit for outputting the transmission control signals to the radio frequency transmission unit and outputting the reception control signal to the correlation unit, and a radar function switching unit for giving the digital signal processing unit a command to perform either the target information detection processing or the replica signal generation processing, and giving the control unit a command of a pulse repetition period with which the radio frequency transmission unit generates the transmission signal, and
- the radar function switching unit gives the control unit a command of a first pulse repetition period as the pulse repetition period when the command of the target information detection processing is given to the digital signal processing unit, and when the command of the replica signal generation processing is given, the radar function switching unit gives the control unit a command of a second pulse repetition period shorter than the first pulse repetition period.

9. The pulse radar apparatus according to claim 8, wherein the digital signal processing unit includes a target information detection unit for performing the target information detection processing, a replica signal generation unit for performing the replica signal generation processing, and a selection unit for selecting any one of the target information detection unit and the replica signal generation unit in accordance with the command given by the radar function switching unit and outputting the digital signal which is received from the A/D conversion unit.

10. The pulse radar apparatus according to claim 8, wherein when the transmission control signals are X1 to Xm (m≥2), and the i-th transmission control signal Xi of the transmission control signals is not output from the control unit, and the transmission control signals other than xi and the reception control signal are output, a digital signal which is output from the A/D conversion unit at this occasion is adopted as the i-th background signal, and further, when all the m transmission control signals are not output, and the reception control signal is output, a digital signal which is output from the A/D conversion unit at this occasion is adopted as the (m+1)-th background signal, the control unit performs as follows:
when the control unit receives a command of the second pulse repetition period from the radar function switching unit, the control unit successively selects the transmission control signals from X1 to Xm as the i-th transmission control signal Xi, and outputs, to the radio frequency transmission unit, the transmission control signals other than Xi and the reception control signal, and when a command of the first pulse repetition period is received from the radar function switching unit, the m transmission control signals and the reception control signal are output to the radio frequency transmission unit, a digital signal processing unit performs as follow:
when a command of the replica signal generation processing is received from the radar function switching unit, the digital signal processing unit obtains the digital signal received from the A/D conversion unit as the first to (m+1)-th background signal in order, and generates the replica signal by adding the first to m-th background signals, subtracting the (m+1)-th background signal, and dividing the result by (m−1), and when a command of the target information detection processing is received from the radar function switching unit, the digital signal processing unit calculates low noise signal by subtracting the replica signal from the digital signal received from the A/D conversion unit, and detects the target information based on the low noise signal.

11. A pulse radar apparatus comprising:
a radio frequency transmission unit that includes an oscillation apparatus for generating a carrier wave of a predetermined frequency, gates the carrier wave into a pulse-shape in accordance with two or more transmission control signals, and generates a transmission signal when the two or more transmission control signals are output;

a transmission antenna that receives the transmission signal from the radio frequency transmission unit and radiates the transmission signal as a radio wave into space;

a reception antenna that receives a reflected wave made when the radio wave is reflected by a target;

a radio frequency reception unit that receives the reception signal from the reception antenna and obtains correlation of the reception signal with the transmission signal in accordance with a reception control signal, and converts the correlated signal into a baseband signal; and a baseband unit that includes an A/D conversion unit for receiving at least the baseband signal and converting the baseband signal into a digital signal, a digital signal processing unit for receiving the digital signal from the A/D conversion unit, and calculating a distance to the target and/or the relative speed of the target and/or an angle of the target, and a control unit for outputting the transmission control signals to the radio frequency transmission unit and outputting the reception control signal to the radio frequency reception unit, wherein when the control unit does not output some or all of the two or more transmission control signals, and outputs any remaining transmission control signals and the reception control signal, the digital signal processing unit obtains the digital signal which is output from the A/D conversion unit as a first background signal, and when the control unit outputs only some or all of the transmission control signals, the digital signal processing unit obtains the digital signal which is output from the A/D conversion unit as a second background signal, and calculates a replica signal by adding the first background signal to the second background signal, when the control unit outputs all of the two or more transmission control signals and the reception control signal and the oscillation apparatus outputs the carrier wave, the digital signal processing unit calculates low noise signal by subtracting the replica signal from the digital signal which is output from the A/D conversion unit at this occasion, and the digital signal processing unit calculates the distance to the target and/or the relative speed of the target and/or the angle of the target are calculated based on the low noise signal.

12. The pulse radar apparatus according to claim 11, wherein when the first background signal is obtained, the oscillation apparatus outputs the carrier wave, and when the second background signal is obtained, the oscillation apparatus stops output of the carrier wave.

13. The pulse radar apparatus according to claim 11, wherein when the first background signal is obtained, and when the second background signal is obtained, the oscillation apparatus outputs the carrier wave.

14. The pulse radar apparatus according to claim 11, wherein the digital signal processing unit performs Fourier transform processing on the digital signal which is received from the A/D conversion unit, and when the control unit outputs all of the two or more transmission control signals and the reception control signal, and the oscillation apparatus outputs the carrier wave, the digital signal processing unit calculates the low noise signal by subtracting Fourier component corresponding to 0 Hz of the replica signal from Fourier component corresponding to 0 Hz of the digital signal which is output from the A/D conversion unit.

15. The pulse radar apparatus according to claim 11, wherein at least the baseband unit is formed on a first circuit board, and the radio frequency transmission unit and the radio frequency reception unit are formed on another circuit board different from the first circuit board, a line connection unit of a multi-pin connector collectively connecting, in an energized state, a signal line transmitting the baseband signal and control lines transmitting the two or more transmission control signals and the reception control signal is provided between the first circuit board the another circuit board, and connection of the control lines and connection of the signal line in the line connection unit are arranged in a separated manner so as to make a level of a leaking signal from the control lines to the signal line stay within a dynamic range of the A/D conversion unit.

16. The pulse radar apparatus according to claim 11, wherein the radio frequency transmission unit further includes a first gate unit for gating the carrier wave into a pulse-shape in accordance with a first control signal and a second gate unit for generating the transmission signal by further gating the signal, which has been gated by the first gate unit, in accordance with a second control signal, the radio frequency reception unit includes a correlation unit that receives the reception signal from the reception antenna and obtains correlation of the reception signal with the transmission signal in accordance with a third control signal, and a down-convert unit that down-converts an output signal given by the correlation unit into a baseband, and outputs the baseband signal, the control unit controls ON/OFF states of the first gate unit, the second gate unit, and the correlation unit by outputting the first control signal, the second control signal, and the third control signal, respectively, and the digital signal processing unit calculates the replica signal with the two or more transmission control signals being two signals, the first control signal and the second control signal and with the reception control signal being the third control signal.

17. The pulse radar apparatus according to claim 16, wherein when the control unit does not output any one of the first control signal and the second control signal, and the third control signal, the digital signal which is output from the A/D conversion unit at that moment is adopted as the first background signal, and when the control unit outputs any one of the first control signal and the second control signal, the digital signal which is output from the A/D conversion unit at that moment is adopted as the second background signal, and the digital signal processing unit calculates the replica signal.

18. The pulse radar apparatus according to claim 17, wherein when the first background signal is obtained, the oscillation apparatus outputs the carrier wave, and when the second background signal is obtained, the oscillation apparatus stops the output of the carrier wave.

19. The pulse radar apparatus according to claim 17, wherein when the first background signal is obtained and when the second background signal is obtained, the oscillation apparatus outputs the carrier wave.

20. The pulse radar apparatus according to claim 16, wherein when the control unit does not output both of the first control signal and the second control signal, and outputs the third control signal, the digital signal which is output from the A/D conversion unit at that moment is adopted as the first background signal, and when the control unit outputs only both of the first control signal and the second control signal, the digital signal which is output from the A/D conversion unit at that moment is adopted as the second background signal, and the digital signal processing unit calculates the replica signal.

21. The pulse radar apparatus according to claim 16, wherein when the control unit outputs the first control signal, the second control signal, and the third control signal, and the oscillation apparatus outputs the carrier wave, the digital signal processing unit calculates the low noise signal by subtracting Fourier component corresponding to 0 Hz of the replica signal from Fourier component corresponding to 0 Hz of the digital signal which is output from the A/D conversion unit.

22. The pulse radar apparatus according to claim 17, wherein the baseband unit is formed on a low frequency circuit board corresponding to an operation frequency band of the baseband unit, the radio frequency transmission unit and the radio frequency reception unit are formed on a radio frequency circuit board corresponding to an operation frequency band of the radio frequency transmission unit and the radio frequency reception unit, and a line connection unit of a multi-pin connector collectively connecting, in an energized state, a signal line transmitting the baseband signal, and a first control line, a second control line, and a third control line transmitting the first control signal, the second control signal, and the third control signal is provided between the low frequency circuit board and the radio frequency circuit board, and connection of the control lines and connection of the signal line in the line connection unit are arranged in a separated manner so as to make a level of a leaking signal from the control lines to the signal line stay within a dynamic range of the A/D conversion unit.

23. A control method for a pulse radar apparatus comprising:
a carrier wave generation step of generating a carrier wave of a predetermined frequency;
a signal gating step of generating a transmission signal by gating the carrier wave into a pulse-shape in accordance with two or more transmission control signals;
a transmission step of radiating the transmission signal as a radio wave into space;
a reception step of receiving a reflected wave made when the radio wave is reflected by a target;
a correlation step of obtaining correlation between the transmission signal and the reception signal received in the reception step in accordance with a reception control signal;
a down-convert step of obtaining a baseband signal by down-converting an output signal in the correlation step into a baseband;
an A/D conversion step of receiving at least the baseband signal and converting the baseband signal into a digital signal; and
a digital signal processing step of receiving the digital signal, and calculating a distance to the target and/or relative speed of the target and/or an angle of the target, wherein in the digital signal processing step,
when in the signal gating step, some or all of the two or more transmission control signals are not output, and any remaining transmission control signals are output, and in the correlation step, the reception control signal is output, a digital signal which is obtained in the A/D conversion step at this occasion is obtained as a first background signal, and when in the signal gating step, only some or all of the transmission control signals are output, a digital signal obtained in the A/D conversion step is obtained as a second background signal, and a replica signal is calculated by adding the first background signal and the second background signal, and when in the signal gating step, all of the two or more transmission control signals are output, and in the correlation step, the reception control signal is output and the carrier wave generation step is performed, a low noise signal is calculated by subtracting the replica signal from the digital signal obtained in the A/D conversion step at this occasion, and the distance to the target and/or the relative speed of the target and/or the angle of the target are calculated based on the low noise signal.

24. The control method for the pulse radar apparatus according to claim 23, wherein when the first background signal is obtained, the carrier wave generation step is performed, and when the second background signal is obtained, the carrier wave generation step is not performed.

25. The control method for the pulse radar apparatus according to claim 23, wherein when the first background signal is obtained and when the second background signal is obtained, the carrier wave generation step is performed.

26. The control method for the pulse radar apparatus according to claim 23, wherein
in the digital signal processing step, Fourier transform processing is performed on the digital signal converted in the A/D conversion step,
when, in the signal gating step, all of the two or more transmission control signals are output, and in the correlation step, the reception control signal is output and the carrier wave generation step is performed, the low noise signal is calculated by subtracting Fourier component corresponding to 0 Hz of the replica signal from Fourier component corresponding to 0 Hz of the digital signal obtained in the A/D conversion step.

27. The control method for the pulse radar apparatus according to claim 23, wherein
the signal gating step includes a first gating step of gating the carrier wave into a pulse-shape in accordance with a first control signal, and a second gating step of generating a transmission signal by further gating the signal, which has been gated in the first gating step, in accordance with a second control signal,
in the correlation step, correlation between the reception signal and the transmission signal is obtained in accordance with a third control signal, and
in the digital signal processing step, the replica signal is calculated with the two or more transmission control signals being two signals, the first control signal and the second control signal and with the reception control signal being the third control signal.

28. The control method for the pulse radar apparatus according to claim 27, wherein in the digital signal processing step,
when, in the signal gating step, any one of the first control signal and the second control signal is not output and the other signal is output, and the third control signal is output in the correlation step, a digital signal obtained in the A/D conversion step at this occasion is adopted as the first background signal, and when only any one of the first control signal and the second control signal is output in the signal gating step, a digital signal obtained in the A/D conversion step at this occasion is adopted as the second background signal, and the replica signal is calculated.

29. The control method for the pulse radar apparatus according to claim 28, wherein when the first background signal is obtained, the carrier wave generation step is performed, and when the second background signal is obtained, the carrier wave generation step is not performed.

30. The control method for the pulse radar apparatus according to claim 28, wherein when the first background signal is obtained, and when the second background signal is obtained, the carrier wave generation step is performed.

31. The control method for the pulse radar apparatus according to claim 27, wherein in the digital signal processing step, when, in the signal gating step, both the first control signal and the second control signal are not output, and the third control signal is output in the correlation step, a digital signal obtained in the A/D conversion step at this occasion is adopted as the first background signal, and when, in the signal gating step, only both of the first control signal and the second control signal are output, a digital signal obtained in the A/D conversion step at this occasion is adopted as the second background signal, and the replica signal is calculated.

32. The control method for the pulse radar apparatus according to claim 27, wherein the low noise signal is calculated by subtracting Fourier component corresponding to 0 Hz of the replica signal from Fourier component corresponding to 0 Hz of the digital signal when the first gating step, the second gating step, and the correlation step are executed.

* * * * *